US012792790B2

(12) United States Patent
Elford

(10) Patent No.: US 12,792,790 B2
(45) Date of Patent: Nov. 10, 2026

(54) SYSTEM AND METHOD OF GENERATING AN INFILL GEOMETRY FOR AN ADDITIVELY MANUFACTURABLE SANDWICH PANEL

(71) Applicant: The Boeing Company, Arlington, VA (US)

(72) Inventor: Michael C. Elford, Springfield (AU)

(73) Assignee: The Boeing Company, Arlington, VA (US)

( * ) Notice: Subject to any disclaimer, the term of this patent is extended or adjusted under 35 U.S.C. 154(b) by 960 days.

(21) Appl. No.: 18/159,953

(22) Filed: Jan. 26, 2023

(65) Prior Publication Data

US 2024/0256718 A1 Aug. 1, 2024

(51) Int. Cl.
*G06F 30/00* (2020.01)
*G06F 30/10* (2020.01)
*G06F 113/10* (2020.01)

(52) U.S. Cl.
CPC .......... *G06F 30/10* (2020.01); *G06F 2113/10* (2020.01)

(58) Field of Classification Search
CPC .............................. G06F 30/10; G06F 2113/10
USPC ............................................................ 703/1
See application file for complete search history.

(56) References Cited

U.S. PATENT DOCUMENTS 4,757,665 A 7/1988 Hardigg
6,207,256 B1 3/2001 Tashiro
2004/0074206 A1 4/2004 Tanase
2013/0000247 A1 1/2013 Sypeck
2015/0017383 A1 1/2015 Yang
2015/0175210 A1 6/2015 Raymond
2019/0337220 A1 11/2019 Beyerle
2020/0272131 A1* 8/2020 Wang .................... B33Y 50/00
2021/0061495 A1 3/2021 Aston
2024/0095423 A1 3/2024 Elford

FOREIGN PATENT DOCUMENTS

EP 3034208 6/2016

OTHER PUBLICATIONS

Yang, Nan, et al. "Multi-morphology transition hybridization CAD design of minimal surface porous structures for use in tissue engineering." Computer-Aided Design 56 (2014): 11-21. (Year: 2014).

(Continued)

*Primary Examiner* — Tiffany P Young

(57) ABSTRACT

A method of generating a panel infill geometry of a sandwich panel includes providing a driver mesh comprised of quadrilateral elements. The method additionally includes providing a reference unit cell mesh having a unit cell geometry configured to fit exactly within a unit cube. The unit cell geometry comprises a hollow center portion, centered on a cube center, and closed except for 8 openings respectively located proximate 8 corners of the unit cube. The method further includes mapping the reference unit cell meshes respectively onto a plurality of hexahedral elements respectively associated with the plurality of quadrilateral elements, through the use of basis functions defined on each of the plurality of quadrilateral elements in a manner causing adjustment of the size and shape of the plurality of reference unit cell meshes to conform respectively to the plurality of hexahedral elements.

20 Claims, 52 Drawing Sheets

(56) References Cited

OTHER PUBLICATIONS

Anderson et al., "Automated All-Quadrilateral Mesh Adaptation through Refinement and Coarsening," Proceedings of the 18th International Meshing Roundtable, Jan. 2009, pp. 557-574.
Hunter et al. "Assessment of trapped powder removal and inspection strategies for powder bed fusion techniques," The International Journal of Advanced Manufacturing Technology, Published Jan. 22, 2020.
Rati Verma et al.: "Design and Analysis of Biomedical Scaffolds Using TPMS-Based Porous Structures Inspired from Additive Manufacturing", Coatings, vol. 12, No. 6, Jun. 15, 2022.
Ye Guo et al.: "Tetrahedron-Based Porous Scaffold Design for 3D Printing", Designs, vol. 3, No. 1, Feb. 18, 2019, pp. 1-17.
Elena Provaggi et al.: "3D printing assisted finite element analysis for optimising the manufacturing parameters of a lumbar fusion cage", Materials & Design, vol. 163, Dec. 6, 2018.
Fei Liu et al.: "Functionally graded porous scaffolds in multiple patterns: New design method, physical and mechanical properties", Materials & Design, Elsevier, Amsterdam, NL, vol. 160, Oct. 3, 2018.
Xiangyu Ma et al.: "A novel design method for TPMS lattice structures with complex contour based on moving elements method", Research Square, Mar. 5, 2022, pp. 1-18.
Mccaw, John CS, and Enrique Cuan-Urquizo. "Curved-layered additive manufacturing of non-planar, parametric lattice structures." Materials & design 160 (2018): 949-963. (Year: 2018).
Feng, Jiawei, et al. "Sandwich panel design and performance optimization based on triply periodic minimal surfaces." Computer-Aided Design 115 (2019): 307-322. (Year: 2019).
Acanfora et al. "On the Effects of Core Microstructure on Energy Absorbing Capabilities of Sandwich Panels Intended for Additive Manufacturing," Materials—vol. 15, Iss: 4, pp. 1291-1291, Feb. 9, 2022.
Simsek Ugur et al: "Parametric studies on vibration characteristics of triply periodic minimum surface sandwich lattice structures", The International Journal of Advanced Manufacturing Technology, Springer, London, vol. 115, No. 3, Oct. 7, 2020, pp. 675-690.
Xiao Xiao et al: "Infill topology and shape optimisation of lattice-skin structures", Arxiv.org, Cornell University Library, 201 Olin Library Cornell University, Ithaca, NY 14853, Oct. 28, 2021.
Marschall, David, et al.: "Boundary conformal design of laser sintered sandwich cores and simulation of graded lattice cells using a forward homogenization approach", Materials & Design, Elsevier, Amsterdam, NL, vol. 190, Feb. 7, 2020 (Feb. 7, 2020).
Jason Nguyen et al.: "Conformal Lattice Structure Design and Fabrication", Laboratory for Freeform Fabrication, Jan. 1, 2012, pp. 138-161.
Dong-Jin Yoo: "Computer-aided porous scaffold design for tissue engineering using triply periodic minimal surfaces", International Journal of Precision Engineering and Manufacturing, vol. 12, No. 1, Feb. 1, 2011, pp. 61-71.
Niu Jie et al.: "Numerical study on load-bearing capabilities of beam-like lattice structures with three different unit cells", International Journal of Mechanics and Materials in Design, Springer Netherlands, Dordrecht, vol. 14, No. 3, Jul. 26, 2017 (Jul. 26, 2017), pp. 443-460.
EPO, Extended European Search Report for Appl. No. 23212976.7, issued on May 16, 2024.

* cited by examiner

SYSTEM AND METHOD OF GENERATING AN INFILL GEOMETRY FOR AN ADDITIVELY MANUFACTURABLE SANDWICH PANEL

FIELD

The present disclosure relates generally to additive manufacturing and, more particularly, to a system and method for generating an infill geometry for an additively manufacturable sandwich panel.

BACKGROUND

A sandwich panel is a structure made up of a pair of face sheets, interconnected by an inner core. The inner core is typically a relatively lightweight material or a lightweight structural arrangement, and results in a lightweight panel having a relatively high specific bending stiffness. Sandwich panels can be fabricated using additive manufacturing, which involves the successive application and solidification of layers of material on top of each other. For example, powder bed fusion is a type of additive manufacturing in which metal powder is fused in a layer by layer fashion in order to build up a part, such as a sandwich panel.

The conventional process of additively manufacturing a sandwich panel involves fabricating the inner core based on a prior art infill geometry. A prior art infill geometry has an orthogonally-repeating structural pattern of uniform size and shape. During additive manufacturing, only the portion of the structural pattern that lies between the face sheets is fabricated. This can result in irregular and inconsistent topology at the infill/face sheet interfaces between the inner core and the face sheets. The shape at certain infill/face sheet interface locations can present manufacturing challenges, and/or can result in high stress concentrations when the sandwich panel is loaded.

Certain prior art infill geometries can also present challenges in removing loose powder at the completion of the additive manufacturing build process. For example, the unit cell structures that make up the inner core of a sandwich panel can have a geometry that entraps loose powder or inhibits its removal. Loose powder remaining inside a sandwich panel can be problematic due to economic and/or environmental reasons. For example, the inability to recover and recycle all available unused powder can add to the cost of a production program.

As can be seen, there exists a need in the art for a system and method of generating a panel infill geometry for an inner core of a sandwich panel in a manner that results in a consistent footprint pattern at the infill/face sheet interface locations between the inner core and the face sheets. Preferably, the unit cell structures that make up the inner core have a geometry that improves the ability to remove loose powder at the completion of the additive manufacturing build process. In addition, the unit cell geometry preferably has symmetries that can accommodate the generation of infill geometries for irregularly shaped panels which may also include curvature in one or two directions.

SUMMARY

The above-noted needs associated with manufacturing sandwich panels are addressed by the present disclosure, which provides a method of generating a panel infill geometry of a sandwich panel. The method includes providing a driver mesh representing a panel mid-surface of a sandwich panel. The driver mesh is comprised of a plurality of quadrilateral elements. The method additionally includes providing a reference unit cell mesh having a unit cell geometry configured to fit exactly within a unit cube having a cube center and 8 cube corners. The reference unit cell mesh is comprised of a unit infill mesh and a pair of unit face sheet meshes at opposite ends of the unit infill mesh. The unit cell geometry comprises a hollow three-dimensional center portion, centered on the cube center, and is closed except for 8 openings respectively located proximate the 8 cube corners. The method further includes mapping a plurality of the reference unit cell meshes respectively onto a plurality of hexahedral elements respectively associated with the plurality of quadrilateral elements, through the use of basis functions defined on each of the plurality of quadrilateral elements in a manner causing adjustment of the size and shape of the plurality of reference unit cell meshes to conform respectively to the plurality of hexahedral elements, and resulting in a plurality of mapped unit cell meshes collectively forming a panel infill mesh having a panel infill geometry interconnecting a pair of face sheet meshes.

Also disclosed is a processor-based system for generating an infill geometry, for interconnecting a pair of face sheets of a sandwich panel. The processor-based system includes a memory device configured to store a driver mesh representing a panel mid-surface of a sandwich panel. The driver mesh is comprised of a plurality of quadrilateral elements. The reference unit cell mesh has a unit cell geometry configured to fit exactly within a unit cube having a cube center and 8 cube corners. The reference unit cell mesh is comprised of a unit infill mesh and a pair of unit face sheet meshes at opposite ends of the unit infill mesh. The unit cell geometry comprises a hollow three-dimensional center portion, centered on the cube center, and is closed except for 8 openings respectively located proximate the 8 cube corners. The processor-based system further includes a unit cell mapping module configured to map a plurality of the reference unit cell meshes respectively onto a plurality of hexahedral elements respectively associated with the plurality of quadrilateral elements, through the use of basis functions defined on each of the plurality of quadrilateral elements in a manner causing adjustment of the size and shape of the plurality of reference unit cell meshes to conform respectively to the plurality of hexahedral elements, and resulting in a plurality of mapped unit cell meshes collectively forming a panel infill mesh having a panel infill geometry interconnecting a pair of face sheet meshes.

Also disclosed is a sandwich panel, comprising a first face sheet, a second face sheet, and a panel infill structure. The panel infill structure includes an array of unit cell structures arranged in one or more layers connecting the first face sheet to the second face sheet, and each unit cell structure has a main axis that is locally normal to an imaginary panel mid-surface located midway between the first face sheet and the second face sheet. Each unit cell structure includes a hollow three-dimensional center portion that is closed except for 8 openings. In addition, each unit cell structure includes 8 corner portions respectively located at the 8 openings. The corner portions are interconnected to the corner portions of adjacent unit cell structures.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description, taken in conjunction with the accompanying drawings, which illustrate preferred and exemplary versions, but which are not necessarily drawn to scale. The drawings are examples, and are not meant as limitations on the description or the claims.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed examples are shown. Indeed, several different examples or versions may be provided and should not be construed as limited to the examples set forth herein. Rather, these examples are provided so that this disclosure will be thorough and fully convey the scope of the disclosure to those skilled in the art.

This specification includes references to "some examples," "one example," or "an example." Instances of the phrases "some examples," "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently included.

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of," means any combination of items and number of items may be used from the list, but not all of the items in the list are required. The item may be a particular object, a thing, or a category.

Figure 1:
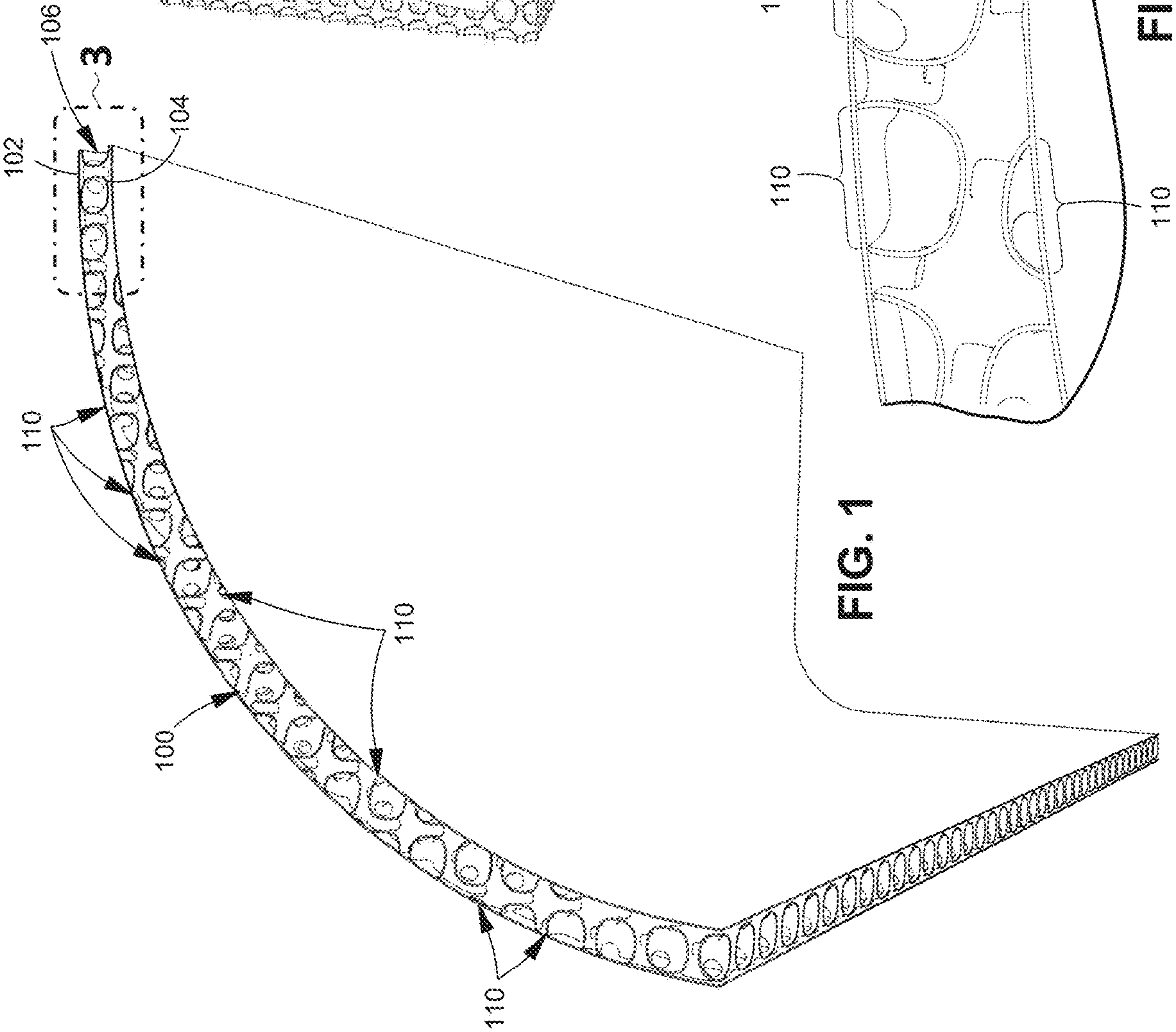
FIG. 1 is a perspective view of an example of a prior art sandwich panel comprised of first and second face sheets, and an inner core inner core having a prior art infill geometry.

Referring now to the drawings, shown in FIG. 1 is an example of a prior art sandwich panel 100. The prior art sandwich panel 100 has a first face sheet 102, a second face sheet 104, and an inner core 106 interconnecting the first face sheet 102 to the second face sheet 104. The inner core 106 of the prior art sandwich panel 100 has a prior art infill geometry 108, which has an orthogonally repeating structural pattern of uniform size and shape, as shown in FIG. 2.

Figure 2:
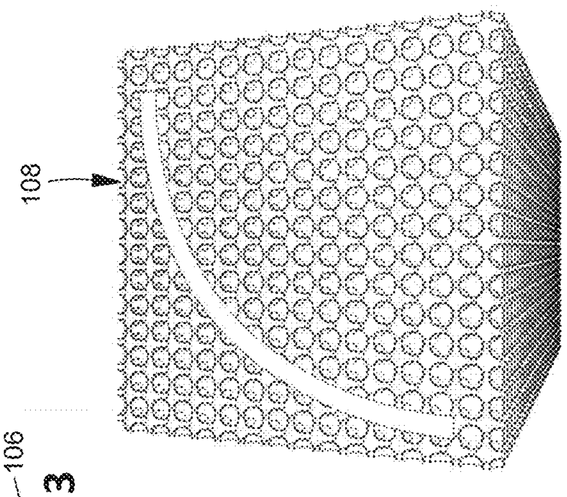
FIG. 2 is a perspective view of the volume occupied by the sandwich panel of FIG. 1 shown embedded into the prior art infill geometry used in the sandwich panel of FIG. 1, and comprised of an orthogonally-repeating structural pattern of connectable cuboids of uniform size and shape.
Figure 3:
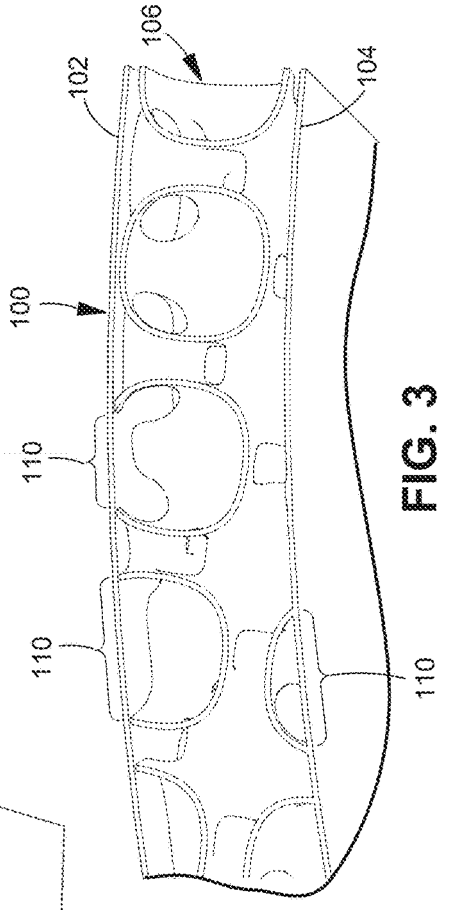
FIG. 3 is a magnified view of the portion of the sandwich panel identified by reference numeral 3 of FIG. 1, and illustrating the irregular and inconsistent topology at the infill/face sheet interfaces between the inner core and the face sheets.

In preparation for additively manufacturing the prior art sandwich panel 100, conventional software computes the portion of the structural pattern that lies between the first face sheet 102 and the second face sheet 104, which are shown superimposed on the prior art infill geometry 108 of FIG. 2. As shown in FIG. 3, this results in irregular shapes with inconsistent topology at the infill/face sheet interfaces 110 between the inner core 106 and the first and second face sheets 102, 104 of the additively manufactured prior art sandwich panel 100. As mentioned above, the shape of certain interface locations can result in localized stress concentrations in the prior art sandwich panel 100.

Figure 5:
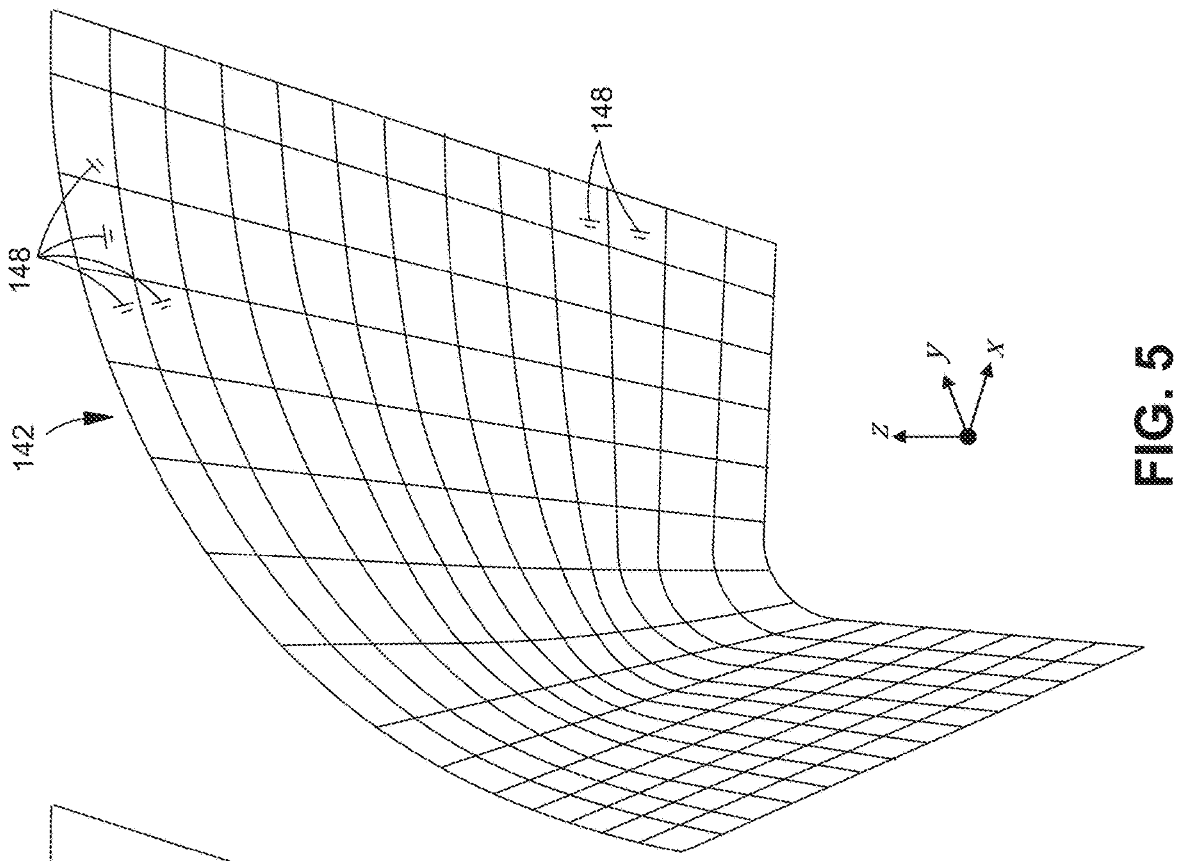
FIG. 5 is a perspective view of the panel mid-surface of FIG. 4 after meshing into a driver mesh comprised of quadrilaterals elements.
Figure 4:
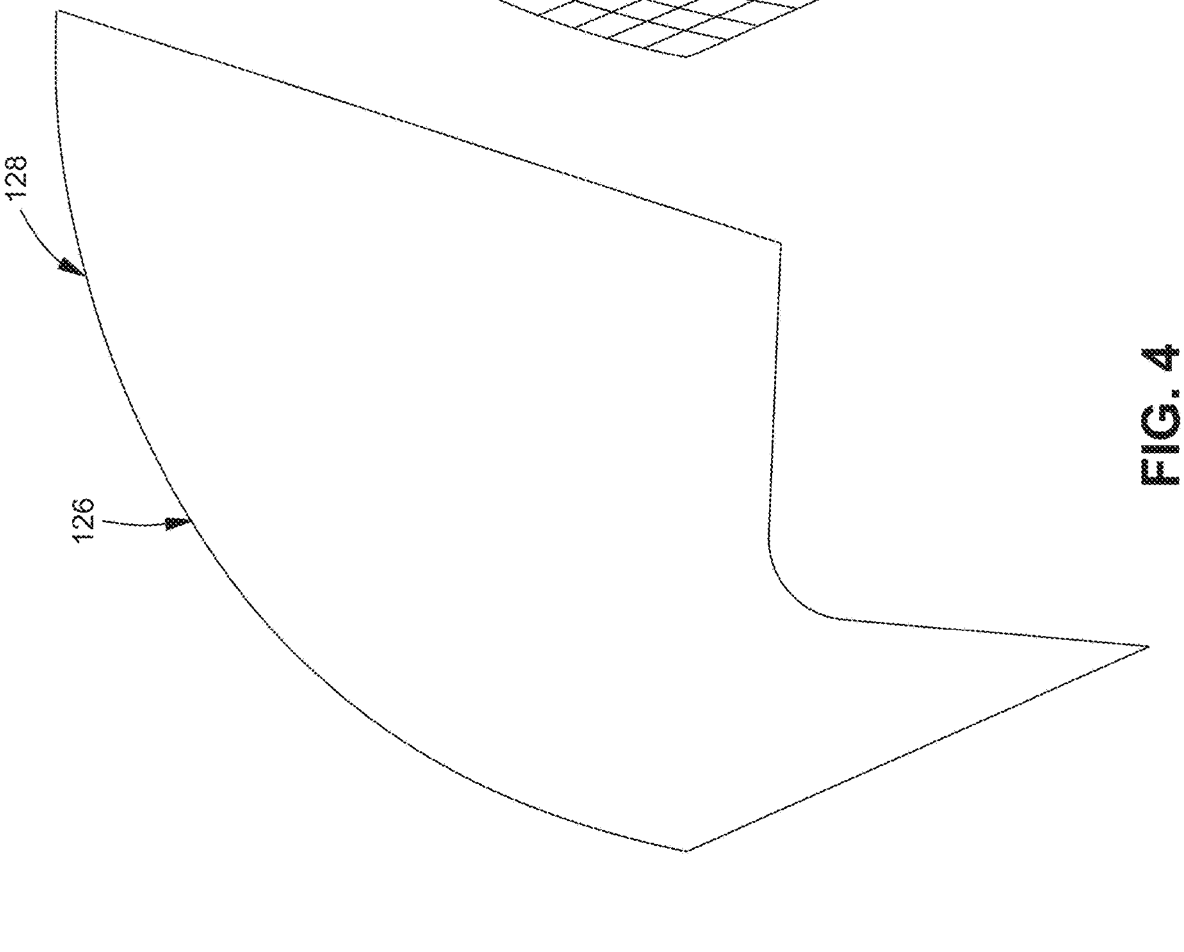
FIG. 4 is a perspective view of an example of a digital model (e.g., a 3D computer-aided-design (CAD) model) of a panel mid-surface between first and second face sheets of a sandwich panel.
Figure 6:
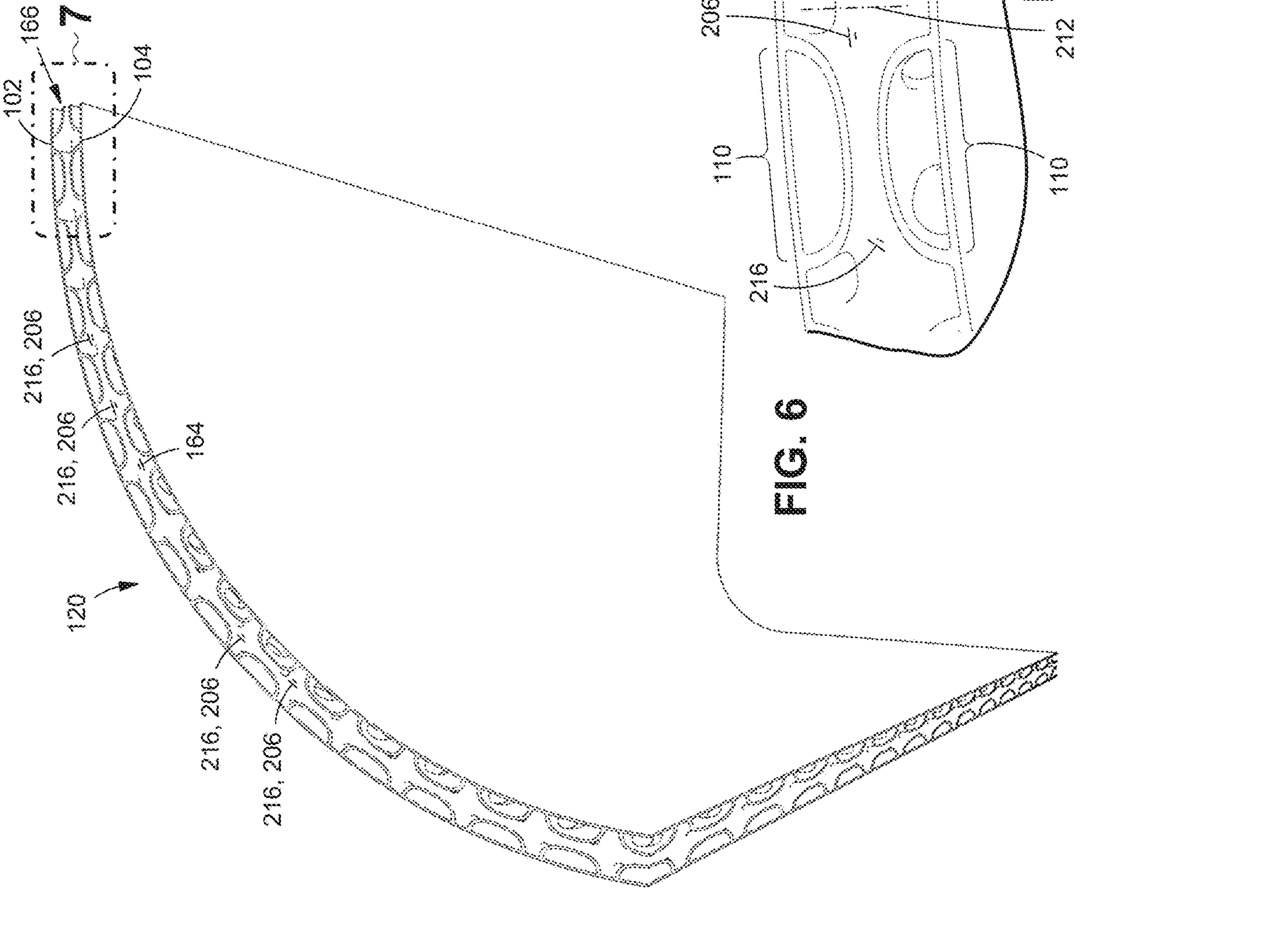
FIG. 6 is a perspective view of an example of a presently-disclosed sandwich panel comprised of a panel infill structure interconnecting first and second face sheets, and illustrating a plurality of connectable cuboids that make up the panel infill structure.
Figure 7:
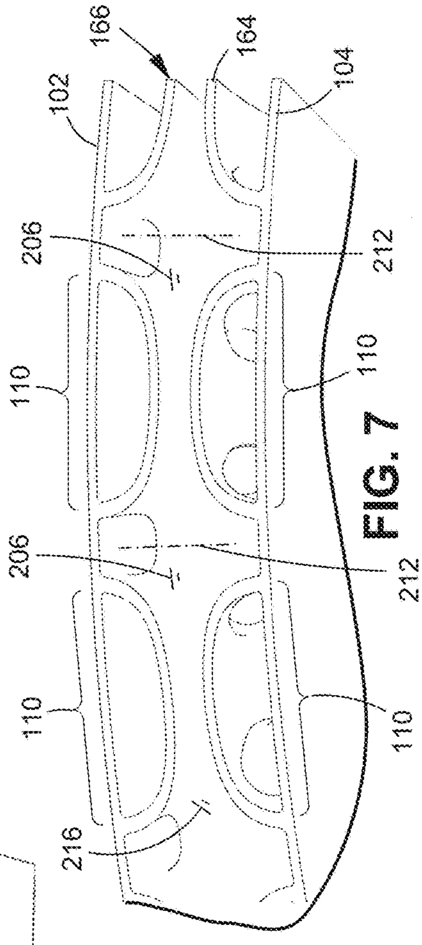
FIG. 7 is a magnified view of the portion of the sandwich panel identified by reference numeral 7 of FIG. 6, and illustrating a consistent topology at the infill/face sheet interfaces between the panel infill structure and the first and second face sheets.

Referring now to FIGS. 4-7, shown in FIG. 4 is an example of a driver digital model 128 (e.g., a computer-aided-design (CAD) model) of a panel mid-surface 126 of the presently-disclosed sandwich panel 120 of FIG. 6. In the below-described method 700 (FIG. 8) of generating a panel infill geometry 166, the driver digital model 128 of the panel mid-surface 126 is meshed into a driver mesh 142 comprised of quadrilaterals elements 148, as shown in FIG. 5. The method 700 includes mapping a reference unit cell mesh 300 (e.g., FIGS. 13, 17, 26, 28, 54 and 56) onto a plurality of hexahedral elements 154 (FIG. 57) respectively associated with the quadrilateral elements 148 (e.g., FIGS. 5, 10 and 57), to thereby generate a panel infill geometry 166 of a sandwich panel 120, as shown in FIGS. 6-7. As described in greater detail below, the panel infill geometry 166 is comprised of a plurality of unit cell structures 206, each configured as a connectable cuboid 216 (e.g., FIGS. 12, 16, 25, 27, 53 and 55) and described in greater detail below. As shown in FIG. 7, each unit cell structure 206 has a main axis 212 that is locally normal to (imaginary) mid-surface 126 (not shown) located midway between the first and second face sheets 102, 104. The arrangement of the panel infill geometry 166 results in a consistent topology at the infill/face sheet interfaces 110 between the panel infill structure 164 and the first and second face sheets 102, 104, as shown in FIGS. 6-7. In addition, the geometry of the connectable cuboid 216 reference unit cell mesh 300 (e.g., FIGS. 13, 17, 26, 28, 54 and 56) facilitates the removal of loose powder 430 (FIGS. 51-52) at the completion of the process of additively manufacturing the sandwich panel 120, as described below.

Figure 8:
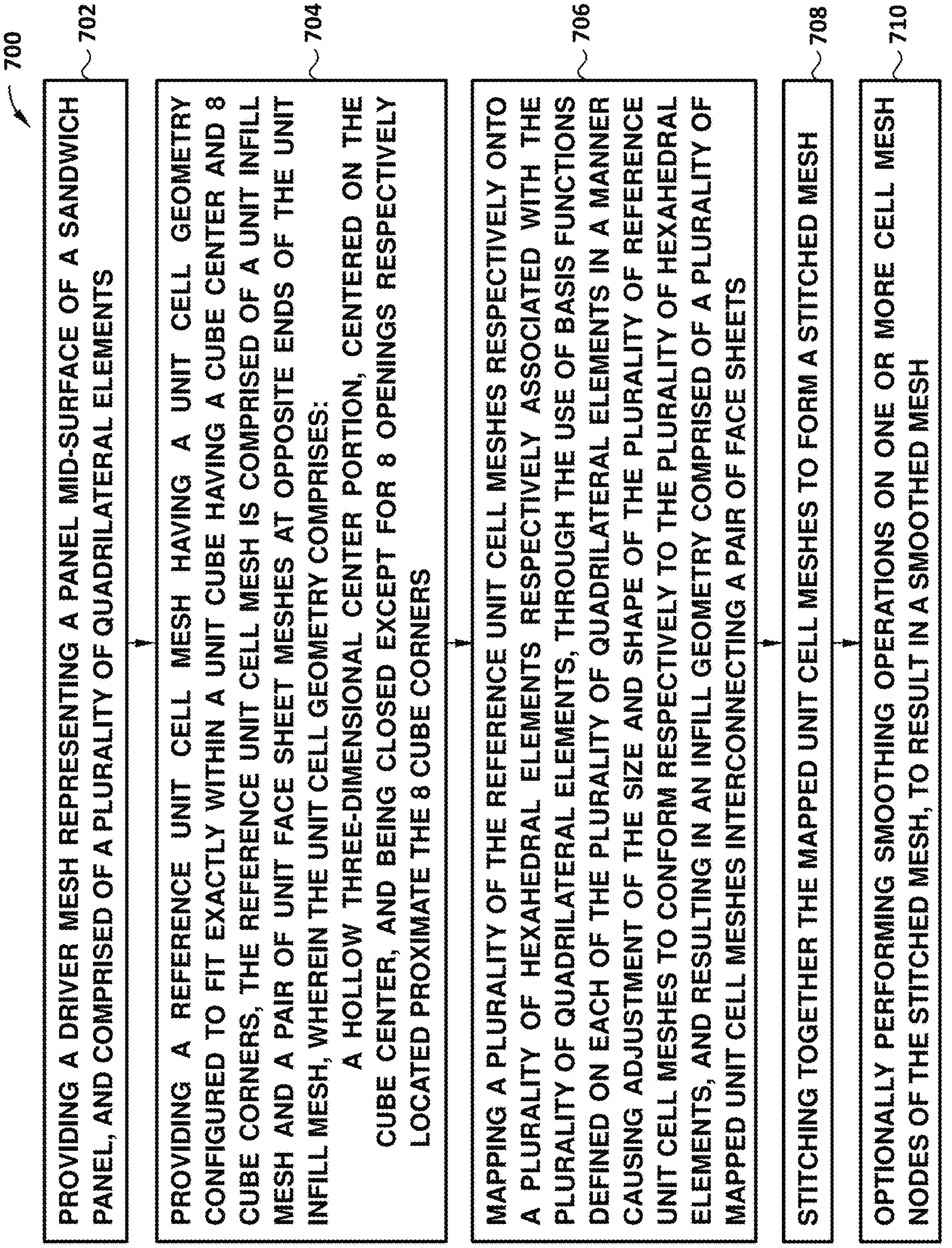
FIG. 8 is a flowchart of operations included in a method of generating the panel infill geometry of a sandwich panel.
Figure 9:
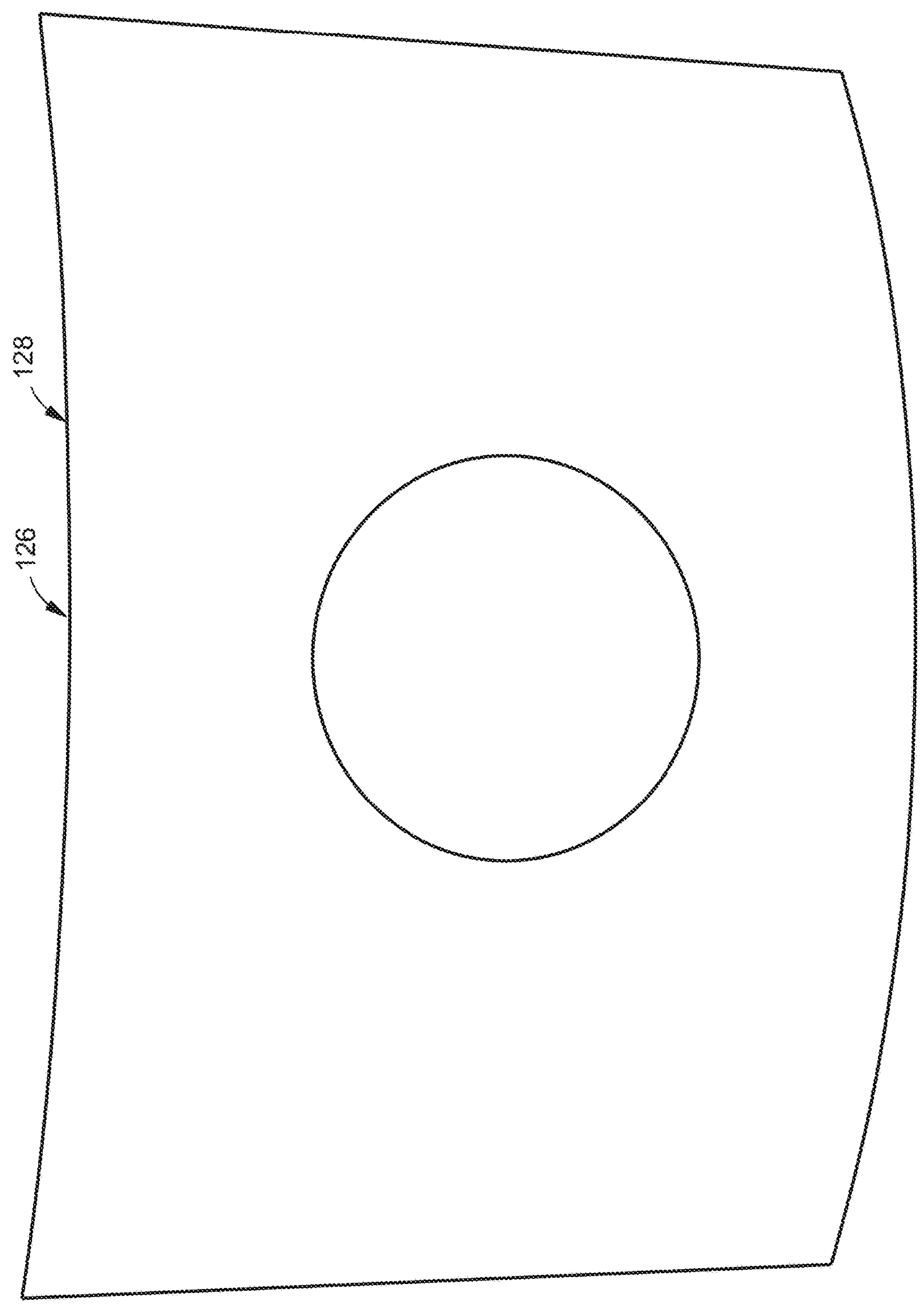
FIG. 9 is a perspective view of another example of a digital model of a panel mid-surface located between first and second face sheets of a sandwich panel.
Figure 10:
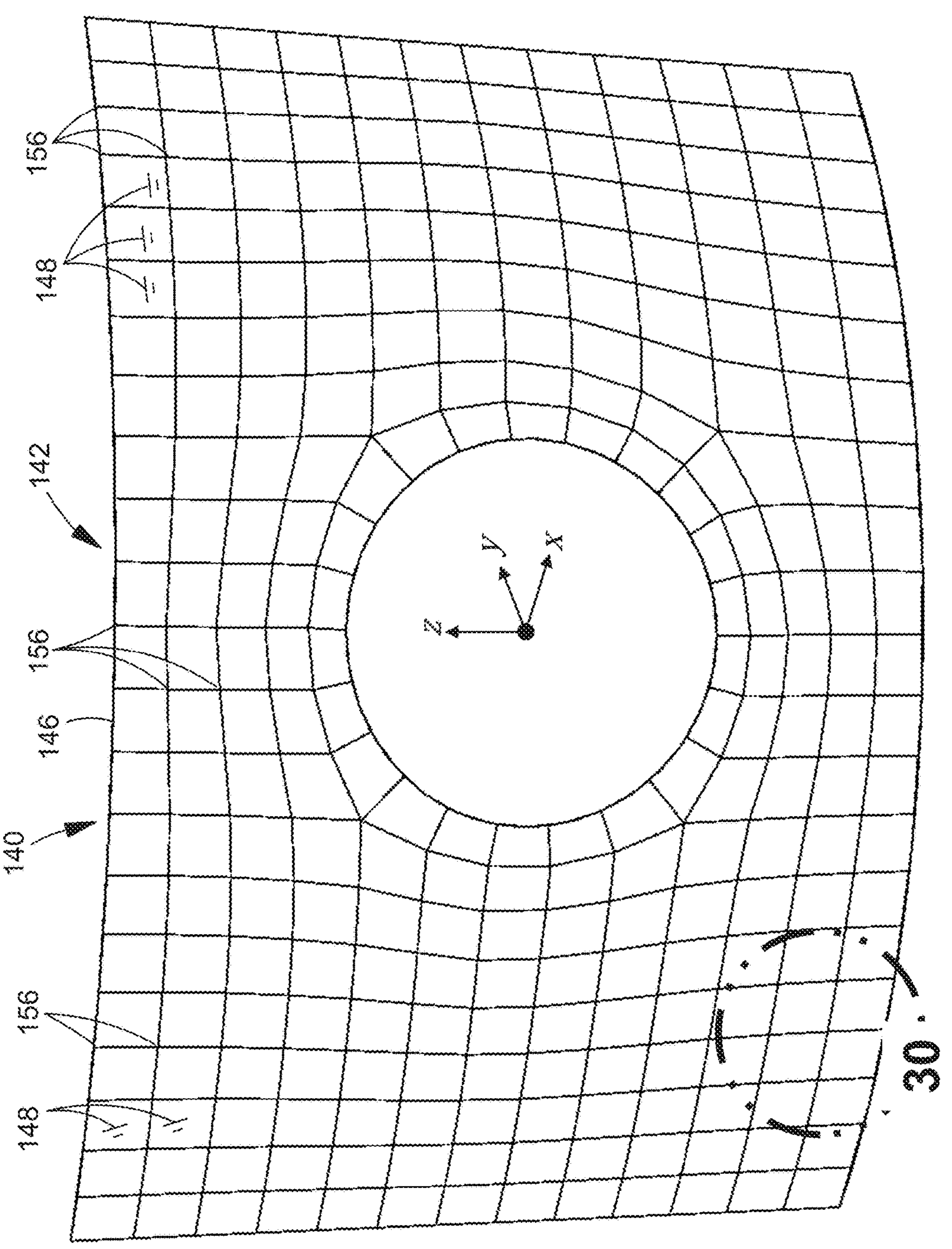
FIG. 10 is a perspective view of the panel mid-surface of FIG. 9 after meshing into a driver mesh comprised of a plurality of quadrilaterals elements.

Referring to FIG. 8, shown is a flowchart of operations included in the above-mentioned method 700 of generating a panel infill geometry 166 (e.g., FIGS. 6, 43, 44, 48, 51, and 52) for a sandwich panel 120. Step 702 of the method includes providing a driver mesh 142 (e.g., FIG. 10), which represents the panel mid-surface 126 (FIG. 9) midway between the first and second face sheets 102, 104 of the presently-disclosed sandwich panel 120. The driver mesh 142 is made up of a plurality of the quadrilateral elements 148. Each quadrilateral element 148 has driver mesh nodes 156. The driver mesh 142 is described in real space 140 according to a real space coordinate system (e.g., having x, y, z axes) as shown in the example of FIG. 10. As mentioned above, the driver mesh 142 can be constructed by meshing a driver digital model 128 (e.g., a CAD model) of the sandwich panel 120. FIG. 9 shows an example of a driver digital model 128 of a panel mid-surface 126 of a sandwich panel 120 to be additively manufactured.

In some examples, step 702 comprises providing the driver mesh 142 as a structured driver mesh 144 (e.g., FIG. 57), containing a pattern of quadrilateral elements 148 which can be mapped into a square domain with uniform rows and columns (e.g., utilizing a transfinite interpolation method of mesh generation). However, in other examples, step 702 comprises providing the driver mesh 142 as an unstructured driver mesh 146 (e.g., FIG. 10) containing a general arrangement of quadrilateral elements 148 connected together at common driver mesh nodes 156, where there is no possible mapping into a square domain with uniform rows and columns. In still other examples not shown, step 702 can comprise providing a driver mesh 142 (e.g., either structured or unstructured) that is spatially graded over the panel mid-surface 126. In a spatially-graded driver mesh, the density of the driver mesh nodes 156 is spatially graded over one or more regions of the driver mesh, resulting in a local increase or decrease in the density of the quadrilateral elements 148.

Figure 30:
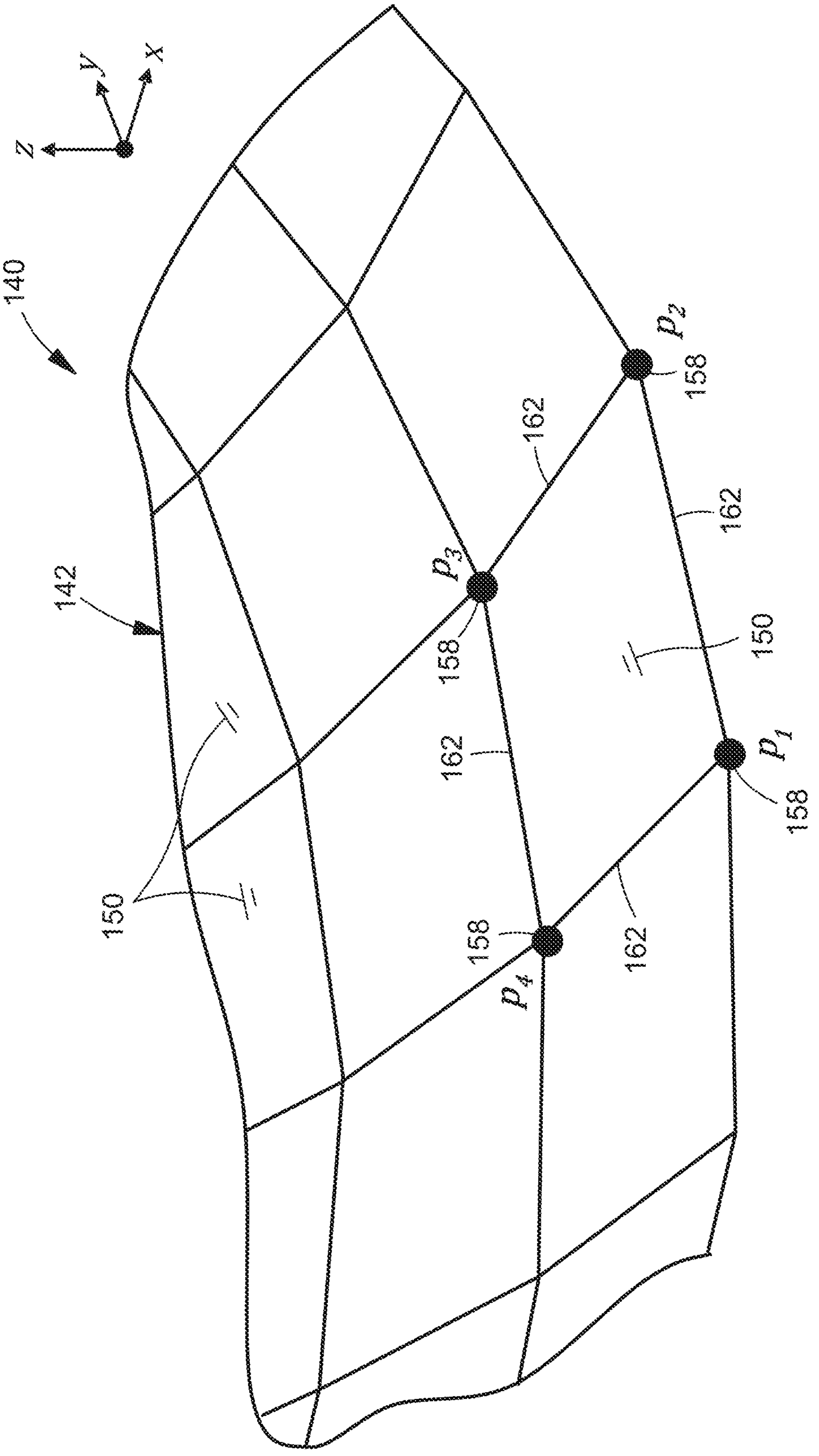
FIG. 30 is a magnified view of the portion of the driver mesh identified by reference numeral 30 in FIG. 10, comprised of linear (i.e., 4-noded) quadrilateral elements, and illustrating the 4 corner nodes of one of the linear quadrilateral elements.
Figure 37:
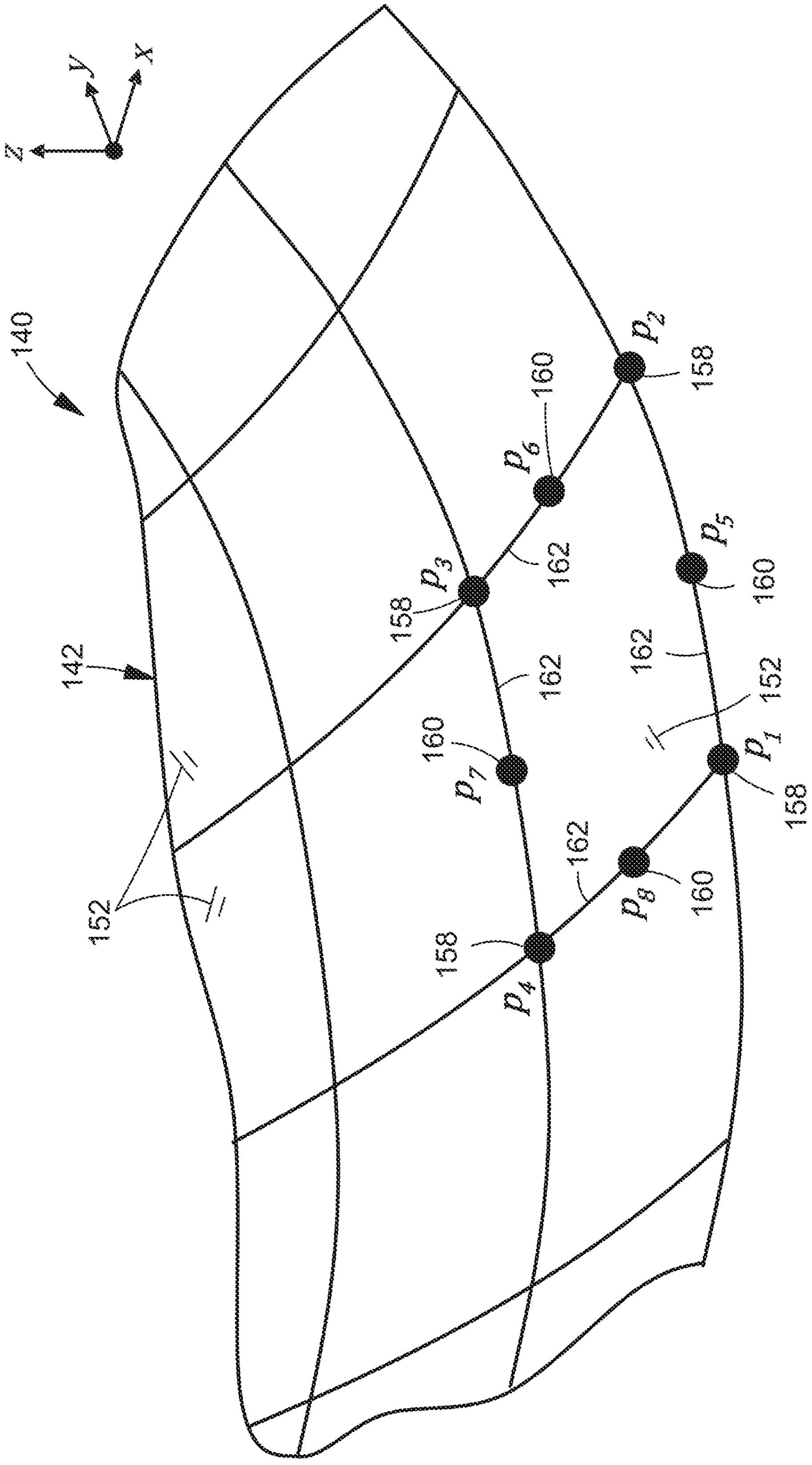
FIG. 37 is an example of a portion of the driver mesh of FIG. 10 comprised of quadratic quadrilateral elements, and illustrating the 4 corner nodes and 4 mid-side nodes of one of the quadratic quadrilateral elements.

A driver mesh 142 can be made up of linear quadrilateral elements 150 (e.g., FIG. 30) or quadratic quadrilateral elements 152 (e.g., FIG. 37). In a driver mesh 142 made up of linear quadrilateral elements 150, each linear quadrilateral element 150 has 4 corner nodes 158, as shown in FIG. 30. In a driver mesh 142 made up of quadratic quadrilateral elements 152, each quadrilateral element 148 has 4 corner nodes 158 and 4 mid-side nodes 160, as shown in FIG. 37 and described in greater detail below.

Figure 11:
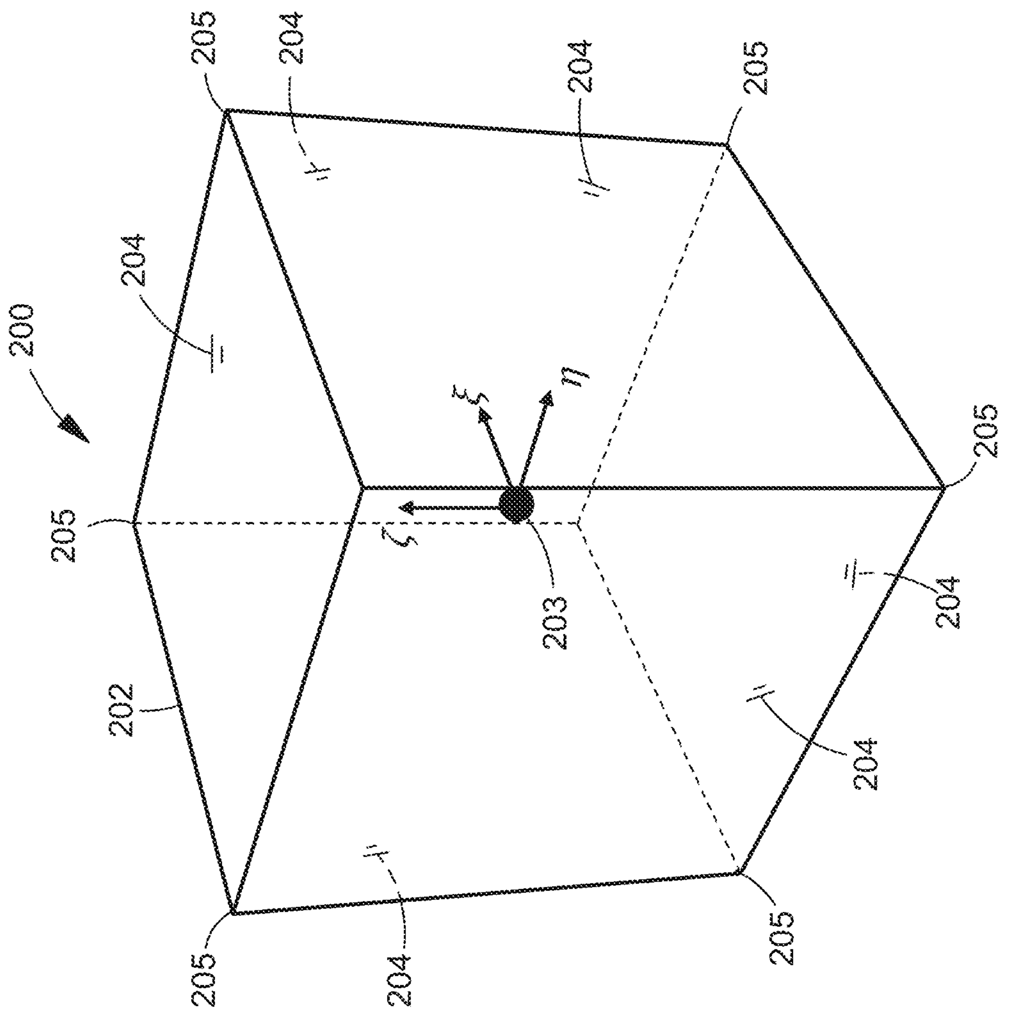
FIG. 11 is a perspective view of an example of a unit cube.

Referring to FIGS. 11-28, step 704 of the method 700 comprises providing a reference unit cell mesh 300 (e.g., FIGS. 13, 17, 26, 28, 54 and 56) which is generated from a unit cell geometry 210 which represents the connectable cuboid 216. Both the unit cell geometry 210 and the reference unit cell mesh 300 are configured to fit exactly within a unit cube 202 (FIG. 11) that is 2×2×2 units in size, and having 6 square faces 204. The unit cube 202 has a cube center 203 and 8 cube corners 205. The reference unit cell mesh 300 is described in isoparametric space 200 according to an orthonormal coordinate system having ξ, η and ζ axes, and origin (0,0,0) at the cube center 203 of the unit cube 202, as shown in FIG. 11.

Figure 25:
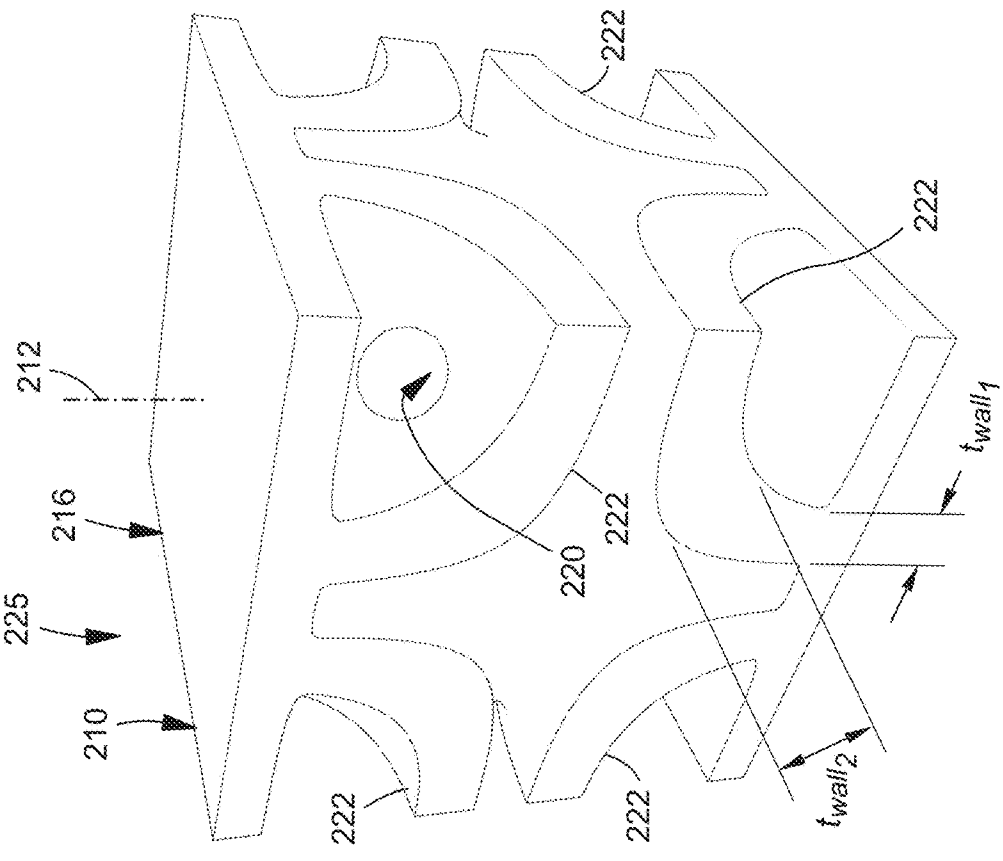
FIG. 25 is a perspective view of the volume bounded by two level set surfaces, resulting in a variable thickness solid version of a reference unit cell geometry configured to fit exactly within the unit cube of FIG. 11, and which is defined as a connectable cuboid bounded solid.
Figure 27:
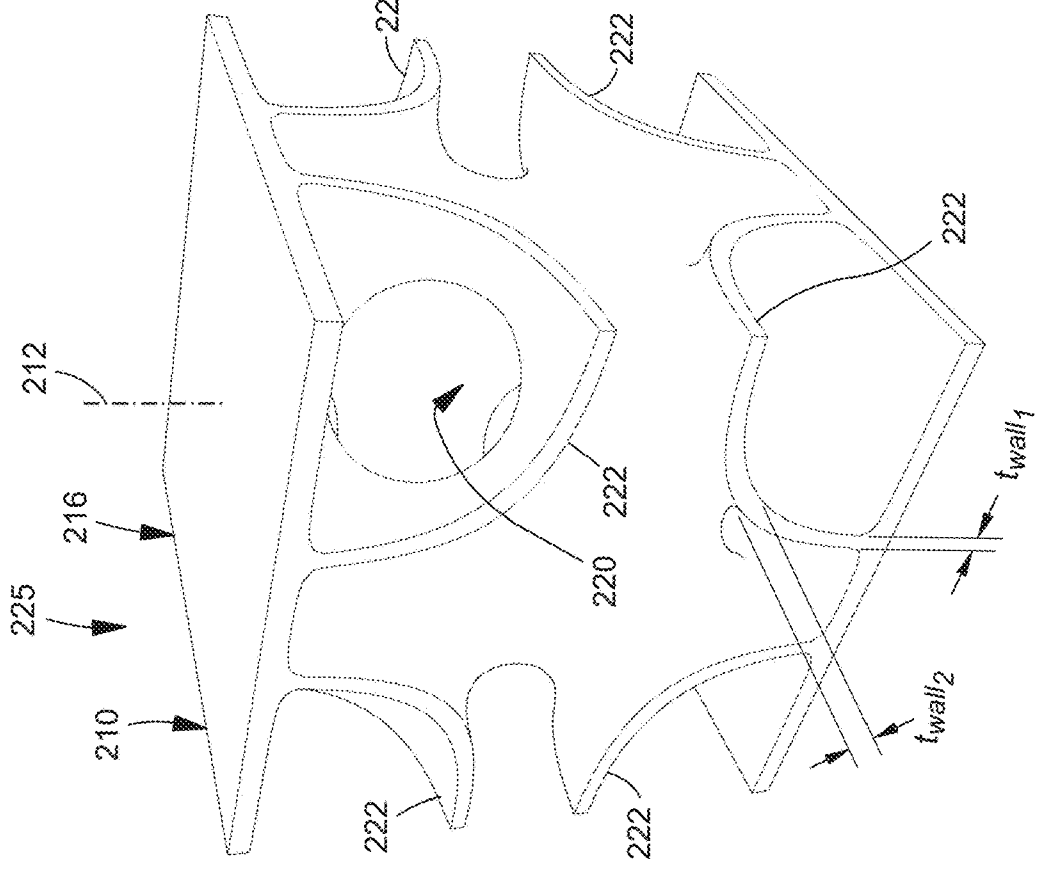
FIG. 27 shows a further example of a connectable cuboid bounded solid, in which the level set surfaces are different from those of FIG. 25.

Three methods of geometric representation of the connectable cuboid unit cell geometry are described herein, including (1) a connectable cuboid surface geometry 223 (e.g., FIG. 12), (2) a connectable cuboid constant thickness solid 224 (e.g., FIG. 16), and (3) a connectable cuboid bounded solid geometry 225 (e.g., FIGS. 25 and 27).

The unit cell reference mesh 300 (FIG. 13) that corresponds to the connectable cuboid surface geometry 223 (FIG. 12) consists of shell elements 306 (e.g., triangular and/or quadrilateral elements). The unit cell reference mesh 300 (FIG. 17) that corresponds to the connectable cuboid constant thickness solid geometry 224 (FIG. 16) consist of solid elements 308 (e.g., tetrahedral, pentahedral and/or hexahedral elements). The unit cell reference meshes 300 (FIGS. 26 and 28) that correspond to the connectable cuboid bounded solid geometry 225 (FIGS. 25 and 27) also consist of solid elements 308.

Figure 13:
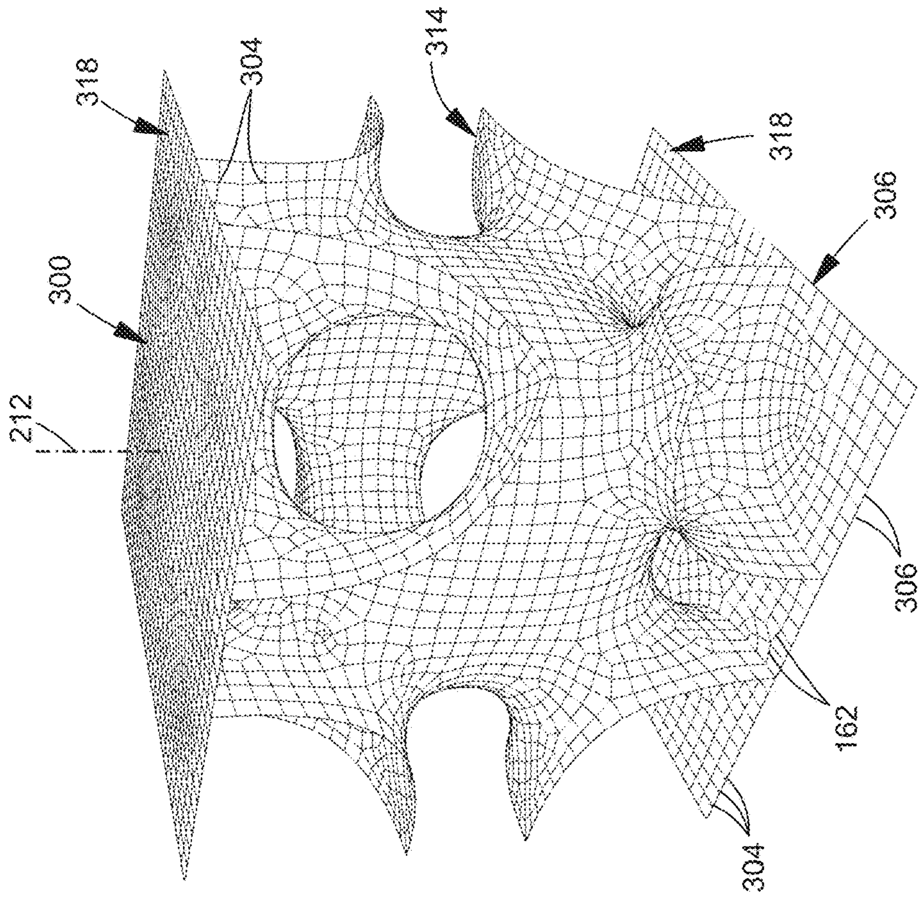
FIG. 13 shows an example of a reference unit cell shell mesh corresponding to the connectable cuboid surface shown in FIG. 12.

A connectable cuboid surface geometry 223 (FIG. 12) and corresponding reference unit cell mesh 300 (FIG. 13) are generated as follows. A surface is generated which is represented by the set of points that have the following relation:

$$\cos(\pi x)\cos(\pi y)+\cos(\pi y)\cos(\pi z)+\cos(\pi z)\cos(\pi x)=-0.5 \quad \text{(Equation 596)}$$

wherein x, y and z are isoparametric coordinates. This geometry is the unit infill portion 246 of the connectable cuboid surface geometry 223. Top and bottom square face plates 244 are added on 2 opposing faces (e.g., at z=±1) of the unit infill portion 246, and the geometries of the unit infill portion 246 and the face plates 244 are merged together. A shell element 306 mesh is then generated from this merged geometry in order to create the reference unit cell mesh 300 (FIG. 13).

Figure 17:
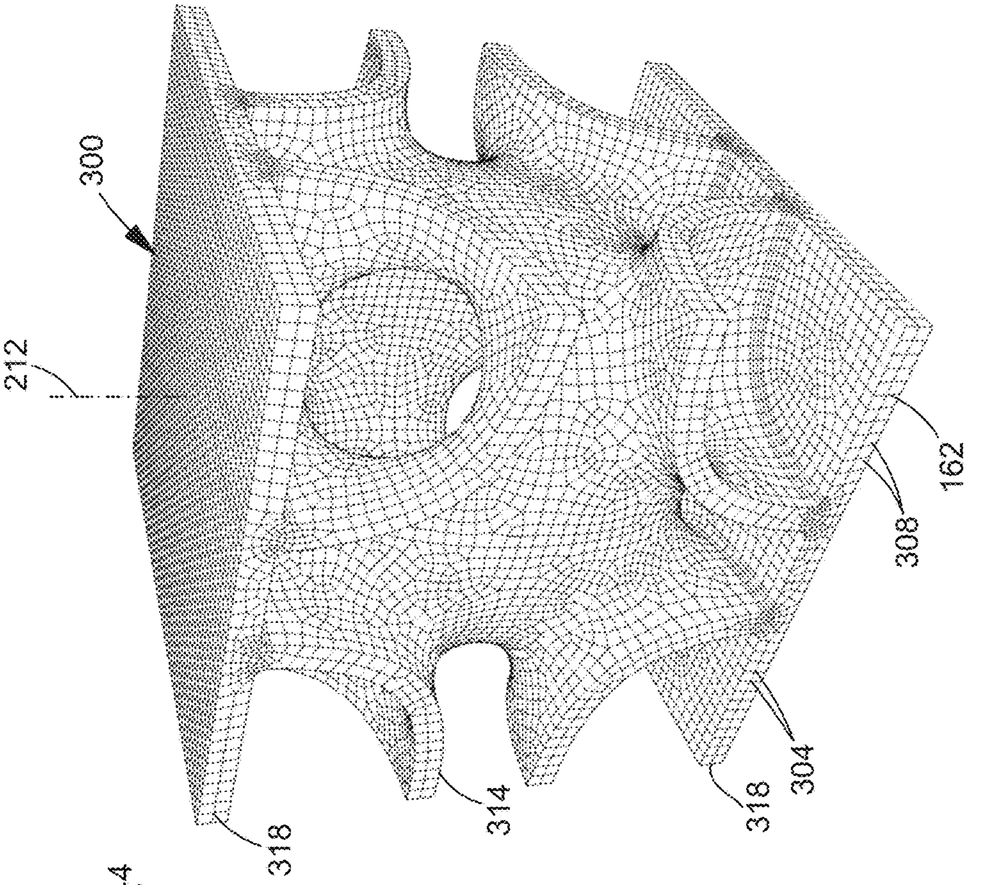
FIG. 17 shows an example of a reference unit cell solid mesh corresponding to the connectable cuboid constant thickness solid shown in FIG. 16.
Figure 19:
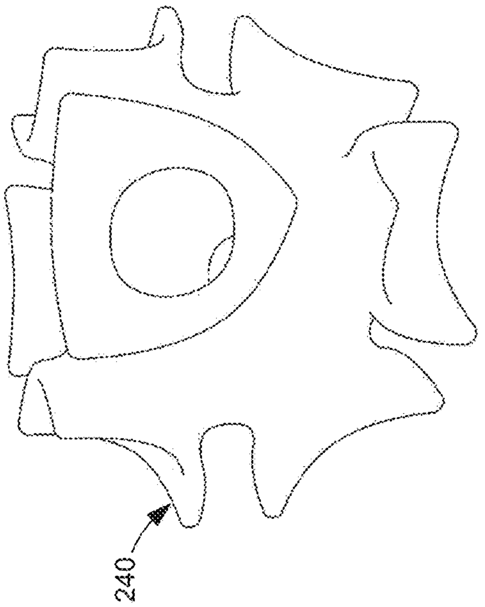
FIG. 19 shows the connectable cuboid surface dilated by an amount equal to one half of a desired wall thickness.
Figure 20:
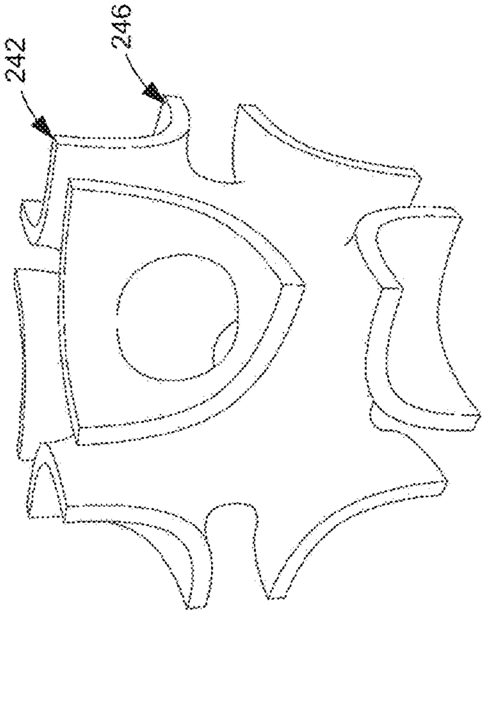
FIG. 20 shows the dilated surface after trimming to fit inside a unit cube, and resulting in a constant thickness solid infill portion.
Figure 21:
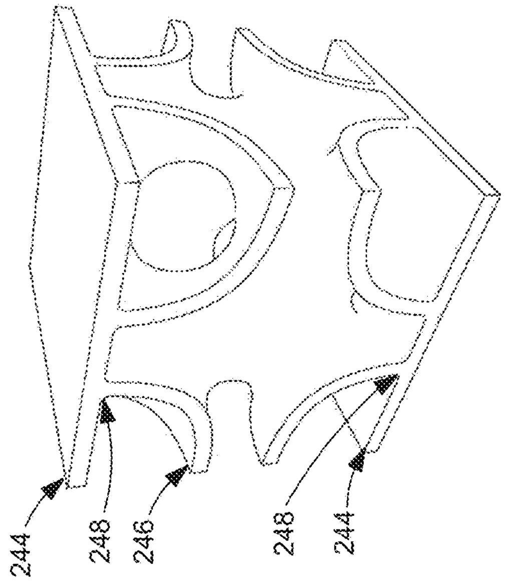
FIG. 21 shows top and bottom face plates combined with the infill portion, to thereby result in a connectable cuboid constant thickness solid version of a reference unit cell geometry.

A connectable cuboid constant thickness solid geometry 224 (FIG. 16) and corresponding reference unit cell mesh 300 (FIG. 17) are generated as follows. A surface 238 of a connectable cuboid 216 is generated (FIG. 18), which is represented by the set of points that have the above-listed Equation 596. This surface 238 geometry is then dilated by an amount equal to one half of the desired wall thickness to generate the solid dilated geometry 240, as shown in FIG. 19. The set of points in the solid dilated geometry 240 is then trimmed to fit inside the unit cube 202, resulting in the solid trimmed geometry 242 of FIG. 20. This then provides the unit infill portion 246 of the geometry. Rectangular prisms representing the top and bottom face plates 244 are then joined to the unit infill portion 246. Fillets 248 at the interface between unit infill portion 246 and the face plates 244 can be applied, as shown in FIG. 21. A solid element 308 mesh can then generated from this geometry to create the reference unit cell mesh 300 (FIG. 17).

A dilation operation can generate a uniformly thickened surface from an infinitely thin surface. A dilation is a set operation which acts on two sets of points to create a third set of points. In the case described here, the first set (i.e., Set A) contains all points within a sphere of radius less than or equal to one half of the desired wall thickness (t). This sphere is centered at the origin (0,0,0). The second set (i.e., Set B) is the set of all points lying on the connectable cuboid surface. The dilated set (i.e., Set C), generated by the dilation operation, is the set containing any point which is equal to a point in Set A vectorially added to a point in Set B. The dilation operation between sets A and B is also referred to as a Minkowski sum, written as A⊕B. The following is the formal mathematical notation describing the dilation of a connectable cuboid surface, wherein t is the thickness of the resulting solid region:

$$A=\{a \mid \|a\|\le t/2,\ t\in\mathbb{R},\ a\in\mathbb{R}^3\} \quad \text{(Equation 598)}$$

$$B=\{(x,y,z)\in\mathbb{R}^3 \mid \cos(\pi x)\cos(\pi y)+\cos(\pi y)\cos(\pi z)+\cos(\pi z)\cos(\pi x)=-0.5\} \quad \text{(Equation 600)}$$

$$C=A\oplus B=\{a+b \mid a\in A,\ b\in B\} \quad \text{(Equation 602)}$$

Figure 24:
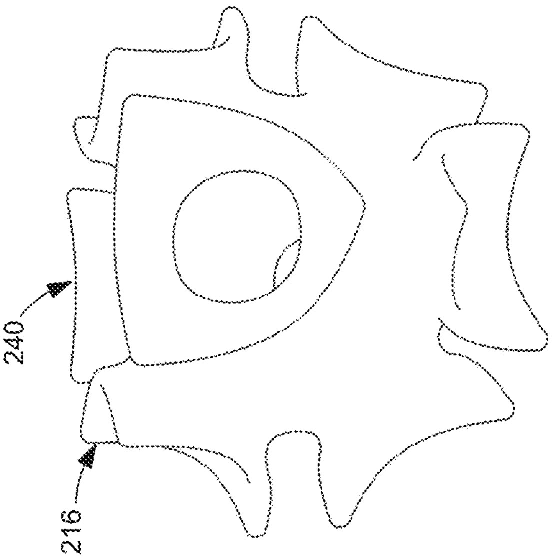
FIG. 24 illustrates the envelope of all possible combinations of points in Set A vectorially added to points in Set B (i.e., the Minkowski sum of sets A and B).
Figure 23:
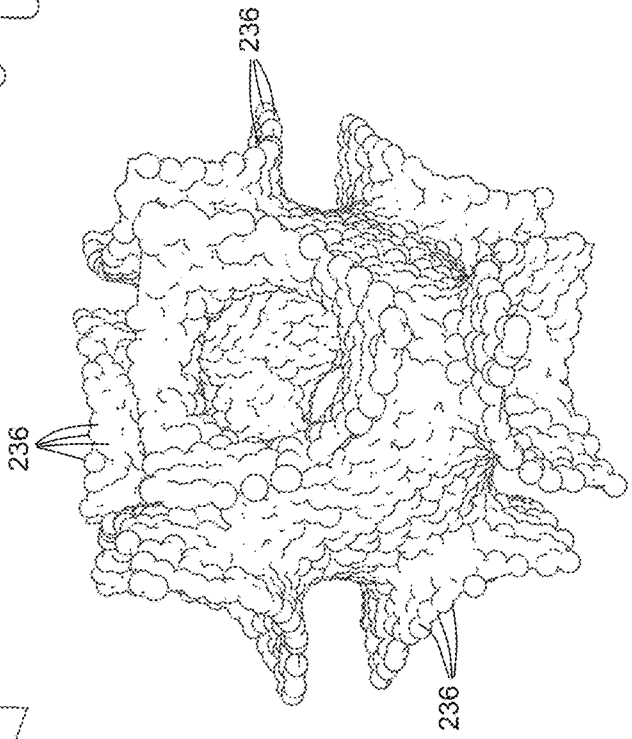
FIG. 23 illustrates all points in Set A vectorially added to a few hundred points in Set B.
Figure 22:
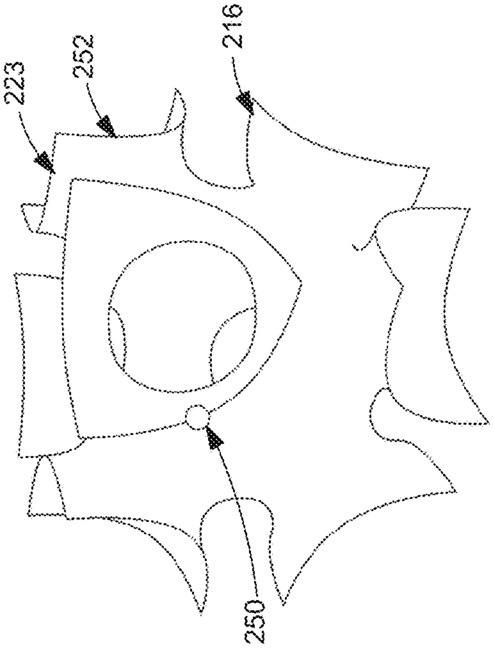
FIG. 22 shows points in Set B describing a connectable cuboid surface, and points in Set A describing a sphere.

To illustrate the dilation operation, FIG. 22 shows the Set B, identified by reference numeral 252, and describing the connectable cuboid surface 223. FIG. 22 also shows the Set A, identified by reference numeral 250, and describing the sphere 236. FIG. 23 illustrates the Minkowski sum of Set A and only a few hundred points in Set B. The result is the combination of many hundreds of spheres 236 (FIG. 23), each of which is centered on a specific point on the surface (e.g., a point in Set B). As more and more points in Set B are included, the result converges as shown in FIG. 24. In this regard, FIG. 24 depicts the envelope of every possible combination of points in Set A vectorially added to points in Set B.

Figure 26:
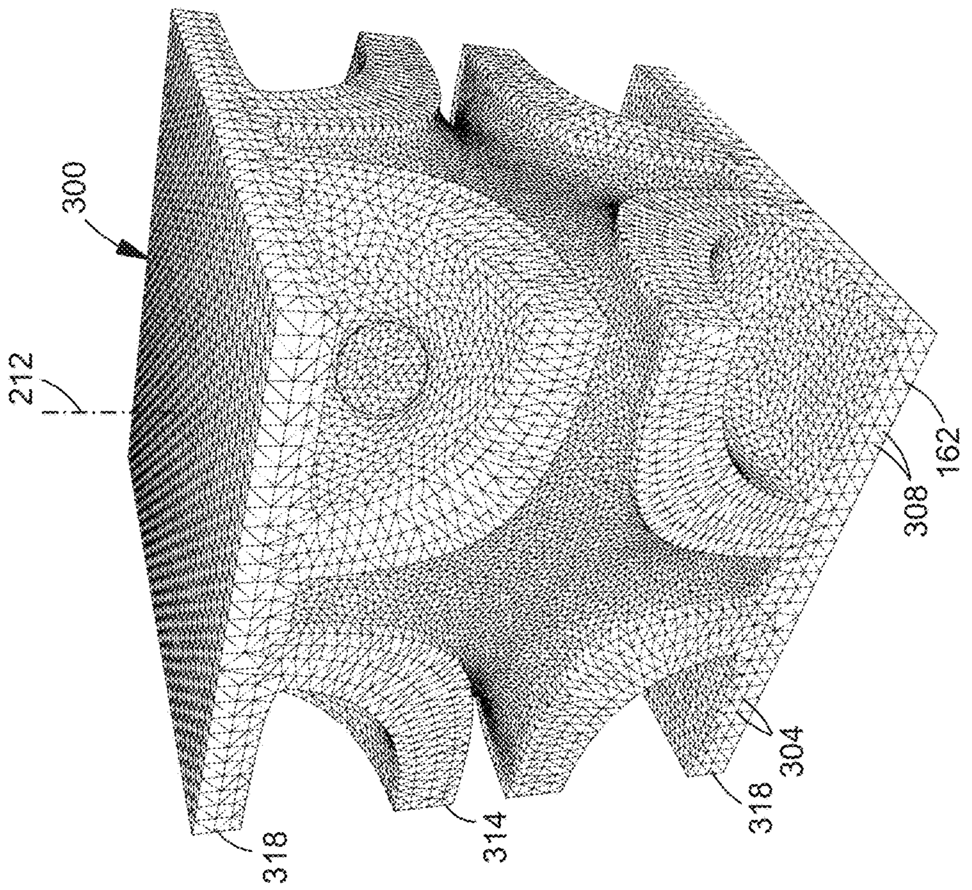
FIG. 26 shows an example of a reference unit cell solid mesh corresponding to the connectable cuboid bounded solid shown in FIG. 25.
Figure 28:
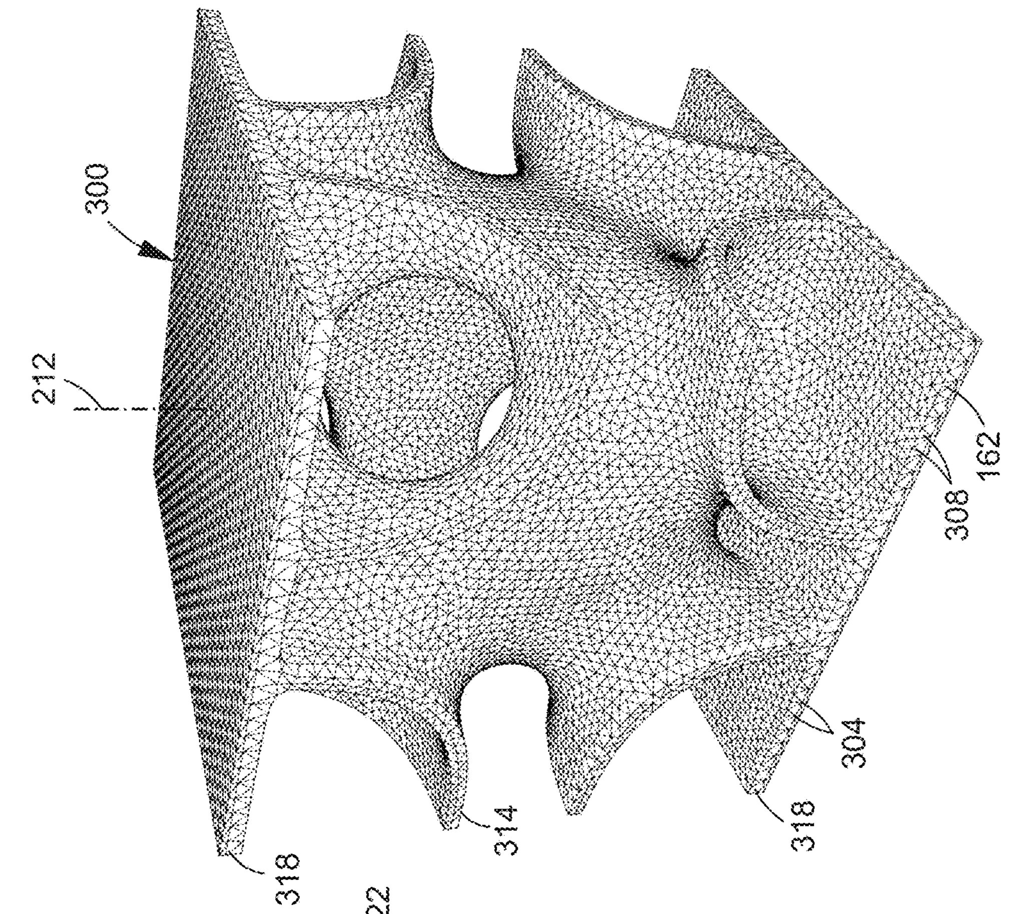
FIG. 28 shows an example of a reference unit cell solid mesh corresponding to the connectable cuboid bounded solid shown in FIG. 27.

A connectable cuboid bounded solid 224 geometry (FIGS. 25 and 27) and corresponding reference unit cell mesh 300 (FIGS. 26 and 28) are generated as follows. A volume is generated which is represented by the set of points that have the following relation:

$$-a<\cos(\pi x)\cos(\pi y)+\cos(\pi y)\cos(\pi z)+\cos(\pi z)\cos(\pi x)+0.5<b \quad \text{(Equation 604)}$$

wherein x, y and z are isoparametric coordinates, and wherein a and b are positive real-valued constants respectively defining the upper bounding surface and the lower bounding surface of the volume to make the unit infill portion 246. Rectangular prisms representing the top and bottom face plates 244 are then joined to the infill portion 246. A solid element 308 mesh is then generated from this geometry to create the reference unit cell mesh 300 (FIGS. 26 and 28).

As mentioned above, FIGS. 12-28 show the reference unit cell mesh 300 in a unit cell geometry 210 referred to herein as a connectable cuboid 216. The connectable cuboid 216 reference unit cell mesh 300 is made up of cell mesh elements having a plurality of cell mesh nodes 304, and has a main axis 212 that is coincident with the ζ axis (FIG. 11). The connectable cuboid 216 reference unit cell mesh 300 is comprised of the unit infill mesh 314 interconnecting a pair of unit face sheet meshes 318 on opposite ends of the unit infill mesh 314. Each of the unit face sheet meshes 318 is the same size and shape as the square faces 204 respectively defining the top and bottom of the unit cube 202 (FIG. 11). In the case of the connectable cuboid constant thickness solid 224 and the connectable cuboid bounding solid 225, the face sheets have a volume due to their thickness.

Figure 15:
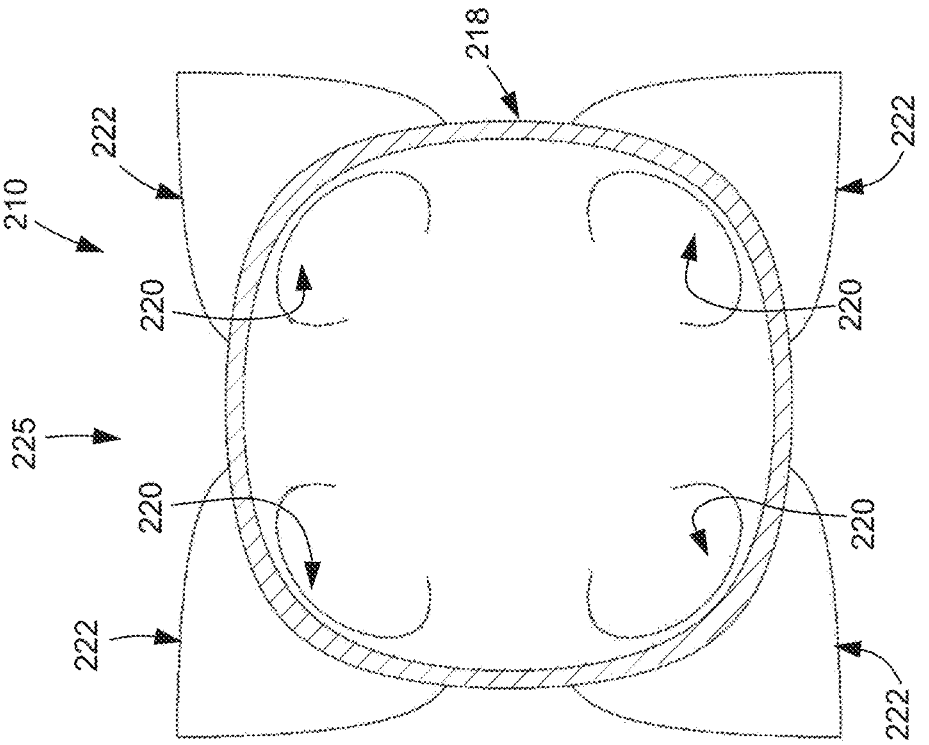
FIG. 15 is a sectional view of the connectable cuboid bounded solid, taken along the imaginary reference plane of FIG. 14.
Figure 14:
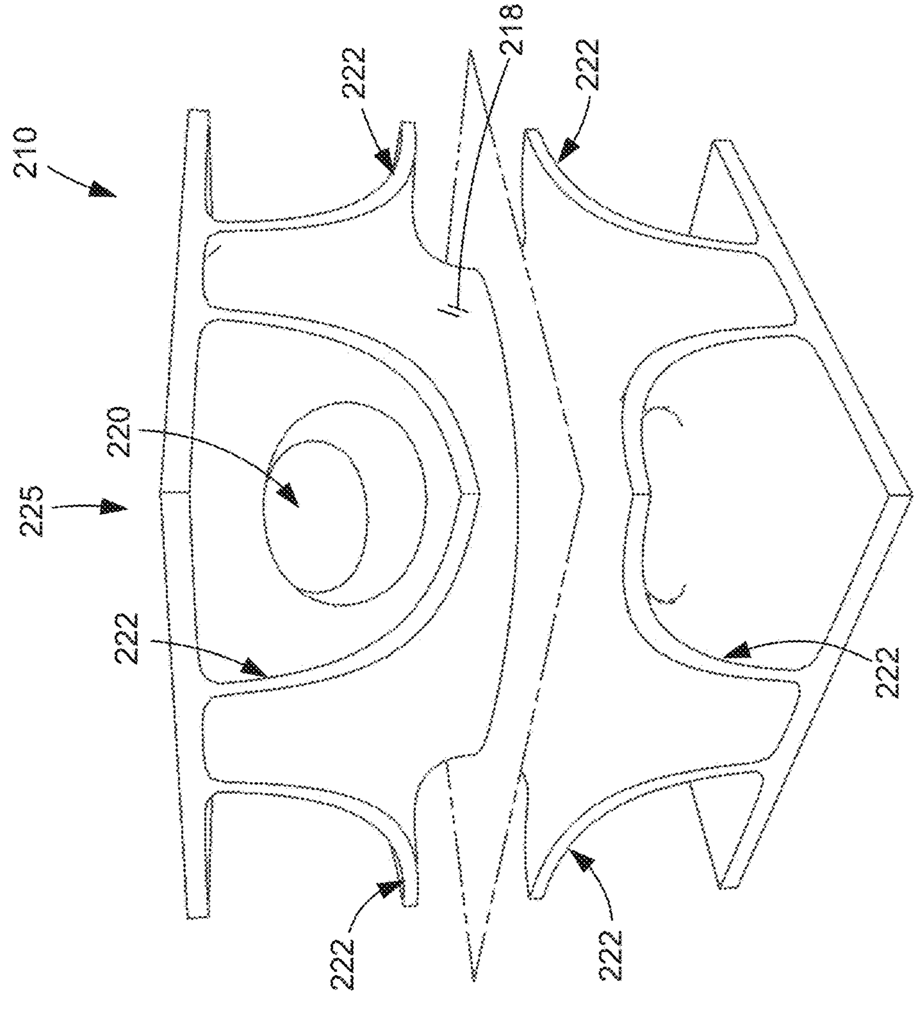
FIG. 14 is a perspective view of an example of a connectable cuboid bounded solid version of a connectable cuboid unit cell geometry, and illustrating an imaginary reference plane along which the sectional view of FIG. 15 is taken.

The unit cell geometry 210 of the connectable cuboid 216 of FIGS. 12-28 comprises a hollow three-dimensional center portion 218 that is centered on the cube center 203 (FIG. 11). The center portion 218 is closed as shown in FIG. 15, except for 8 openings 220 respectively located proximate the 8 cube corners 205 (FIG. 11).

In FIGS. 12-28, the connectable cuboid 216 includes 8 corner portions 222 respectively located at (e.g., centered on) the 8 cube corners 205. The 8 corner portions 222 are coupled to the center portion 218 respectively at the 8 openings 220. Each corner portion 222 has a rounded shape, and a concave side that faces away from the cube center 203 (FIG. 11). Each corner portion 222 has the same size and shape. In this regard, step 704 comprises providing the reference unit cell mesh 300 with symmetries enabling mapping onto the hexahedral elements 154 associated with the quadrilateral elements 148 of an unstructured driver mesh 146.

Figure 12:
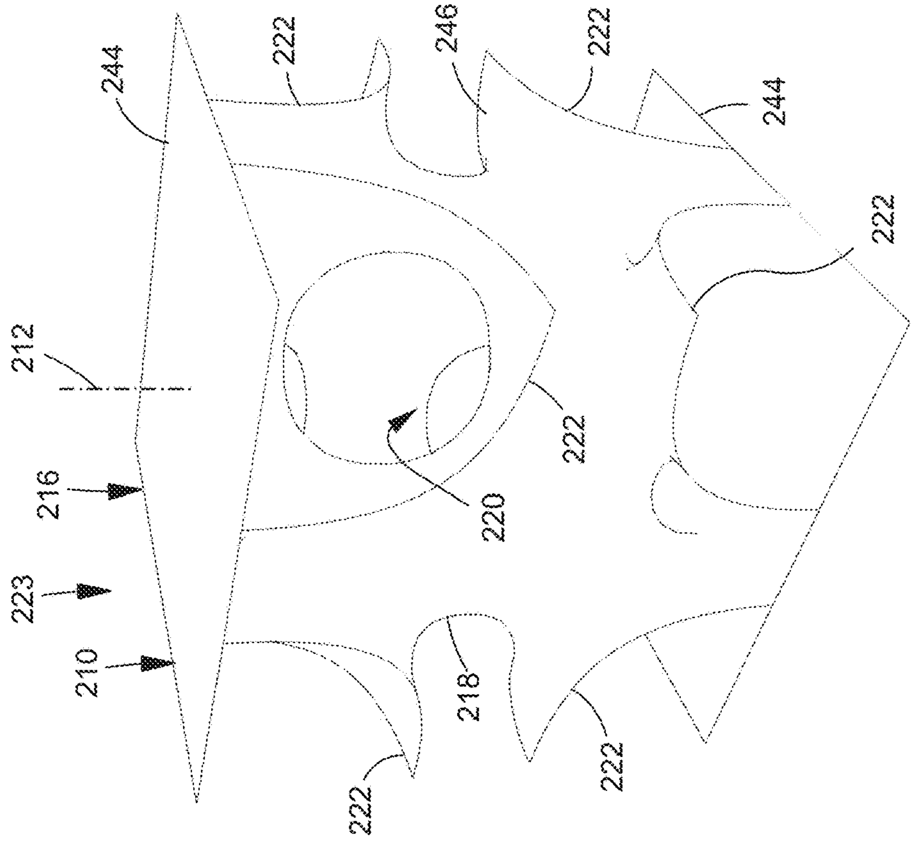
FIG. 12 is a perspective view of an infinitely thin surface version of a reference unit cell geometry configured to fit exactly within the unit cube of FIG. 11 and which is defined as a connectable cuboid surface.

FIGS. 12-13 show the connectable cuboid surface 223 version of the connectable cuboid 216 unit cell geometry 210. In FIG. 12, the connectable cuboid surface 223 is an infinitely thin surface. FIG. 13 shows a reference unit cell shell mesh 300 corresponding to the connectable cuboid surface shown in FIG. 12. The reference unit cell shell mesh 300 is comprised of shell elements 306 (i.e., polygons), such as triangles and/or quadrilaterals. For FIGS. 12-13, step 704 comprises providing a unit infill portion 246 (FIG. 12) of the reference unit cell mesh 300 as polygons connecting cell mesh nodes 304, wherein the cell mesh nodes 304 are in the set of cell mesh nodes 304 that satisfy the above-described Equation 596.

Figure 16:
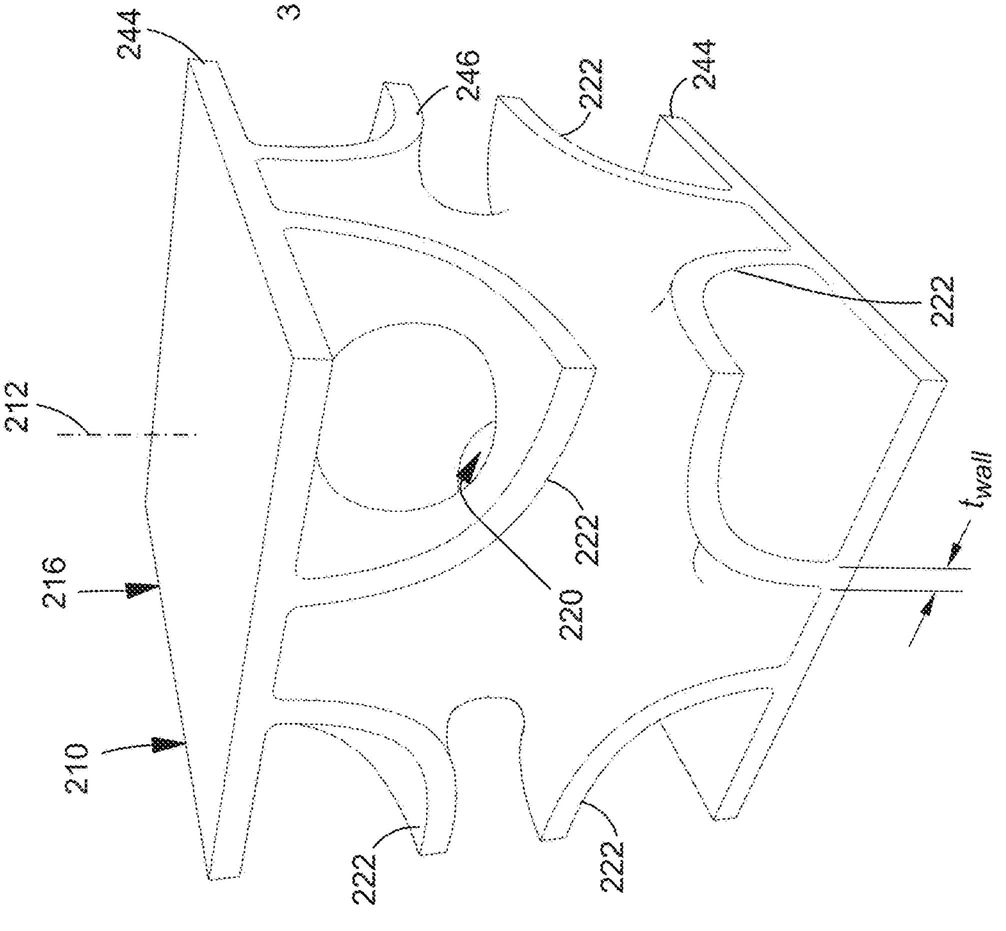
FIG. 16 is a perspective view of the geometry resulting from a dilation of the surface shown in FIG. 12, trimmed to the unit cube of FIG. 11, resulting in a constant thickness solid version of a reference unit cell geometry configured to fit exactly within the unit cube of FIG. 11, and which is defined herein as a connectable cuboid constant thickness solid.
Figure 18:
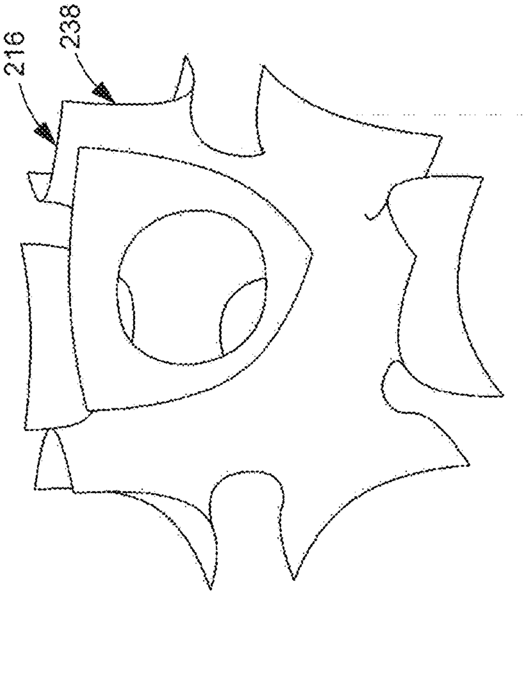
FIG. 18 shows an example of a connectable cuboid surface geometry.

Referring to FIGS. 16-17, shown in FIG. 17 is an example of a reference unit cell mesh 300, consisting of solid elements 308, and which corresponds to the connectable cuboid constant thickness solid 224 version of the unit cell geometry 210 of FIG. 16. The reference unit cell mesh 300 has a volume defined by the above-described dilatation of the mid-surface with subsequent trimming and joining operations, and which results in the reference unit cell mesh 300 having a constant wall thickness $t_{wall}$. As described above, the dilatation of a surface is achieved through the Minkowski sum of the sets A and B, denoted as A⊕B. The Minkowski sum represents the set containing all possible combinations of points in Set A vectorially added to points in Set B, and the trimming operation is the intersection of the set of points in the Minkowski sum and the set of points in the unit cube of FIG. 11.

In FIG. 17, the volume of the reference unit cell mesh 300 is comprised of solid elements 308 (i.e., polyhedrons). Examples of solid elements 308 that can be used in the reference unit cell mesh 300 include tetrahedrons, hexahedrons, pentahedrons, or a mixture thereof.

For FIGS. 16-17, step 704 comprises providing reference unit cell mesh 300 as solid elements 308 (i.e., polyhedrons) connecting cell mesh nodes 304, wherein the cell mesh nodes 304 have coordinates given by a set of points. The set of points of the cell mesh nodes 304 are in the set defined as the Minkowski sum of the set of all points within a sphere 236 of a given radius and the set of all points which satisfy the above-described Equation 596, subsequently intersected with the sets of points within the unit cube of FIG. 11, and then joined with the set of points within the rectangular prisms which represent the 2 square face plates 244.

Referring to FIGS. 25-28, shown are 2 examples in which the connectable cuboid 216 has a volume bounded by 2 level set surfaces, and which is defined herein as a connectable cuboid bounded solid 225 version of the connectable cuboid 216. The connectable cuboid constant thickness solid 224 has, in general, a variable wall thickness $t_{wall}$. For example, FIGS. 25 and 27 show the connectable cuboid constant thickness solid 224 having a first wall thickness $t_{wall-1}$ at a first location, and a second wall thickness $t_{wall-2}$ at a second location. In FIGS. 26 and 28, the volume of each of the reference unit cell meshes 300 is comprised of polyhedrons (i.e., solid elements 308), such as tetrahedrons, hexahedrons, pentahedrons, or a mixture thereof. For FIGS. 25-28, step 704 comprises providing the reference unit cell mesh 300 as polyhedrons connecting cell mesh nodes 304, wherein the cell mesh nodes 304 have coordinates given by a set of points. The set of points of the cell mesh nodes 304 are some subset of the union of the set of points which satisfy the above-listed equation 604 and the set of points within the rectangular prisms which represent the two face plates 244.

FIGS. 25 and 26 respectively show a connectable cuboid bounded solid geometry 225 and corresponding reference unit cell mesh 300 having a volume bounded by level set surfaces of a=0.4 and b=0.4, with reference to equation 604. FIGS. 27 and 28 respectively show a connectable cuboid bounded solid geometry 225 and corresponding reference unit cell mesh 300, having a volume bounded by level set surfaces of a=0.1 and b=0.1. However, a reference unit cell mesh 300 of a connectable cuboid bounded solid 225 can be defined by any one of a variety of different level set surfaces, wherein a and b are positive real-valued constants.

Figure 53:
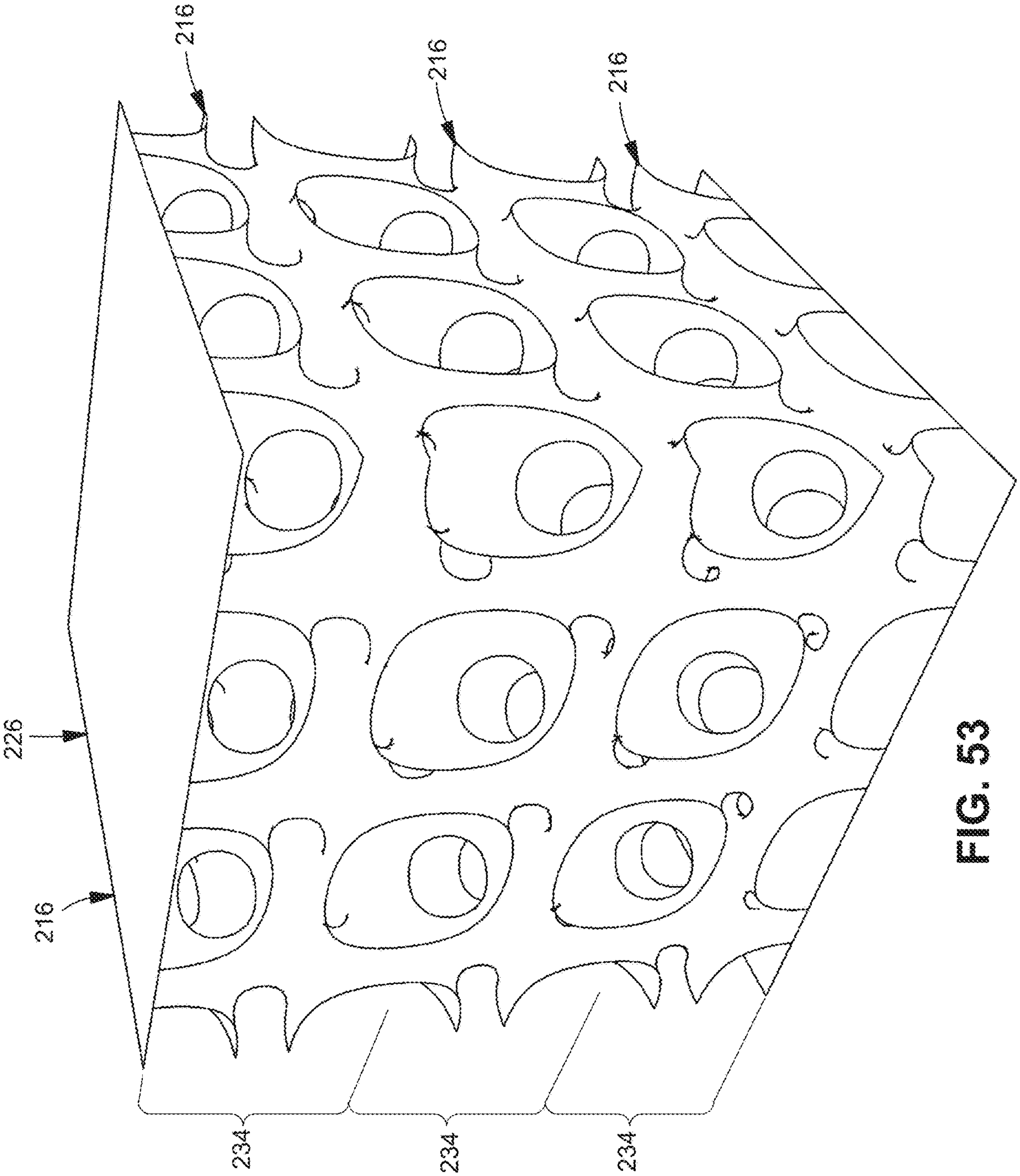
FIG. 53 is a perspective view of an example of the connectable cuboid surface in a multi-layer unit cell geometry.
Figure 54:
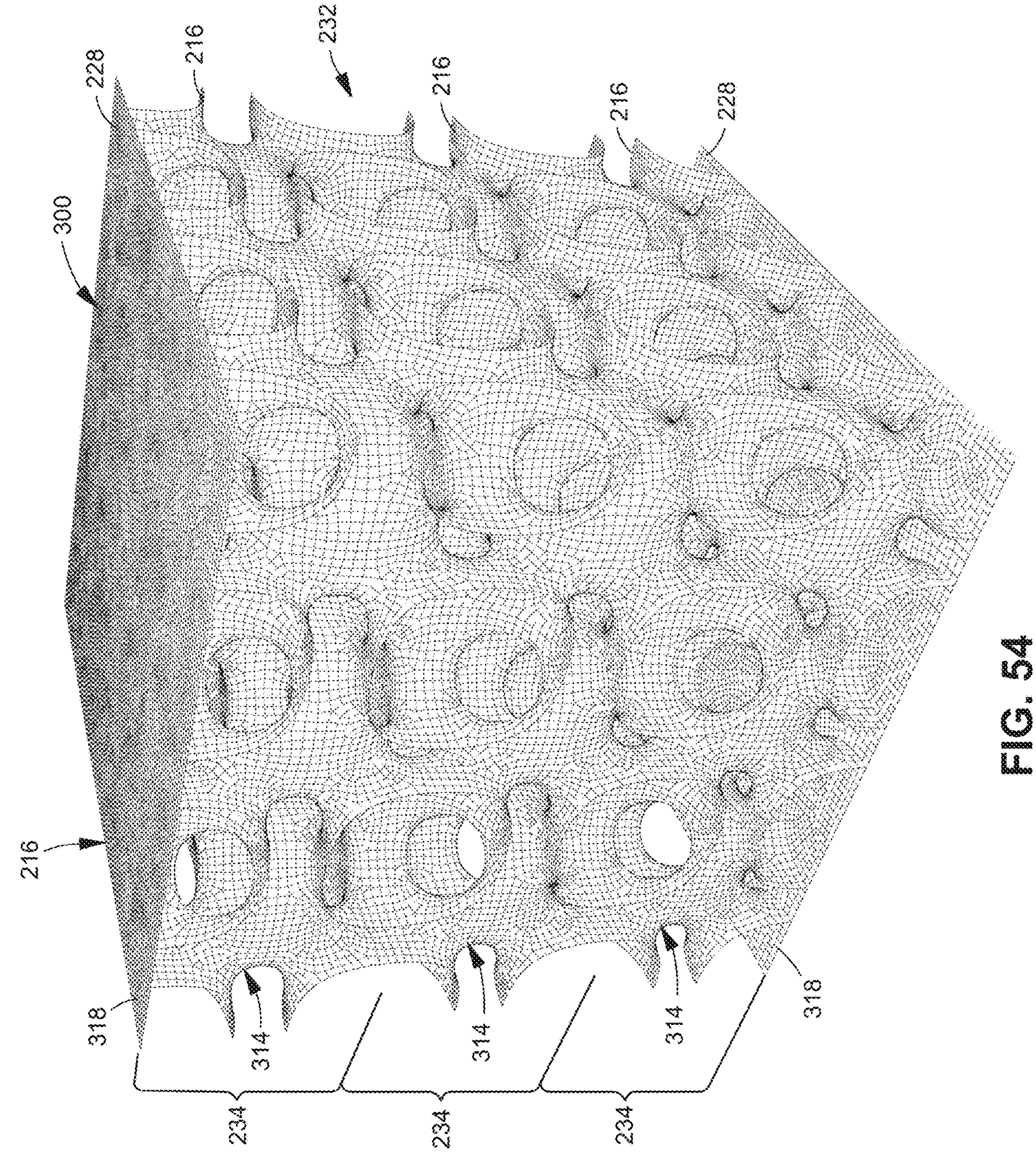
FIG. 54 shows an example of a reference unit cell mesh, comprised of shell elements, which corresponds to the geometry shown in FIG. 53.
Figure 55:
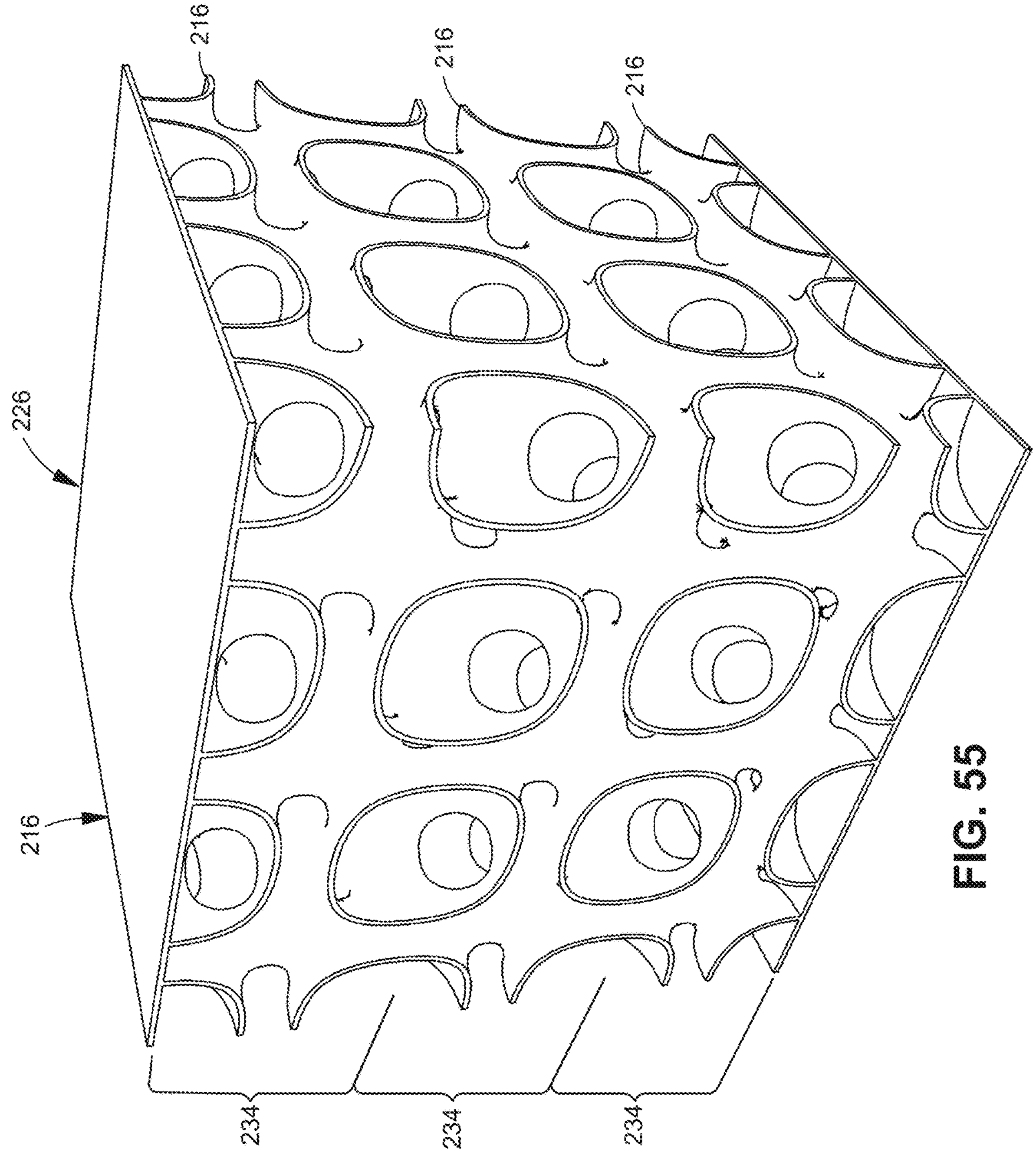
FIG. 55 is a perspective view of an example of the connectable cuboid constant thickness solid in a multi-layer unit cell geometry.
Figure 56:
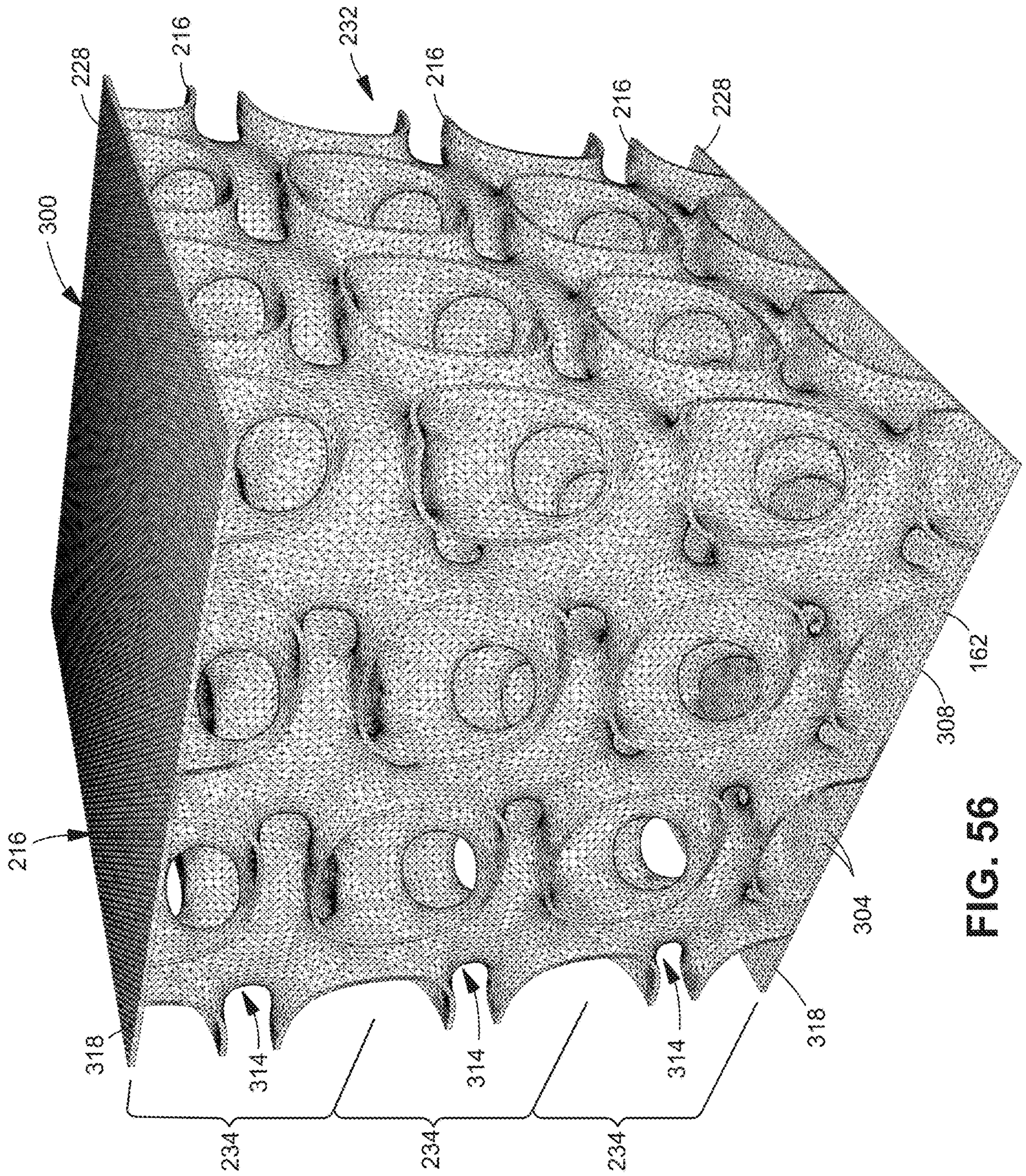
FIG. 56 shows an example of a reference unit cell mesh, comprised of solid elements, which corresponds to the geometry shown in FIG. 55.

Referring briefly to FIGS. 53-56, the connectable cuboid 216 reference unit cell mesh 300 can also be provided in a multi-layer unit cell geometry 226, represented by a multi-layer unit cell mesh 228 (FIGS. 54 and 56). In this regard, step 704 of the method 700 comprises providing the reference unit cell mesh 300 as a multi-layer unit cell mesh 228 comprised of two or more layers 234 of unit infill meshes 314 stacked on top of each other, and a pair of unit face sheet meshes 318 respectively located on opposite ends of the multi-layer unit cell mesh 228. The multi-layer unit cell mesh 228 is comprised of a multi-layer unit infill mesh 232 interconnecting the face sheet meshes 318 respectively on the top and bottom of the multi-layer unit infill mesh 232.

In the example of FIGS. 54 and 56, the multi-layer unit infill mesh 232 is comprised of 3 layers 234 of unit infill meshes 314. Each of the unit infill meshes 314 in each layer 234 has a connectable cuboid 216 configuration as described above, which is triply periodic. Each layer 234 contains 3 rows of the unit infill meshes 314 in the η direction, and each row contains 3 unit infill meshes 314 in the ξ direction of the unit cube 202 (e.g., FIG. 11). The main axes 212 (e.g., FIG. 28) of the unit infill meshes 314 are aligned with each other. Each unit infill mesh 314 is periodic in the ζ direction of the unit cube 202, allowing the unit infill meshes 314 to be interconnected via stitching, as described below.

A multi-layer unit cell geometry 226 can be provided in alternative configurations, and is not limited to the configuration shown in FIGS. 53-56. For example, a multi-layer unit cell geometry 226 can include 2 or more layers 234 of unit infill meshes 314 stacked on top of each other. Each layer 234 can include 1 or more rows of unit infill meshes 314 in the η direction (FIG. 11), and each row can include a corresponding number of unit infill meshes 314 in the ζ direction (FIG. 11).

FIG. 53 shows the connectable cuboid surface 223 in a multi-layer unit cell geometry. FIG. 54 shows a multi-layer unit cell mesh 228 that corresponds to the multi-layer unit cell geometry 226 of FIG. 53. In this example, the multi-layer unit cell mesh 228 is an infinitely thin surface represented by shell elements 306 (i.e., polygons), such as triangles and/or quadrilaterals, similar to the arrangement described above for FIG. 13.

Referring to FIGS. 55-56, shown in FIG. 55 is an example of a connectable cuboid constant thickness solid 224 in a multi-layer unit cell geometry 226. FIG. 56 shows a multi-layer unit cell mesh 228 that corresponds to the connectable cuboid constant thickness solid 224 of FIG. 55. In FIG. 56, the reference unit cell mesh 228 is comprised of solid elements 308 (e.g., tetrahedrons, hexahedrons, pentahedrons, etc.), and has a volume defined by a dilatation of the mid-surfaces of the multi-layer unit cell geometry 226, as described above, and combined with trimming and joining operations, resulting in the multi-layer unit cell mesh 228 having a constant wall thickness $t_{wall}$ (FIG. 16), similar to the arrangement described above for FIGS. 16-17. Although not shown, a multi-layer unit cell mesh 228 may also be provided in an arrangement representing a connectable cuboid bounded solid 225 having a volume that is bounded by 2 level set surfaces, and which would result in the multi-layer unit cell mesh 228 having, in general, a variable wall thickness $t_{wall}$, similar to the arrangement described above for FIGS. 25-28.

As mentioned above, the connectable cuboid 216 reference unit cell mesh 300 is triply periodic, such that the cell mesh nodes 304 are in the set $\mathbb{T}^3$. In this regard, the reference unit cell mesh 300 is periodic in the ξ, η and ζ directions (i.e., the principal directions) of the unit cube 202 of FIG. 11, with the pattern of cell mesh nodes 304 on the square face at ξ=1 being the same as the pattern of cell mesh nodes 304 on the square face at ξ=−1, and the pattern of cell mesh nodes 304 on the square face at η=1 being the same as the pattern of cell mesh nodes 304 on the square face at η=−1, and the pattern of cell mesh nodes 304 on the square face at ζ=−1 being the same as the pattern of cell mesh nodes 304 on the square face at ζ=1.

Figure 57:
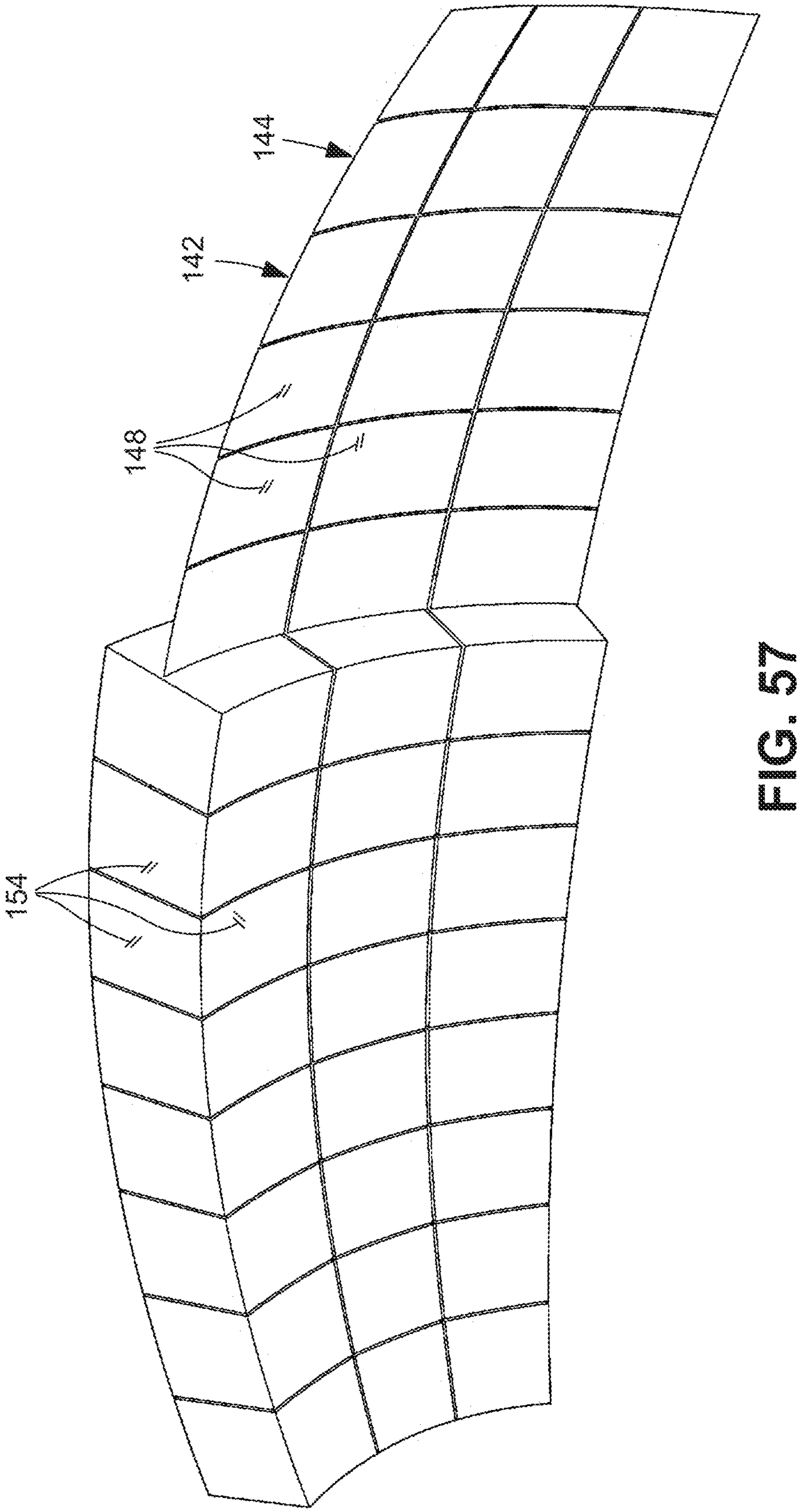
FIG. 57 is a perspective view of an example of a driver mesh that is doubly curved, and in which the right-half of the image illustrates quadrilateral elements of the driver mesh, and the left-half of the image illustrates some of the hexahedral elements associated with the quadrilateral elements of the driver mesh.

Referring again to the flowchart of FIG. 8, step 706 of the method 700 comprises mapping a plurality of the reference unit cell meshes 300 respectively onto the plurality of hexahedral elements 154 (e.g., FIG. 32) respectively associated with the plurality of quadrilateral elements 148 of the driver mesh 142 (e.g., FIG. 10), through the use of basis functions defined on each of the plurality of quadrilateral elements 148. The process of mapping via the basis functions is performed in a manner causing the adjustment of the size and shape of the plurality of reference unit cell meshes 300 to conform respectively to the size and shape of the plurality of hexahedral elements 154 (FIG. 32), and resulting in a plurality of mapped unit cell meshes 302 (FIG. 35) that respectively fit within the plurality of hexahedral elements 154 (FIG. 57) associated with each of the plurality of quadrilateral elements 148 of the driver mesh 142 (FIGS. 5, 10 and 57).

Figure 43:
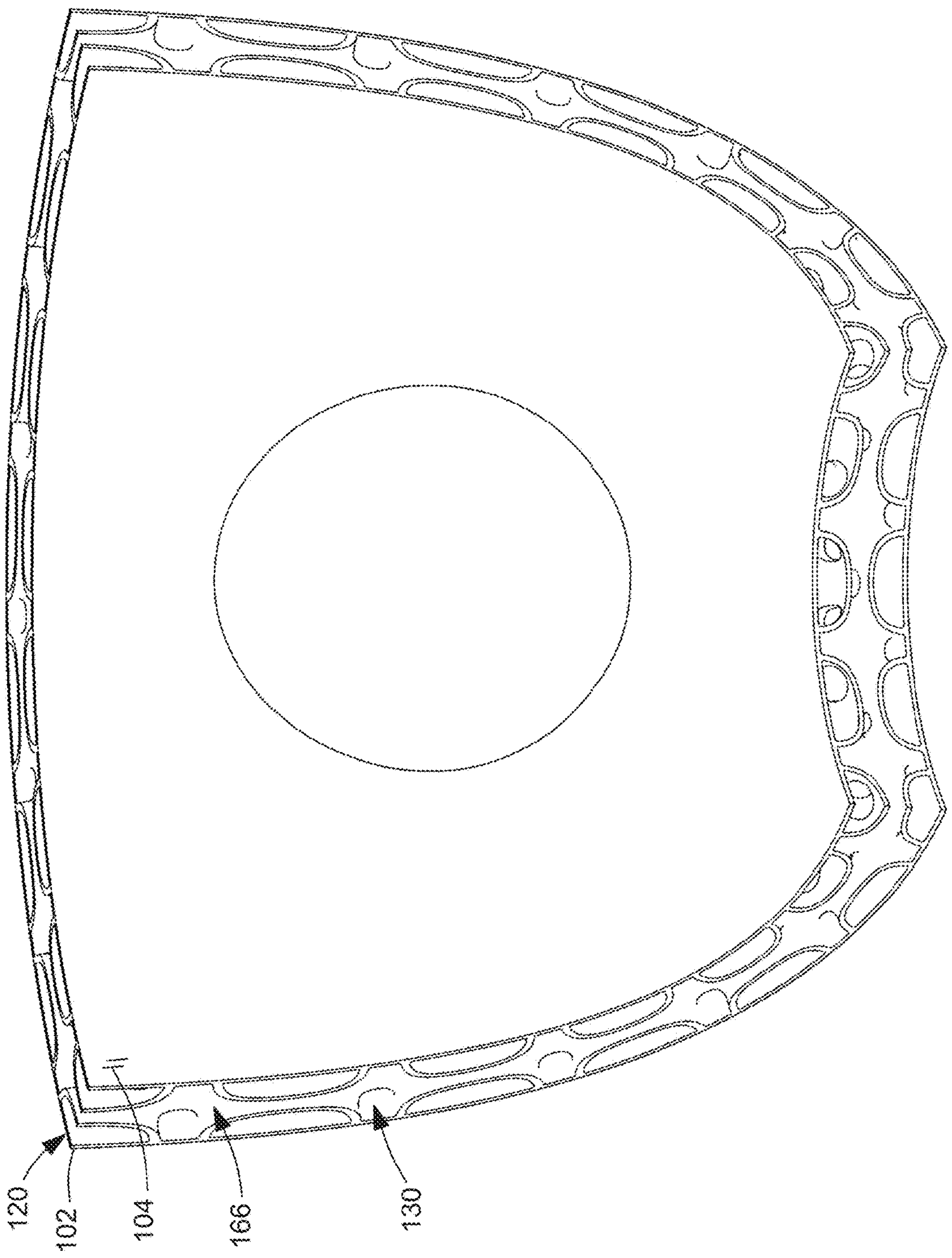
FIG. 43 is a perspective view of an example of a sandwich panel.
Figure 48:
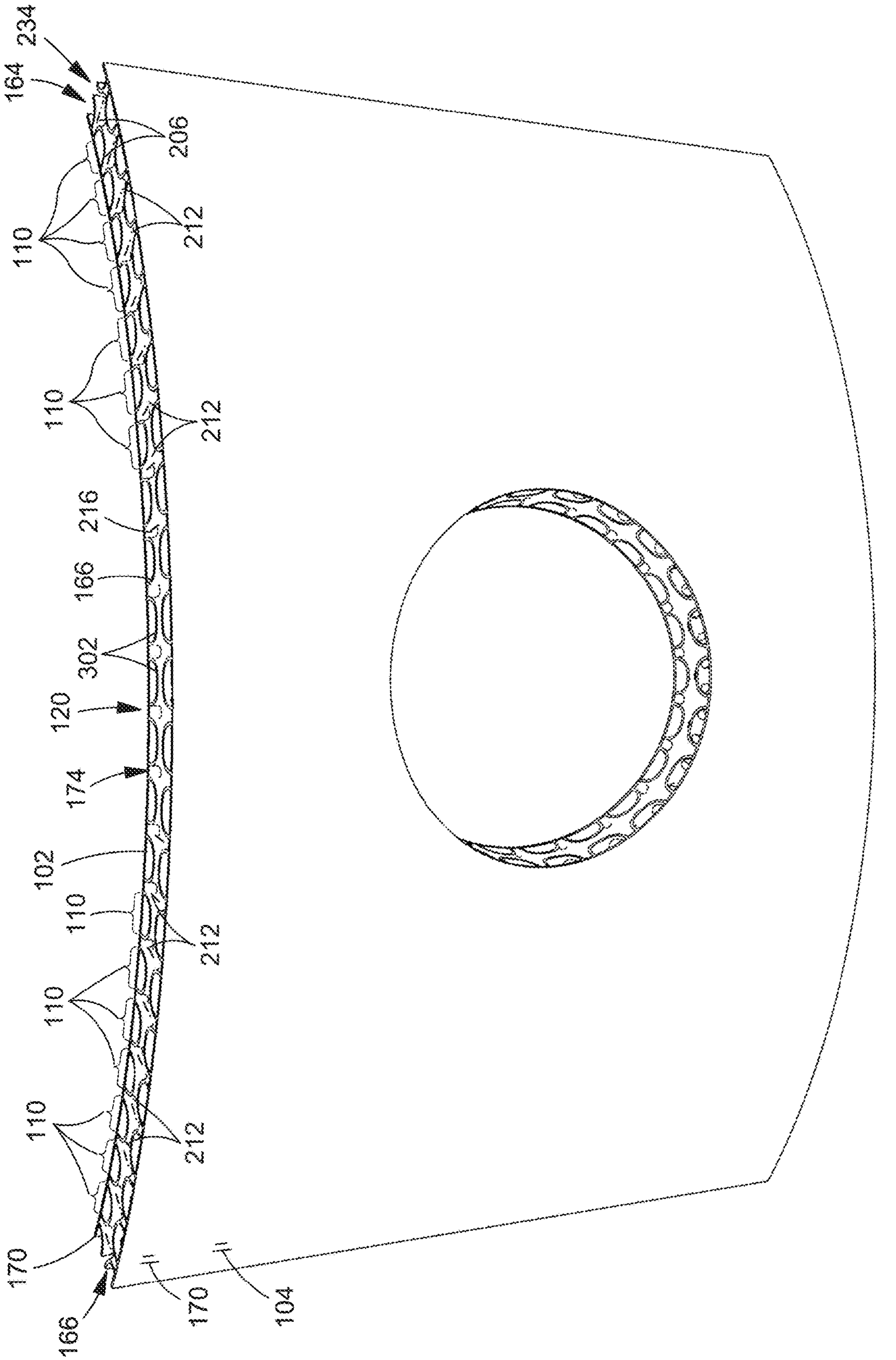
FIG. 48 is a perspective view of a sandwich panel comprised of a plurality of unit cell meshes in the connectable cuboid configuration, mapped onto the hexahedral elements respectively associated with the quadrilateral elements of the driver mesh of FIG. 10.

After mapping is complete, the result is a panel infill geometry 166 comprised of a plurality of mapped unit infill meshes 314 interconnecting the first face sheet 102 to the second face sheet 104 (e.g., FIGS. 6, 43 and 48). Due to the triply periodic nature of the connectable cuboid 216, the mapped unit infill meshes 314 can be stitched together to form a continuous stitched mesh 130 (e.g., FIGS. 6, 43 and 48), as described below. Advantageously, the presently-disclosed mapping process results in a consistent footprint (i.e., having the same topology) at the infill/face sheet interfaces 110 (FIGS. 7, 43 and 48) between the panel infill geometry 166 and the first and second face sheets 102, 104.

Figure 29:
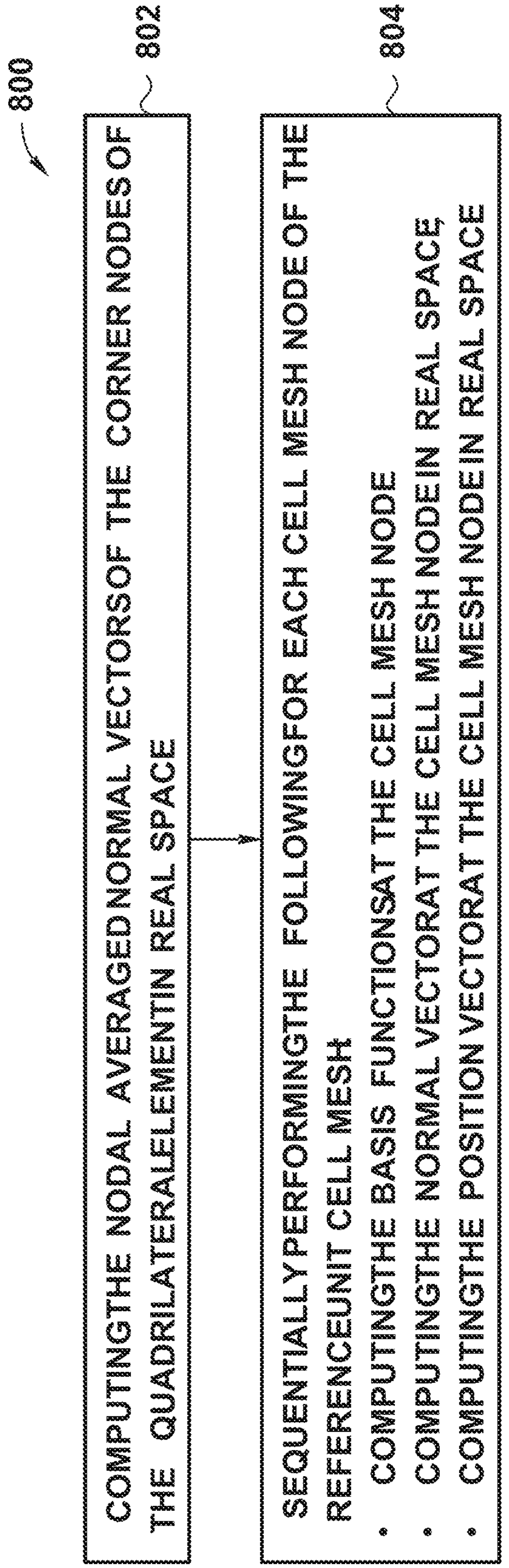
FIG. 29 is a flowchart of operations included in a method of mapping a reference unit cell mesh onto a hexahedral element associated with a linear quadrilateral element of a driver mesh.
Figure 31:
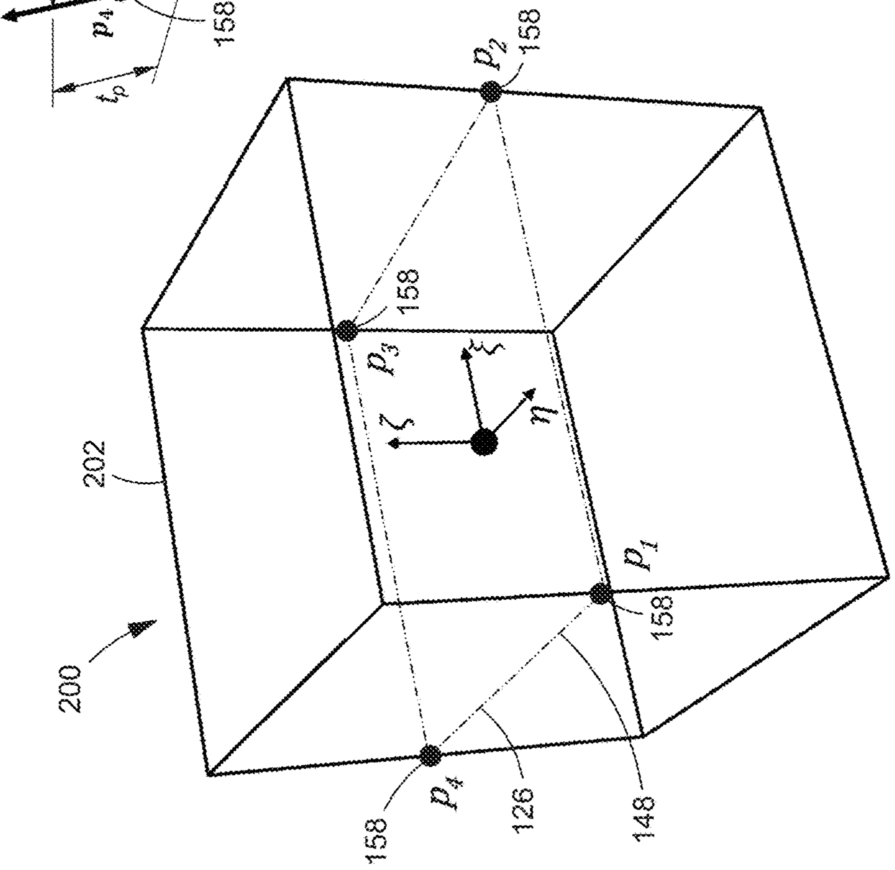
FIG. 31 shows an example of a 2×2×2 unit cube in isoparametric space.
Figure 33B:
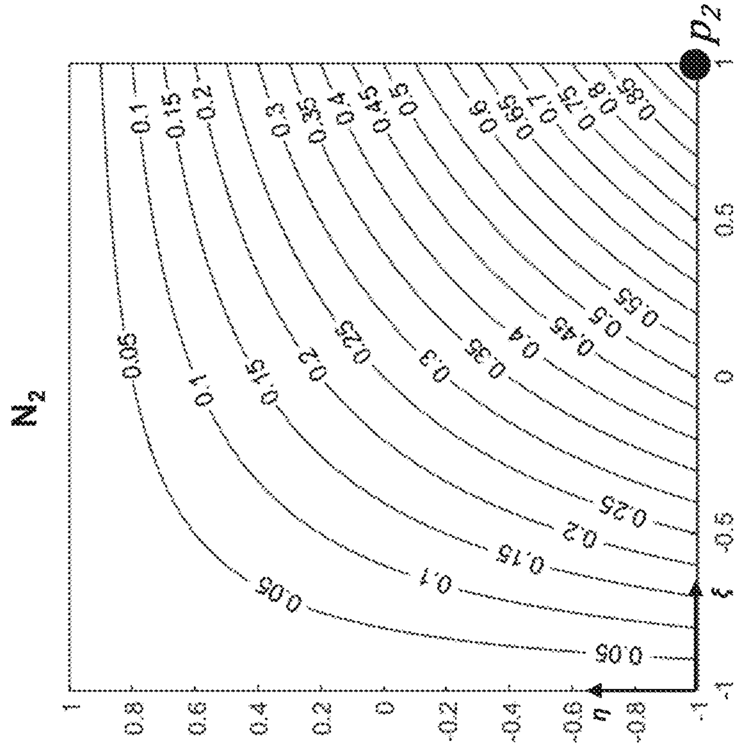
FIG. 33B shows a plurality of level set contours of a basis function defined on a second corner node of the 4-noded linear quadrilateral element.
Figure 33A:
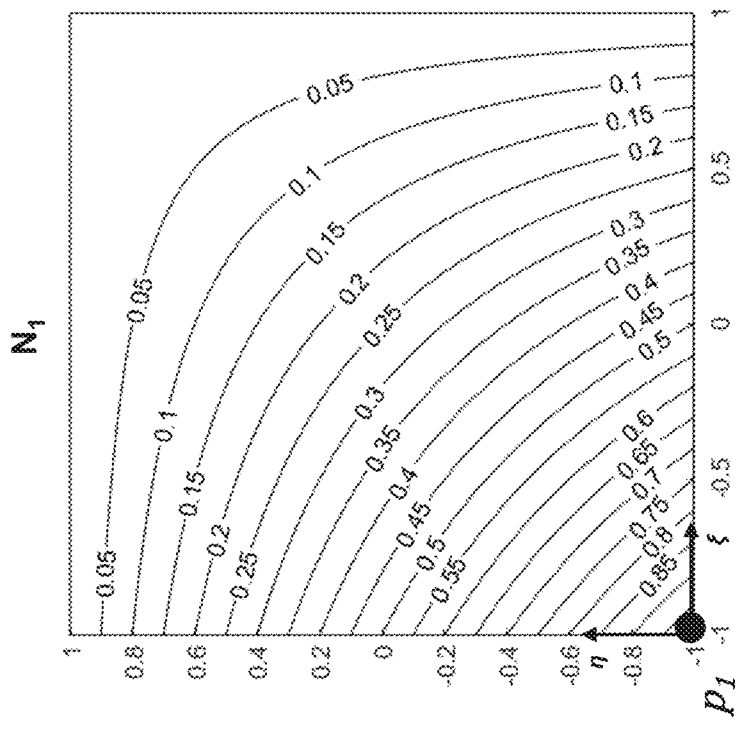
FIG. 33A shows a plurality of level set contours of a basis function defined on a first corner node of a 4-noded linear quadrilateral element.
Figure 33D:
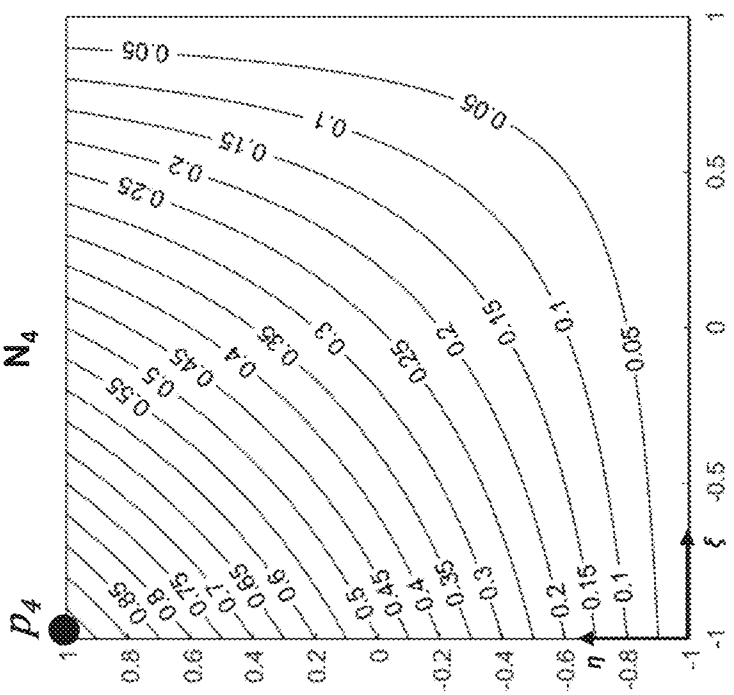
FIG. 33D shows a plurality of level set contours of a basis function defined on a fourth corner node of the 4-noded linear quadrilateral element.
Figure 33C:
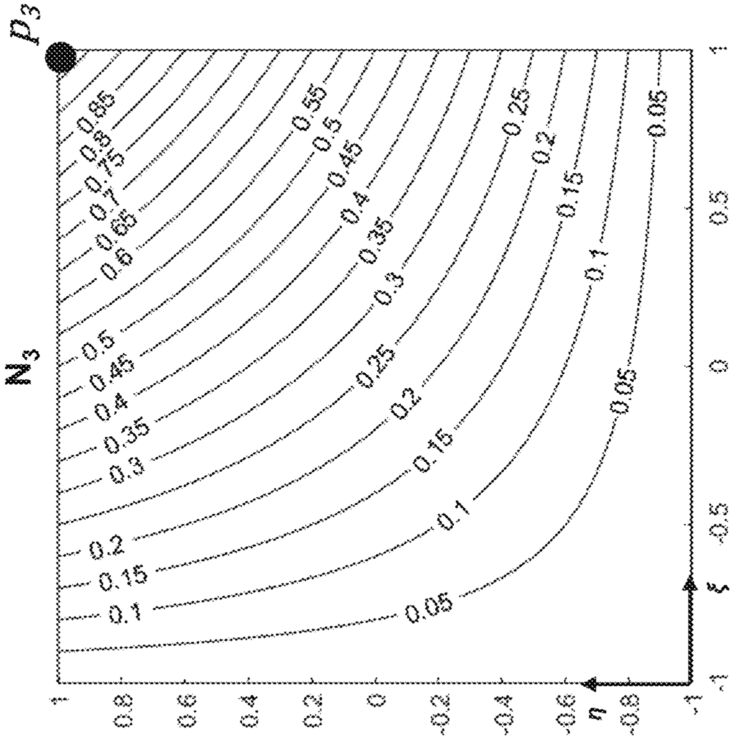
FIG. 33C shows a plurality of level set contours of a basis function defined on a third corner node of the 4-noded linear quadrilateral element.

Referring to FIGS. 29-35, step 706 of mapping a reference unit cell mesh 300 will now be described with reference to the method 800 of FIG. 29. Method 800 is directed toward mapping a reference unit cell mesh 300 (e.g., FIGS. 13, 17, 26, 28, 54 and 56) onto the hexahedral elements 154 (FIG. 32) associated with linear quadrilateral elements 150. FIG. 30 shows a portion of a driver mesh 142 comprised of linear quadrilateral elements 150. As mentioned above, each linear quadrilateral element 150 has 4 corner nodes 158, which are identified in FIG. 30 as $p_1 \ldots p_4$, in real space 140. FIG. 31 shows a unit cube 202 in isoparametric space 200, and the corresponding location of nodes $p_1 \ldots p_4$ on the unit cube 202.

Figure 32:
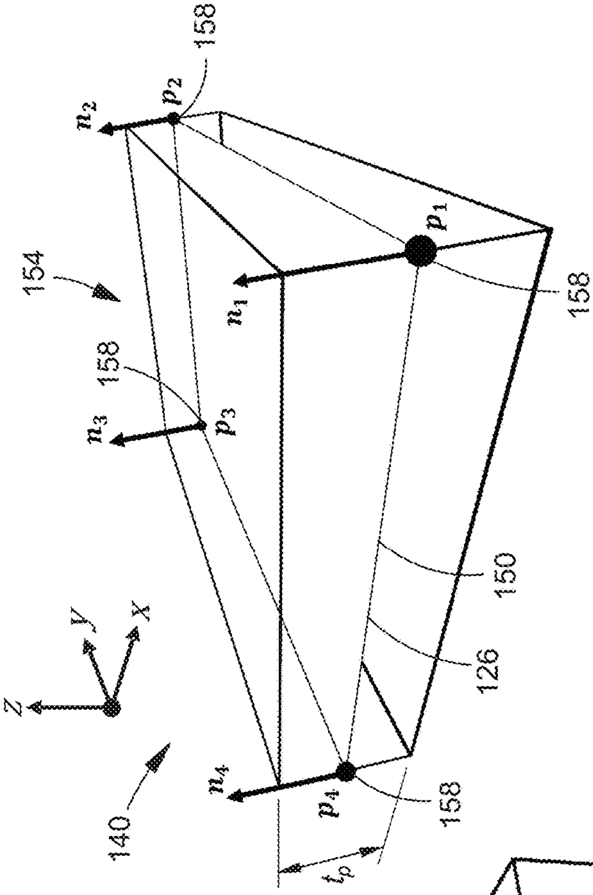
FIG. 32 shows an example of the unit cube of FIG. 31 mapped onto the hexahedral element associated with the linear quadrilateral element of FIG. 30.

FIG. 32 shows a hexahedral element 154 associated with the linear quadrilateral element 150 of FIG. 30. The height or thickness of the hexahedral element 154 (e.g., at each corner node $p_1 \ldots p_4$) is the local panel thickness $t_p$ for the sandwich panel 120, which is specified (e.g., FIG. 63) prior to initiating the mapping process. The sandwich panel 120 can be a constant-thickness sandwich panel 120 (e.g., FIG. 48). Alternatively, the sandwich panel 120 can be a variable-thickness sandwich panel (not shown), in which case the local panel thickness $t_p$ is different in at least two locations on at least one of the quadrilateral elements 148 of the driver mesh 142.

Figure 34:
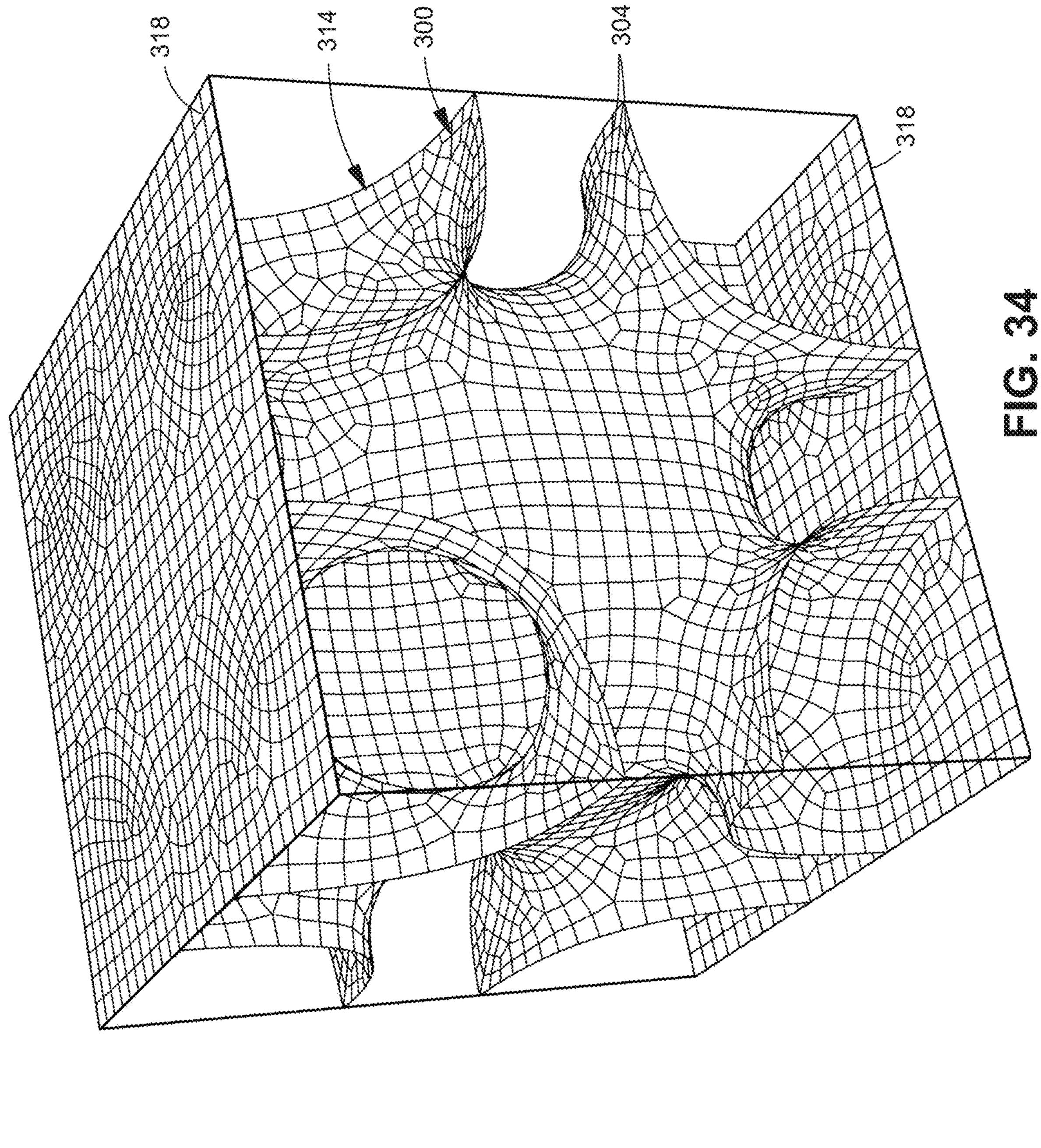
FIG. 34 shows an example of a reference unit cell mesh in the connectable cuboid configuration, fitting exactly within the unit cube of FIG. 31.
Figure 35:
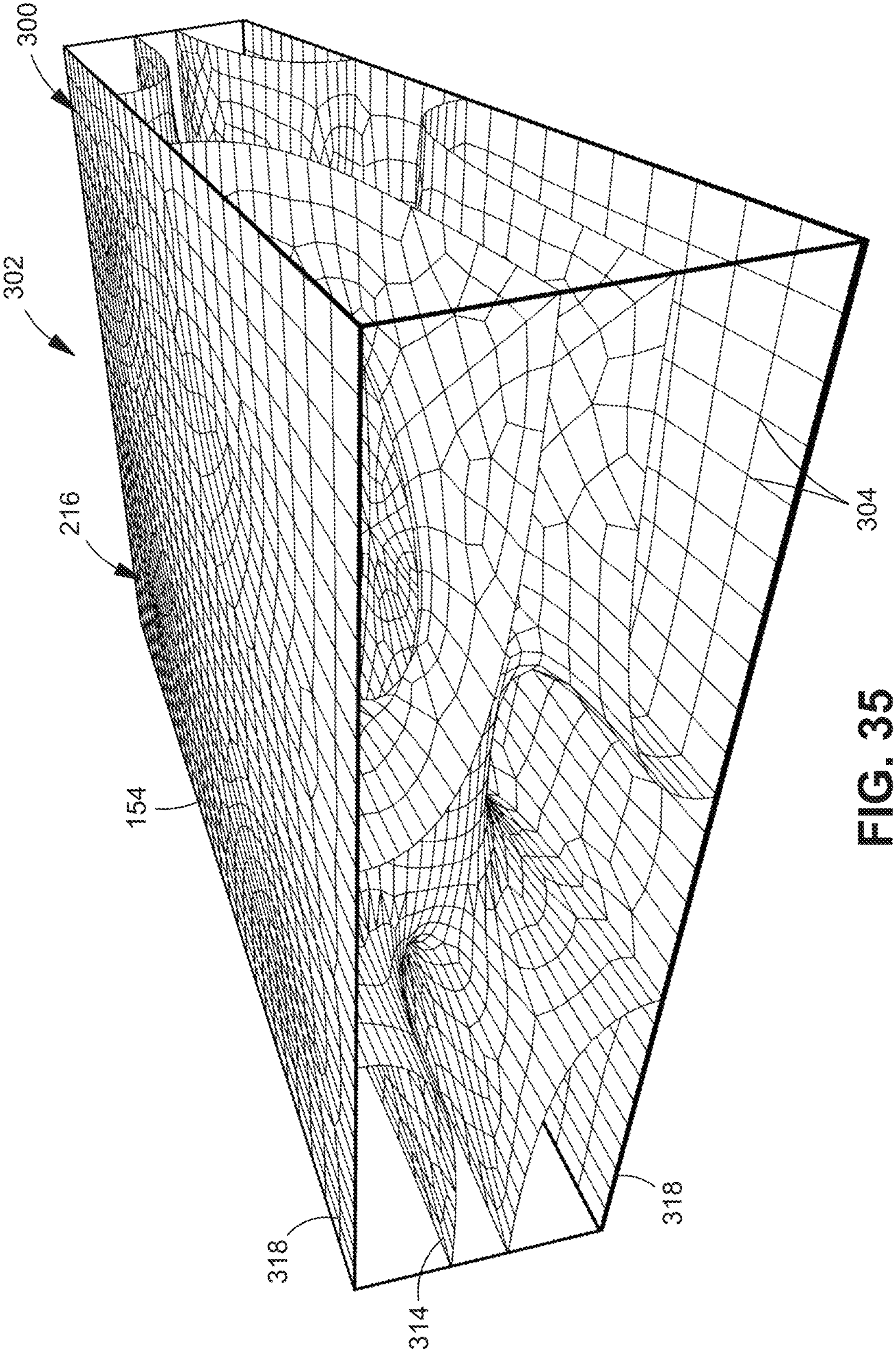
FIG. 35 shows the reference unit cell mesh of FIG. 34 mapped onto the hexahedral element of FIG. 32.

The mapping of a reference unit cell mesh 300 onto a plurality of hexahedral elements 154 respectively associated with the plurality of linear quadrilateral elements 150 (FIG. 30) of a driver mesh 142 (FIG. 30) is performed through the use of linear basis functions defined on the linear quadrilateral element 150. Linear basis functions describe the value of a point of interest within a region, using a weighted combination of values at points around the point of interest. FIGS. 33A-33D show 4 groups of level set contours respectively belonging to the 4 linear basis functions $N_1 \ldots N_4$ defined on a 4-noded linear quadrilateral element 150. The level set contours indicate the weight of a given corner node 158 across the 4-noded linear quadrilateral element 150. FIG. 34 shows the previously described reference unit cell mesh 300, which corresponds to a connectable cuboid surface 223 configuration of a connectable cuboid 216 (e.g., as shown in FIG. 13). FIG. 35 shows the reference unit cell mesh 300 of FIG. 34 after being mapped onto the hexahedral element 154 (e.g., FIG. 32) associated with the linear quadrilateral element 150 of the driver mesh 142 (FIG. 30).

The method of mapping the reference unit cell mesh 300 onto each of the plurality of hexahedral elements 154 respectively associated with the plurality of linear quadrilateral elements 150 in a driver mesh 142 comprises sequentially performing the below-described steps 802 and 804 for each linear quadrilateral element 150 of the driver mesh 142. Step 802 comprises computing the nodal averaged normal vectors $n_1 \ldots n_4$ (FIG. 32) of the corner nodes 158 $p_1 \ldots p_4$ of the linear quadrilateral element 150 in real space 140, using the following equations:

$$n_x = \sum_{i=1}^{k} A_i n_{i_x} \quad \text{(Equation 606)}$$

$$n_y = \sum_{i=1}^{k} A_i n_{i_y} \quad \text{(Equation 608)}$$

$$n_z = \sum_{i=1}^{k} A_i n_{i_z} \quad \text{(Equation 610)}$$

wherein:

k is the number of elements (i.e., linear quadrilateral elements 150) connected to a given corner node 158;

$A_i$ is either the area of the $i^{th}$ connecting element (for area weighted averaged normals) or 1 (for uniformly weighted averaged normals);

$n_{i_x}$, $n_{i_y}$, and $n_{i_z}$ are the x, y and z components of the $i^{th}$ connecting element normal respectively; and $n_x$, $n_y$ and $n_z$ are the x, y and z components of the nodal averaged normal vector respectively.

Step 804 comprises sequentially performing the following computations for each cell mesh node 304 of the reference unit cell mesh 300. Initially, step 804 includes computing the linear basis functions $N_1 \ldots N_4$ of the cell mesh node 304, using the following equations:

$$N_1 = \frac{1}{4}(1-\xi)(1-\eta) \quad \text{(Equation 612)}$$

$$N_2 = \frac{1}{4}(1+\xi)(1-\eta) \quad \text{(Equation 614)}$$

$$N_3 = \frac{1}{4}(1+\xi)(1+\eta) \quad \text{(Equation 616)}$$

$$N_4 = \frac{1}{4}(1-\xi)(1+\eta) \quad \text{(Equation 618)}$$

wherein $\eta$ and $\xi$ (e.g., see FIG. 31) are the coordinates of the cell mesh node 304 in isoparametric space 200.

After computing the linear basis functions $N_1 \ldots N_4$, step 804 comprises computing the normal vector $n=(n_x, n_y, n_z)^T$ of the panel mid-surface 126 at the position of the cell mesh node 304 in real space 140, using the following equations:

$$n_x = \sum_{i=1}^{4} N_i n_{i_x} \quad \text{(Equation 620)}$$

$$n_y = \sum_{i=1}^{4} N_i n_{i_y} \quad \text{(Equation 622)}$$

$$n_z = \sum_{i=1}^{4} N_i n_{i_z} \quad \text{(Equation 624)}$$

wherein $n_{i_x}$, $n_{i_y}$, and $n_{i_z}$ are respectively the x, y, and z components (in the real coordinate system—e.g., FIG. 32) of the nodal averaged normal vectors $n_1 \ldots n_4$ at the nodes $p_1 \ldots p_4$ respectively.

After computing $n_x$, $n_y$, and $n_z$, step 804 comprises computing the position vector $p=(p_x, p_y, p_z)^T$ of the cell mesh node 304 in real space 140, using the following equations:

$$p_x = \sum_{i=1}^{4} N_i p_{i_x} + \frac{1}{2}\zeta n_x t \quad \text{(Equation 626)}$$

$$p_y = \sum_{i=1}^{4} N_i p_{i_y} + \frac{1}{2}\zeta n_y t \quad \text{(Equation 628)}$$

$$p_z = \sum_{i=1}^{4} N_i p_{i_z} + \frac{1}{2}\zeta n_z t \quad \text{(Equation 630)}$$

wherein:

$\zeta$ is the third of the three coordinates (e.g., $\xi$, $\eta$ and $\zeta$ of FIG. 31) defining the location of the cell mesh node 304 in isoparametric space 200 in the direction of the main axis 212;

$p_{i_x}$, $p_{i_y}$, and $p_{i_z}$ are respectively the x, y, and z components (in the real coordinate system) of the position vectors $p_1 \ldots p_4$;

t is the local panel thickness of the sandwich panel 120.

Figure 36:
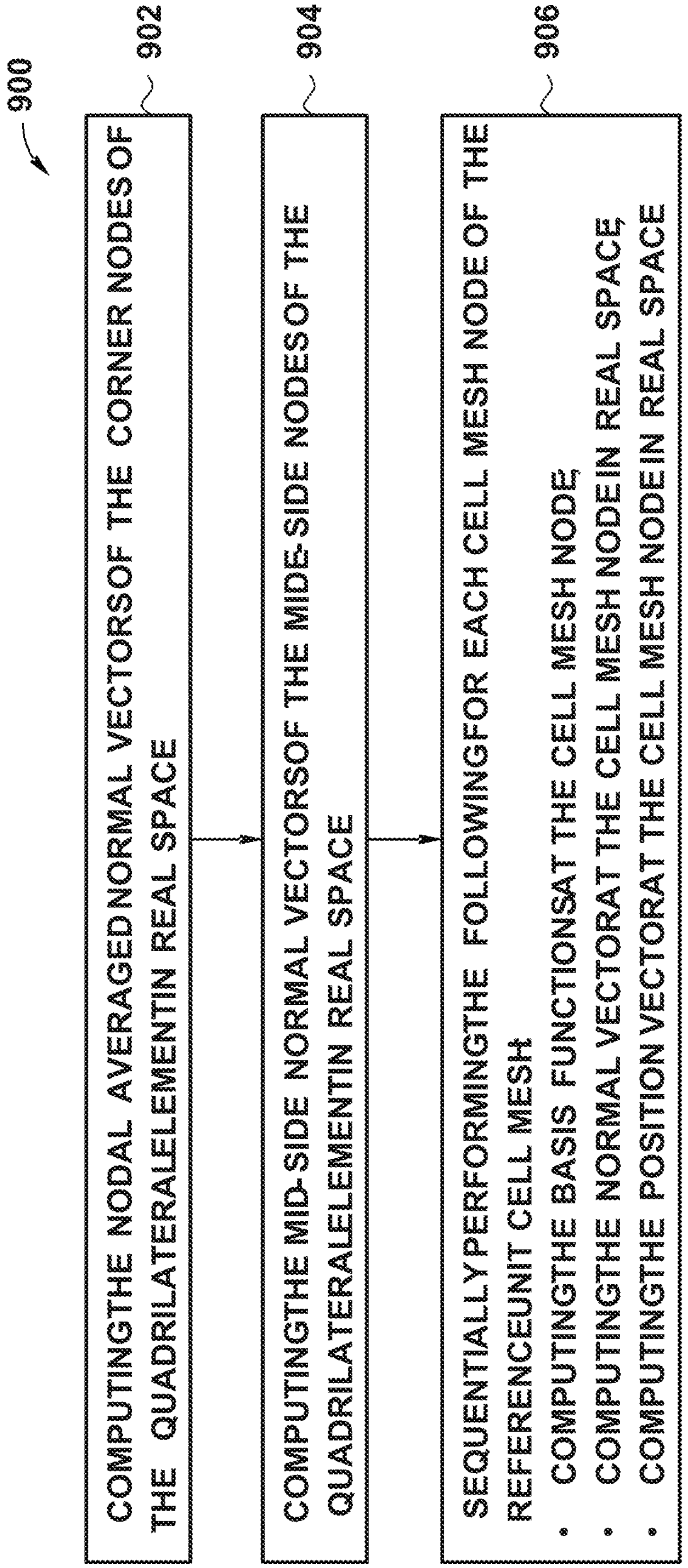
FIG. 36 is a flowchart of operations included in a method of mapping a reference unit cell mesh onto a hexahedral element associated with an 8-noded quadratic quadrilateral element.
Figure 38:
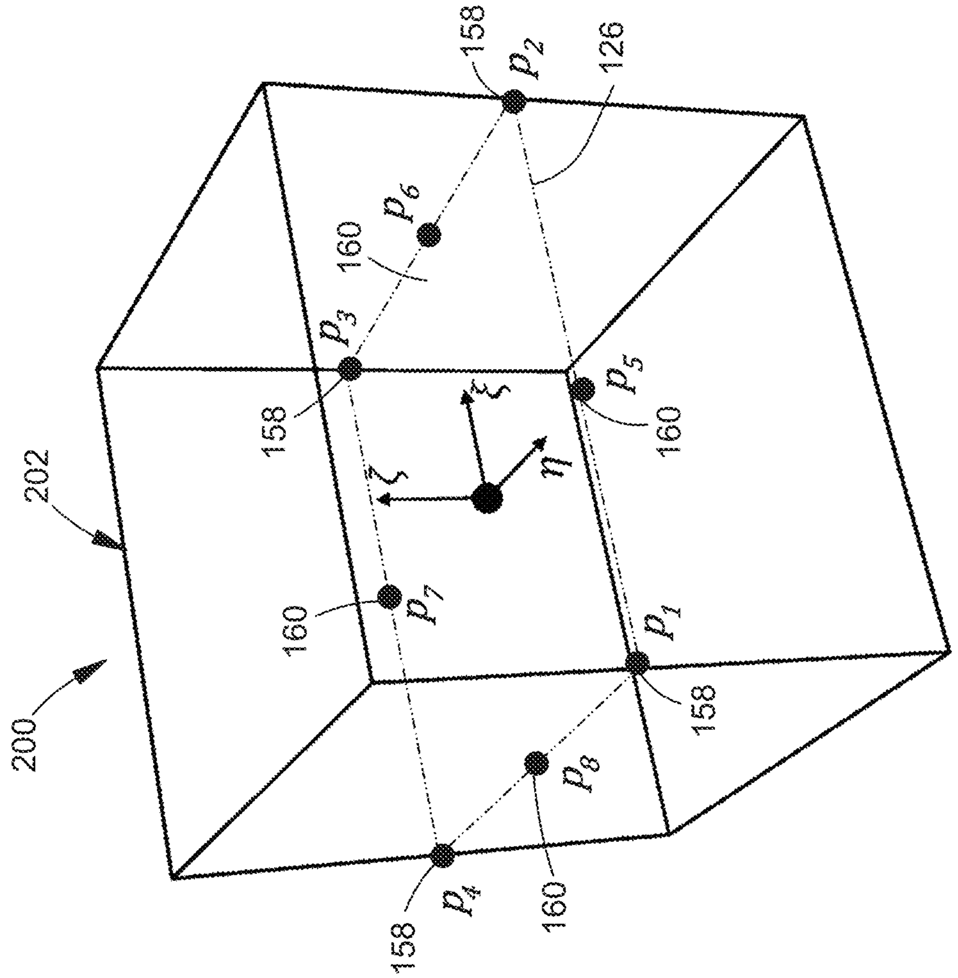
FIG. 38 shows an example of a unit cube in isoparametric space.
Figure 39:
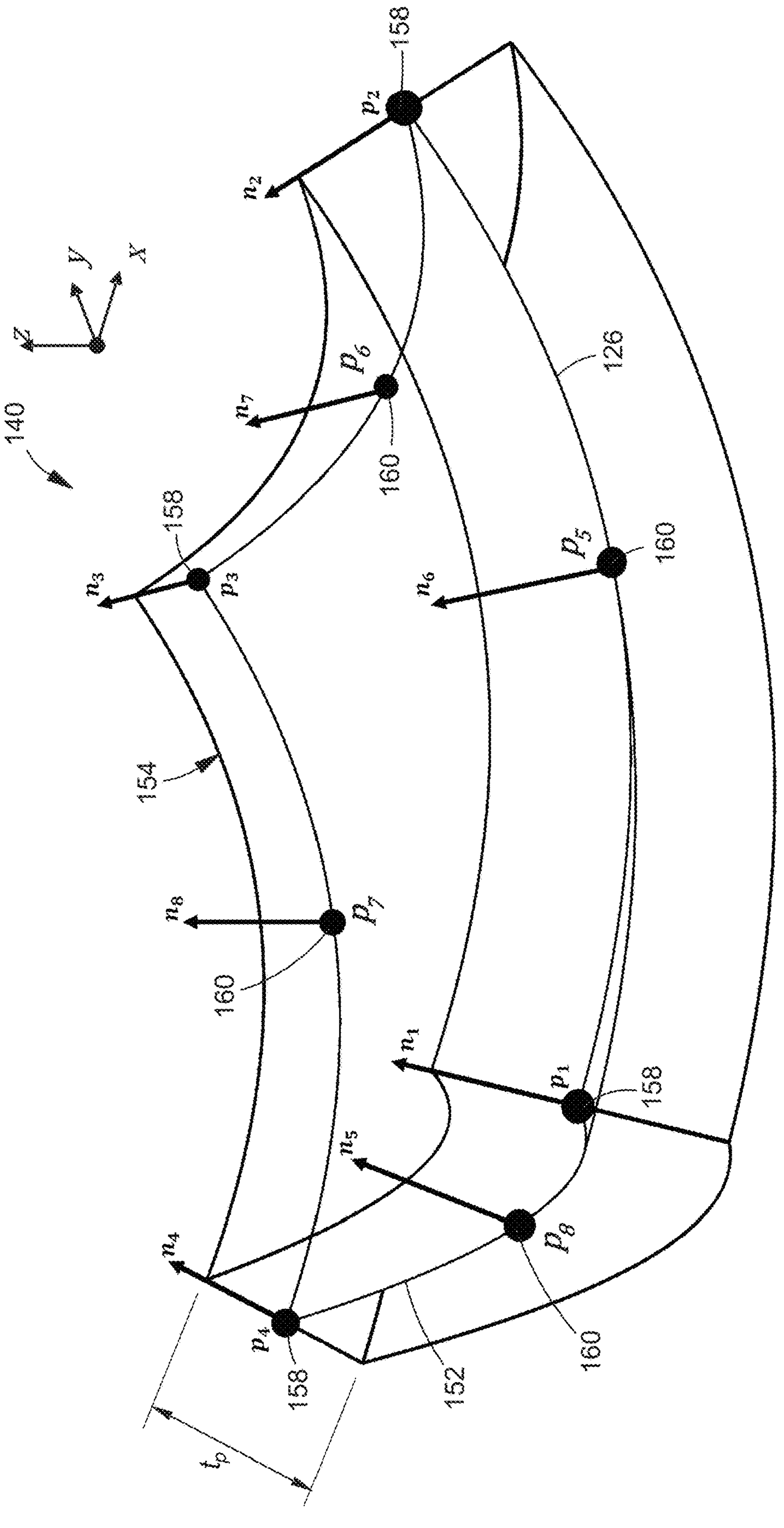
FIG. 39 shows an example of the unit cube of FIG. 38 mapped onto a hexahedral element associated with the quadratic quadrilateral element of FIG. 37.
Figure 40B:
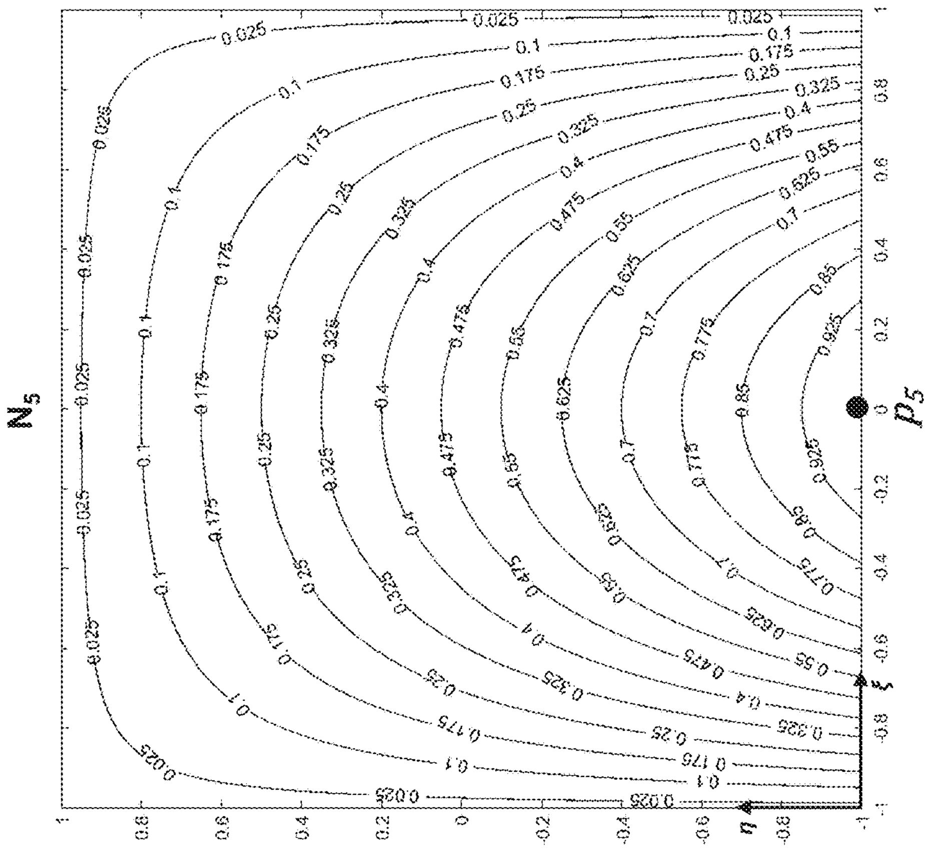
FIG. 40B shows a plurality of level set contours of a basis function defined on a first mid-side node of the 8-noded quadratic quadrilateral element.
Figure 40A:
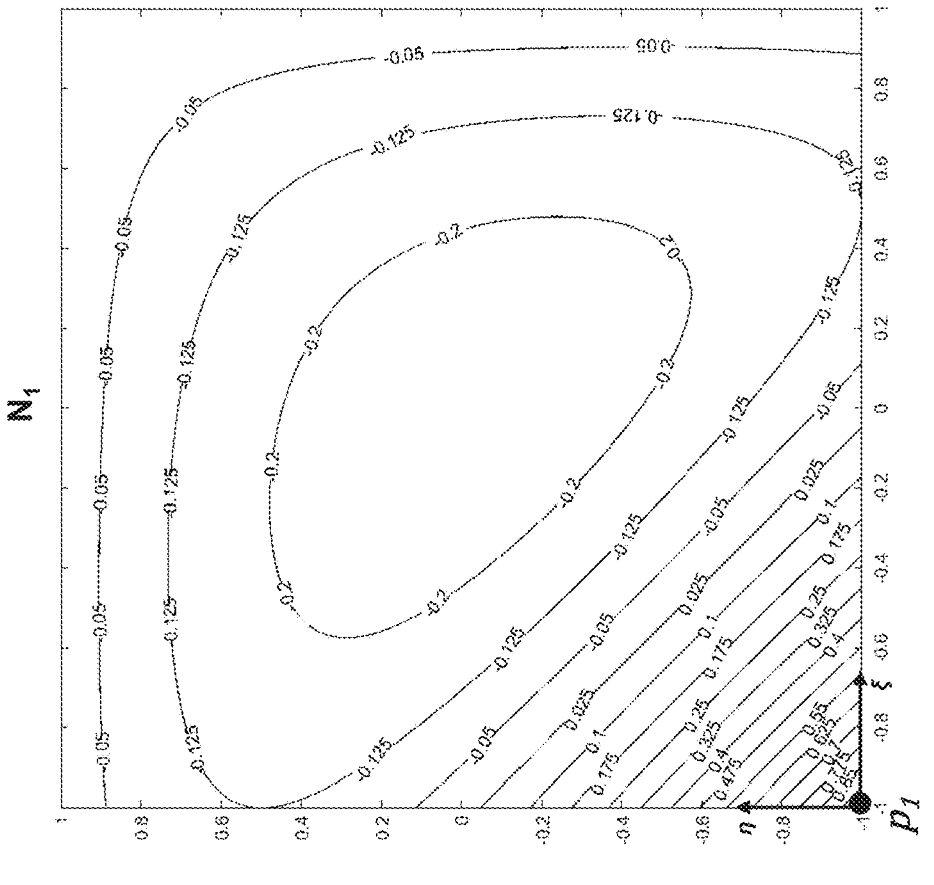
FIG. 40A shows a plurality of level set contours of a basis function defined on a first corner node of an 8-noded quadratic quadrilateral element.
Figure 40D:
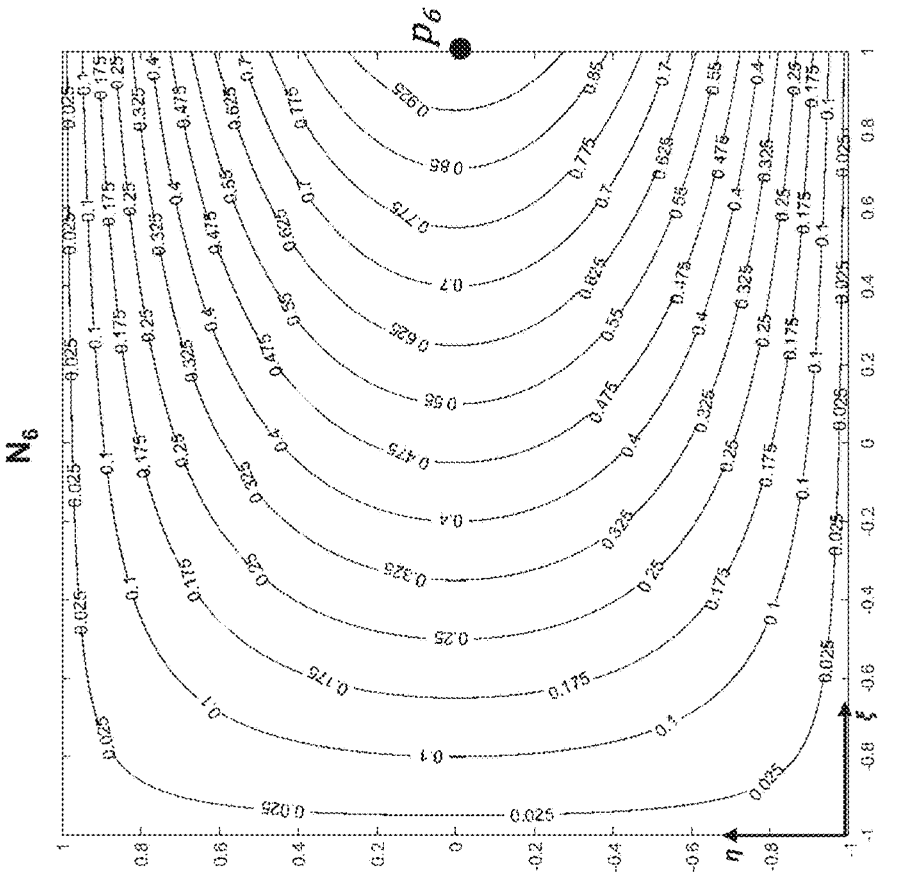
FIG. 40D shows a plurality of level set contours of a basis function defined on a second mid-side node of the 8-noded quadratic quadrilateral element.
Figure 40C:
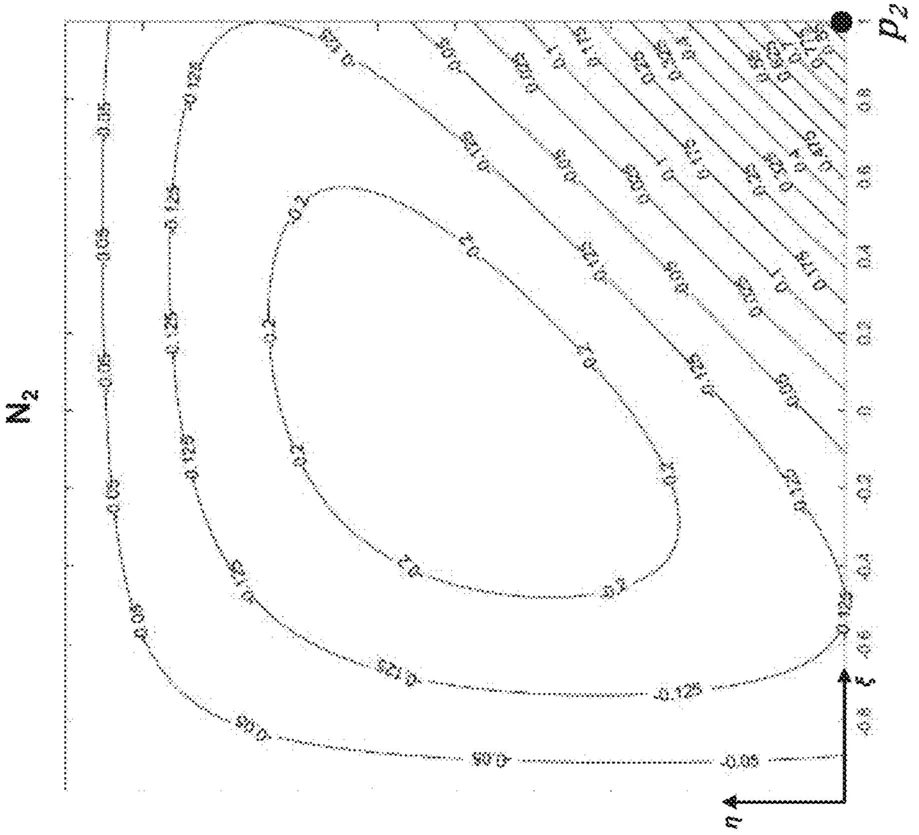
FIG. 40C shows a plurality of level set contours of a basis function defined on a second corner node of the 8-noded quadratic quadrilateral element.
Figure 40E:
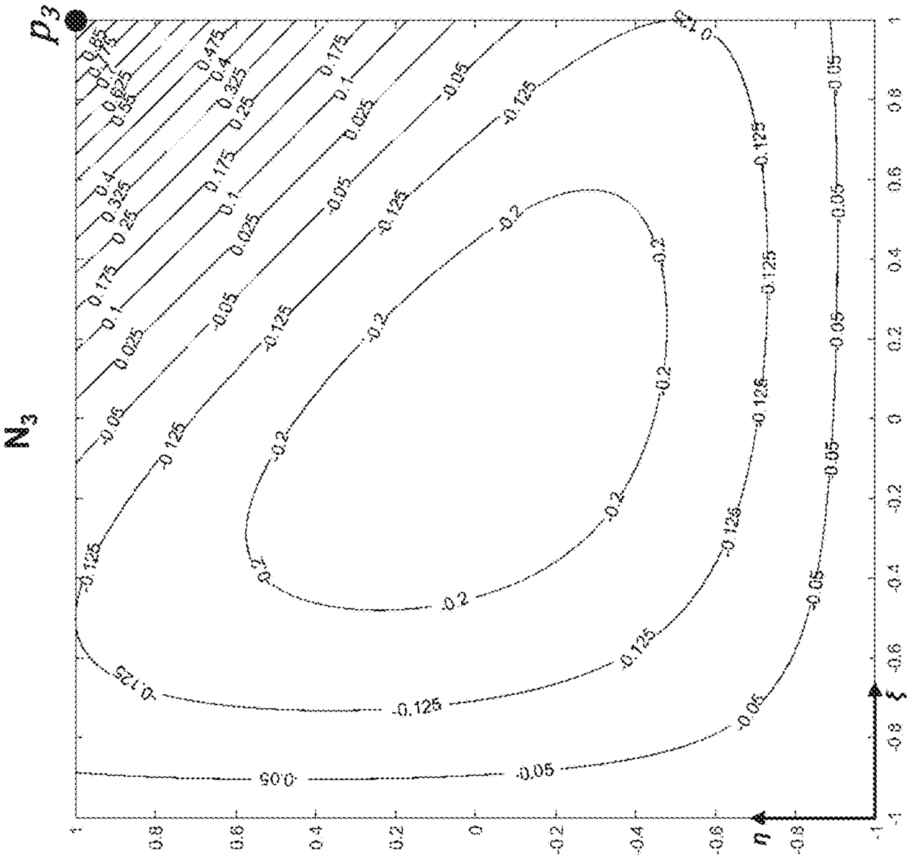
FIG. 40E shows a plurality of level set contours of a basis function defined on a third corner node of the 8-noded quadratic quadrilateral element.
Figure 40F:
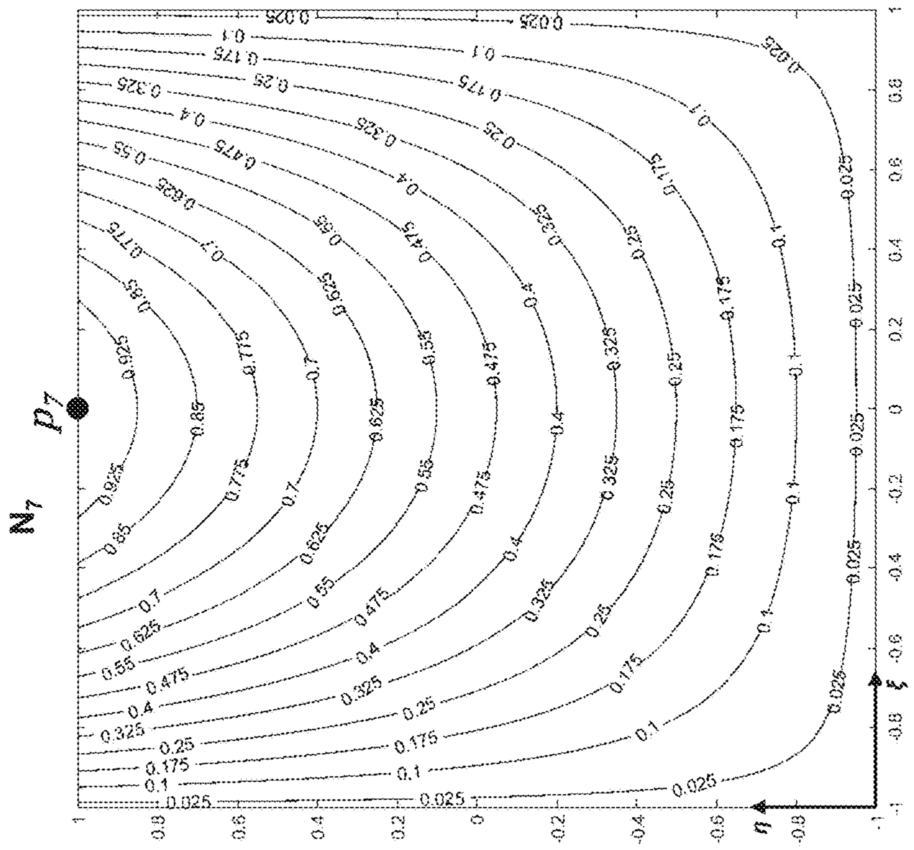
FIG. 40F shows a plurality of level set contours of a basis function defined on a third mid-side of the 8-noded quadratic quadrilateral element.
Figure 40H:
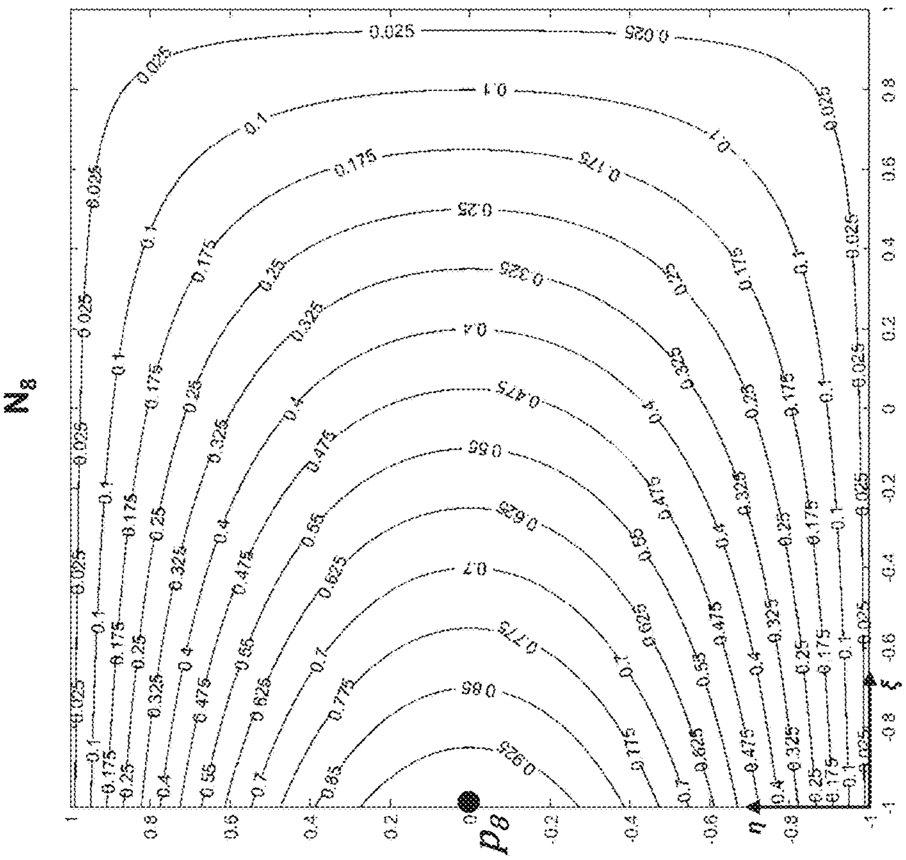
FIG. 40H shows a plurality of level set contours of a basis function defined on a fourth mid-side node of the 8-noded quadratic quadrilateral element.
Figure 40G:
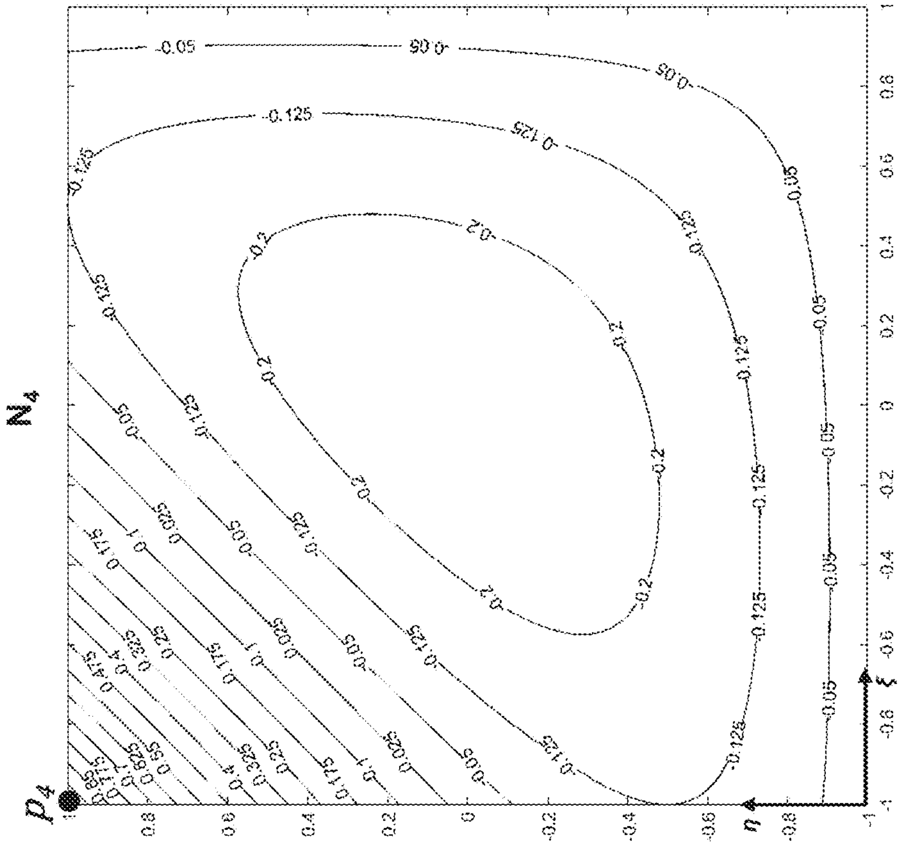
FIG. 40G shows a plurality of level set contours of a basis function defined on a fourth corner node of the 8-noded quadratic quadrilateral element.
Figure 41:
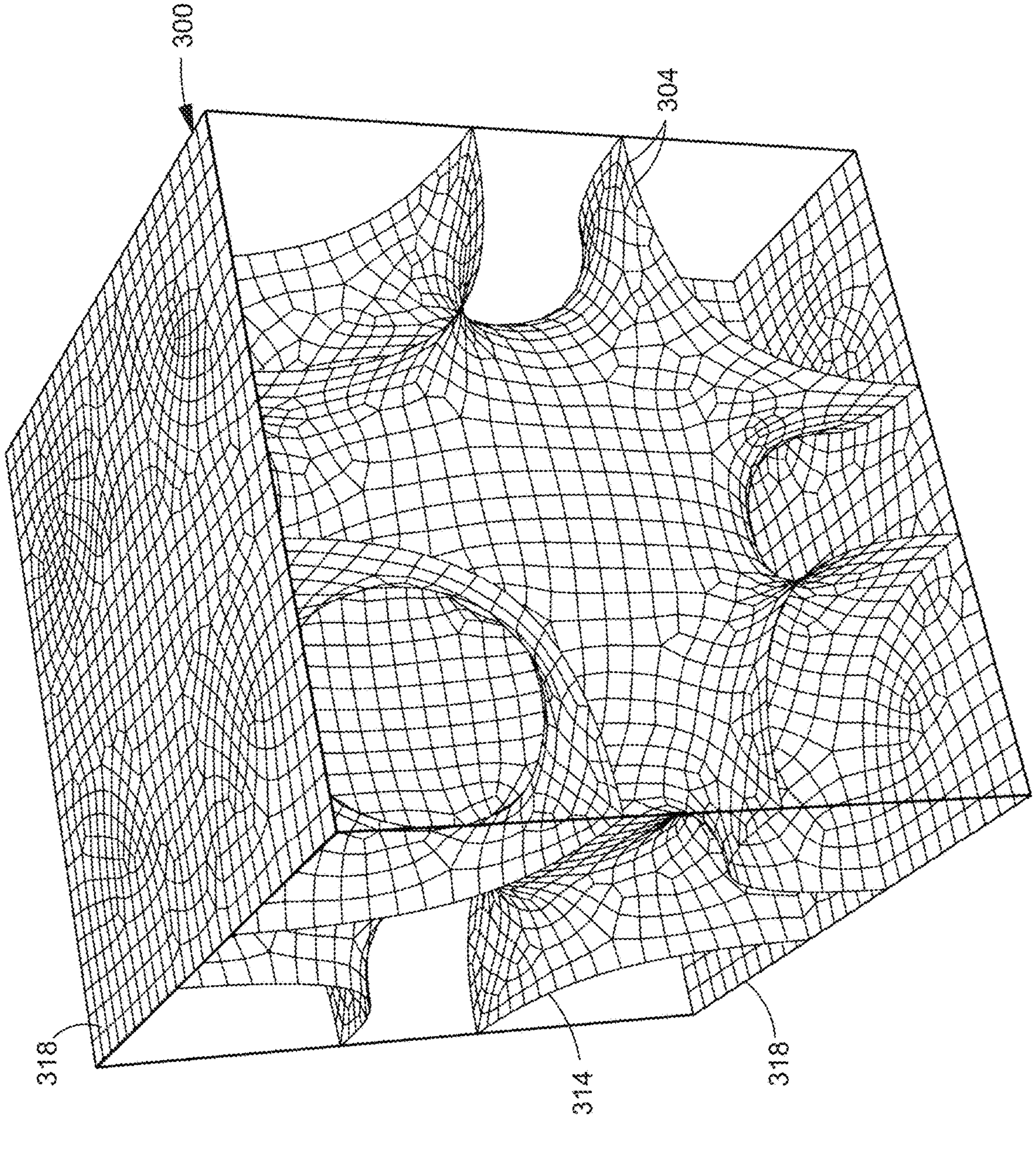
FIG. 41 shows an example of a reference unit cell mesh in the connectable cuboid configuration, fitting exactly within the unit cube of FIG. 38.

Referring to FIGS. 36-42, step 706 of mapping reference unit cell meshes 300 is now described with regard to the method 900 of FIG. 36, which is directed toward mapping the reference unit cell meshes 300 onto a plurality of hexahedral elements 154 respectively associated with quadratic quadrilateral elements 152 of a driver mesh 142. FIG. 37 shows an example of a portion of a driver mesh 142 comprised of quadratic quadrilateral elements 152. As mentioned above, each quadratic quadrilateral element 152 has 4 corner nodes 158 ($p_1 \ldots p_4$) and 4 mid-side nodes 160 ($p_s \ldots p_8$) in real space 140. FIG. 38 shows a unit cube 202 in isoparametric space 200, and the corresponding location of the nodes $p_1 \ldots p_8$ on the unit cube 202. FIG. 39 shows an example of the unit cube 202 of FIG. 38 mapped onto a hexahedral element 154 associated with the quadratic quadrilateral element 152 of FIG. 37.

Figure 42:
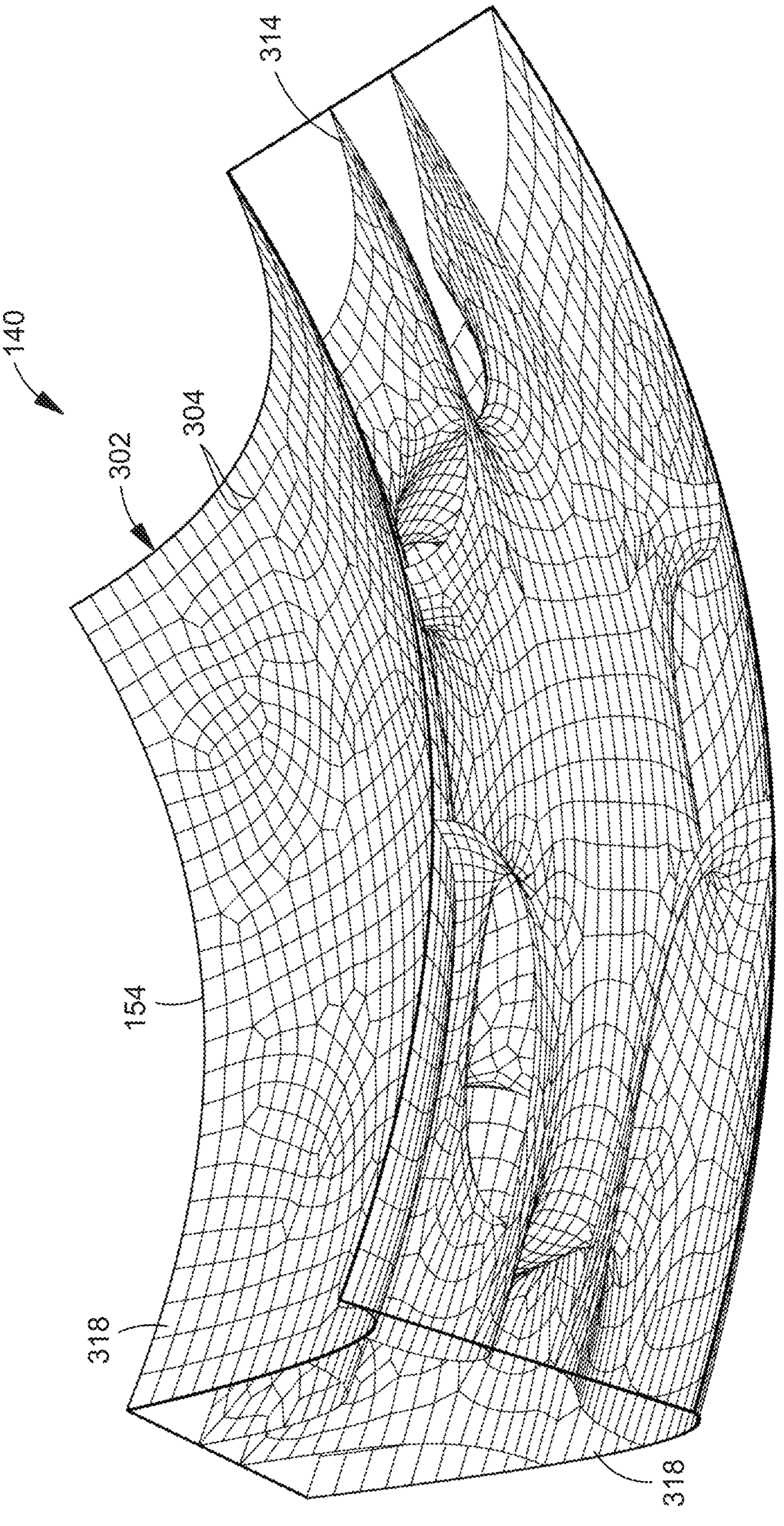
FIG. 42 shows the reference unit cell mesh of FIG. 41 mapped onto the hexahedral element of FIG. 39.

Similar to the above-described process of mapping a reference unit cell mesh 300 onto a hexahedral element 154 associated with a linear quadrilateral element 150 through the use of linear basis functions, the method 900 of FIG. 36 describes the process of mapping a reference unit cell mesh 300 onto a hexahedral element 154 associated with a quadratic quadrilateral element 152 through the use of quadratic basis functions. FIGS. 40A-40H show 8 groups of level set contours respectively associated with the 8 quadratic basis functions $N_1 \ldots N_8$ defined on an 8-noded quadratic quadrilateral element 152. The level set contours indicate the weight of given corner nodes 158 and mid-side nodes 160 across the 8-noded quadratic quadrilateral element 152. FIG. 42 shows the reference unit cell mesh 300 of FIG. 41 after being mapped onto the hexahedral element 154 (e.g., FIG. 39), associated with the quadratic quadrilateral element 152 (FIG. 37) of the driver mesh 142.

Referring to FIGS. 36-42, the method 900 of mapping the reference unit cell mesh 300 onto a hexahedral element 154 associated with a quadratic quadrilateral element 152 of a driver mesh 142 comprises sequentially performing steps 902, 904, and 906 for each quadratic quadrilateral element 152 of a driver mesh 142. Step 902 comprises computing the nodal averaged normal vectors $n_1 \ldots n_4$ (FIG. 39) of the corner nodes 158 ($p_1 \ldots p_4$) of the quadratic quadrilateral element 152 in real space 140, as described above.

After computing the nodal averaged normal vectors $n_1 \ldots n_4$, step 904 comprises computing the mid-side normal vectors ($n_s \ldots n_8$) of the quadratic quadrilateral element 152 by taking, for each mid-side normal vector, the average of the normal vectors at the corner nodes 158 on opposite ends of the mesh element edge 162 upon which the mid-side node 160 lies, using the following equations:

$$n_x = \frac{1}{2}(n_{A_x} + n_{B_x}) \quad \text{(Equation 632)}$$

$$n_y = \frac{1}{2}(n_{A_y} + n_{B_y}) \quad \text{(Equation 634)}$$

$$n_z = \frac{1}{2}(n_{A_z} + n_{B_z}) \quad \text{(Equation 636)}$$

wherein:

$n_{A_x}$, $n_{A_y}$ and $n_{A_z}$ are the x, y and z component respectively of the nodal averaged normal vector of the first corner node 158 of the mesh element edge 162 on which the mid-side node 160 lies;

$n_{B_x}$, $n_{B_y}$ and $n_{B_z}$ are the x, y and z components respectively of the second corner node 158 of the mesh element edge 162 on which the mid-side node 160 lies; and $n_x$, $n_y$ and $n_z$ are the x, y and z components respectively of the mid-side nodal averaged normal vector.

Step 906 comprises sequentially performing the following computations for each cell mesh node 304 of the reference unit cell mesh 300. Initially, step 906 includes computing the quadratic basis functions $N_1 \ldots N_8$ of the cell mesh node 304, using the following equations:

$$N_1 = \frac{1}{4}(1-\xi)(1-\eta)(-\xi-\eta-1) \quad \text{(Equation 638)}$$

$$N_2 = \frac{1}{4}(1+\xi)(1-\eta)(\xi-\eta-1) \quad \text{(Equation 640)}$$

$$N_3 = \frac{1}{4}(1+\xi)(1+\eta)(\xi+\eta-1) \quad \text{(Equation 642)}$$

$$N_4 = \frac{1}{4}(1-\xi)(1+\eta)(-\xi+\eta-1) \quad \text{(Equation 644)}$$

$$N_5 = \frac{1}{2}(1-\eta)(1+\xi)(1-\xi) \quad \text{(Equation 646)}$$

$$N_6 = \frac{1}{2}(1+\eta)(1+\xi)(1-\eta) \quad \text{(Equation 648)}$$

$$N_7 = \frac{1}{2}(1+\eta)(1+\xi)(1-\xi) \quad \text{(Equation 650)}$$

$$N_8 = \frac{1}{2}(1+\eta)(1-\xi)(1-\eta) \quad \text{(Equation 652)}$$

wherein $\eta$ and $\xi$ (e.g., see FIG. 38) are the coordinates of the cell mesh node 304 in isoparametric space 200.

After computing the quadratic basis functions $N_1 \ldots N_8$, step 906 comprises computing the normal vector $n=(n_x, n_y, n_z)$ of the panel mid-surface 126 at the position of the cell mesh node 304 in real space 140, using the following equations:

$$n_x = \sum_{i=1}^{8} N_i n_{i_x} \quad \text{(Equation 654)}$$

$$n_y = \sum_{i=1}^{8} N_i n_{i_y} \quad \text{(Equation 656)}$$

$$n_z = \sum_{i=1}^{8} N_i n_{i_z} \quad \text{(Equation 658)}$$

wherein $n_{i_x}$, $n_{i_y}$, and $n_{i_z}$ are respectively the x, y, and z components (in the real coordinate system—e.g., FIG. 39) of the nodal averaged normal vectors $n_1 \ldots n_8$.

After computing $n_x$, $n_y$, and $n_z$, step 906 comprises computing the position vector $p=(p_x, p_y, p_z)$ of the cell mesh node 304 in real space 140, using the following equations:

$$p_x = \sum_{i=1}^{8} N_i p_{i_x} + \frac{1}{2}\zeta n_x t \quad \text{(Equation 660)}$$

$$p_y = \sum_{i=1}^{8} N_i p_{i_y} + \frac{1}{2}\zeta n_y t \quad \text{(Equation 662)}$$

$$p_z = \sum_{i=1}^{8} N_i p_{i_z} + \frac{1}{2}\zeta n_z t \quad \text{(Equation 664)}$$

wherein:

$n_{i_x}$, $n_{i_y}$, and $n_{i_z}$ are respectively the x, y, and z components (relative to the real coordinate system) of the nodal averaged normal vectors $n_1 \ldots n_8$ at the nodes $p_1 \ldots p_8$ respectively;

$p_{i_x}$, $p_{i_y}$, and $p_{i_z}$ are respectively the x, y, and z components (relative to the real coordinate system) of the position vectors $p_1 \ldots p_8$;

$t_p$ is the local panel thickness of the sandwich panel 120, wherein $t_p$ refers to the total thickness of the sandwich panel 120, including the two face sheets and the panel infill geometry 166.

FIG. 43 shows an example of a panel infill geometry 166 of a sandwich panel 120 generated as a result of mapping a plurality of reference unit cell meshes 300 representing the connectable cuboid constant thickness solid geometry 224 version of the connectable cuboid 216 (e.g., FIG. 17) respectively onto the plurality of hexahedral elements 154 (e.g., FIG. 39) respectively associated with the plurality of quadrilateral elements 148 of a driver mesh (not shown). Step 708 of the method 700 comprises stitching together the mapped unit cell meshes 302 to form a stitched mesh 130, by checking pairs of cell mesh nodes 304 for duplicates, deleting one of the duplicates, and updating cell information to refer to the cell mesh node 304 that is retained. During the mesh stitching process, the corner portions 222 of adjacent (i.e., abutting) mapped unit cell meshes 302 are stitched together.

Figure 44:
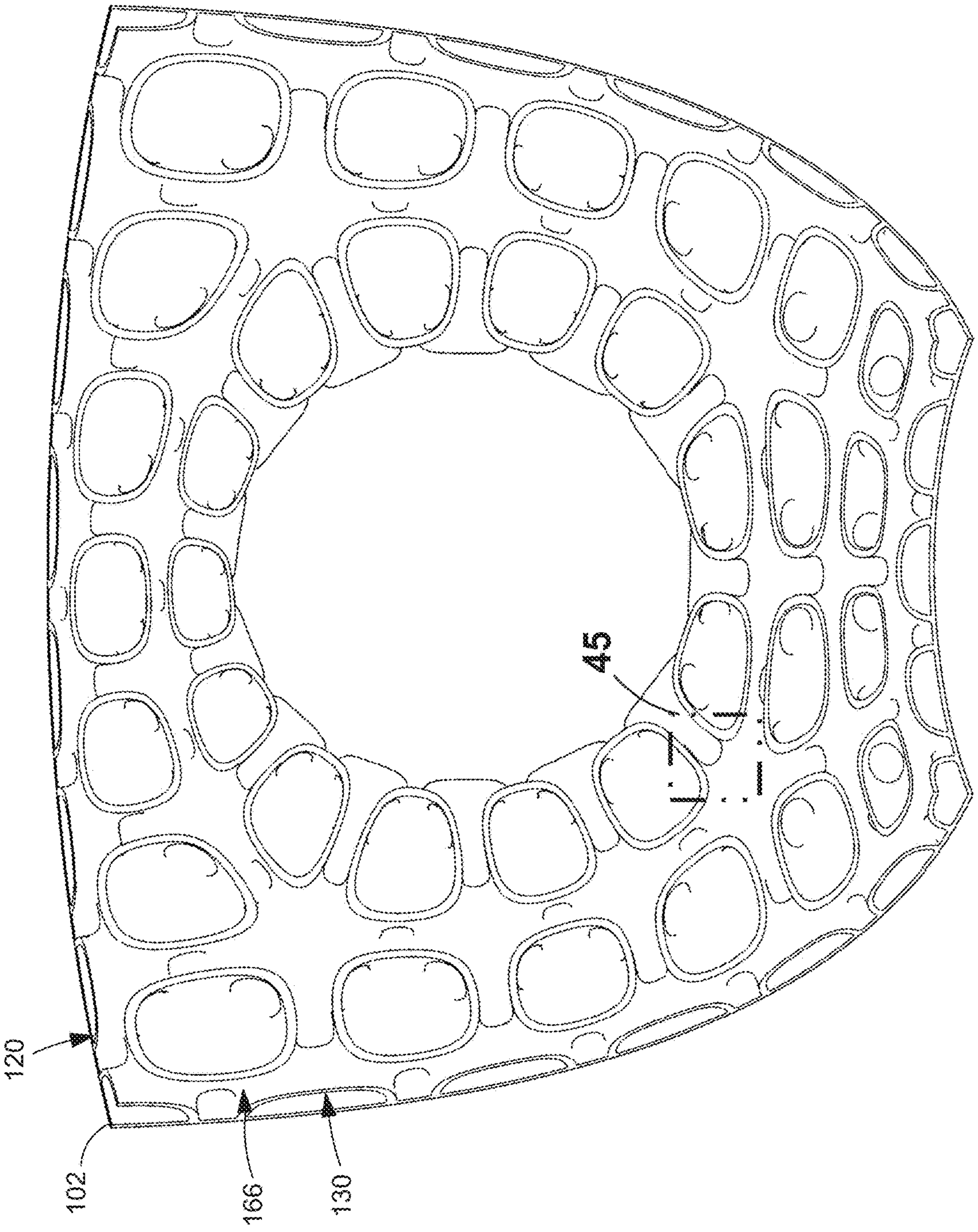
FIG. 44 is a perspective view of the sandwich panel of FIG. 43 sectioned at the mid-plane, and illustrating the panel infill geometry comprised of a plurality of unit cells in the connectable cuboid configuration, and further illustrating the consistent topology at the infill/face sheet interfaces.
Figure 45:
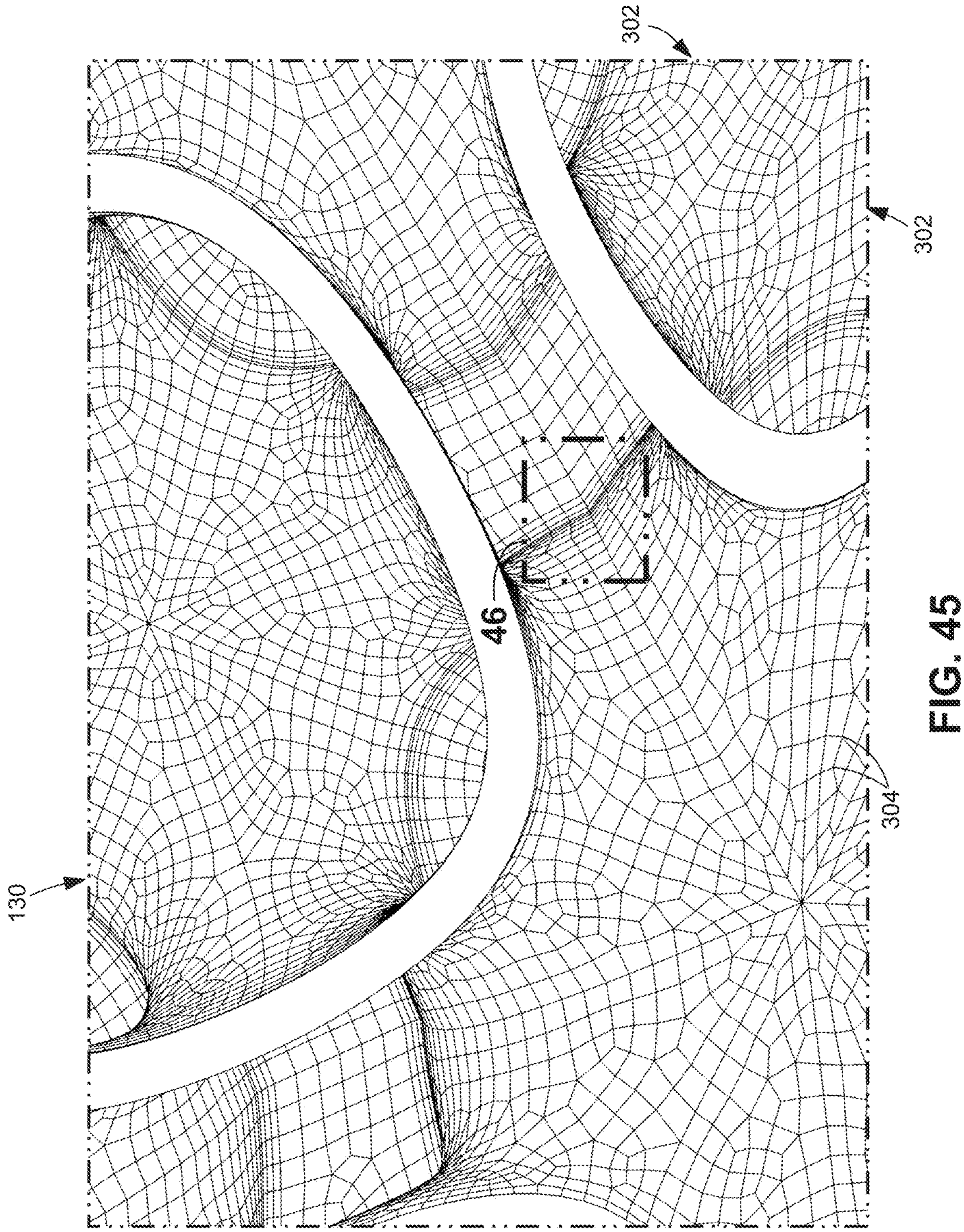
FIG. 45 is a magnified view of the portion of the panel infill geometry identified by reference numeral 45 in FIG. 44, and illustrating mesh elements of the sandwich panel mesh.
Figure 46:
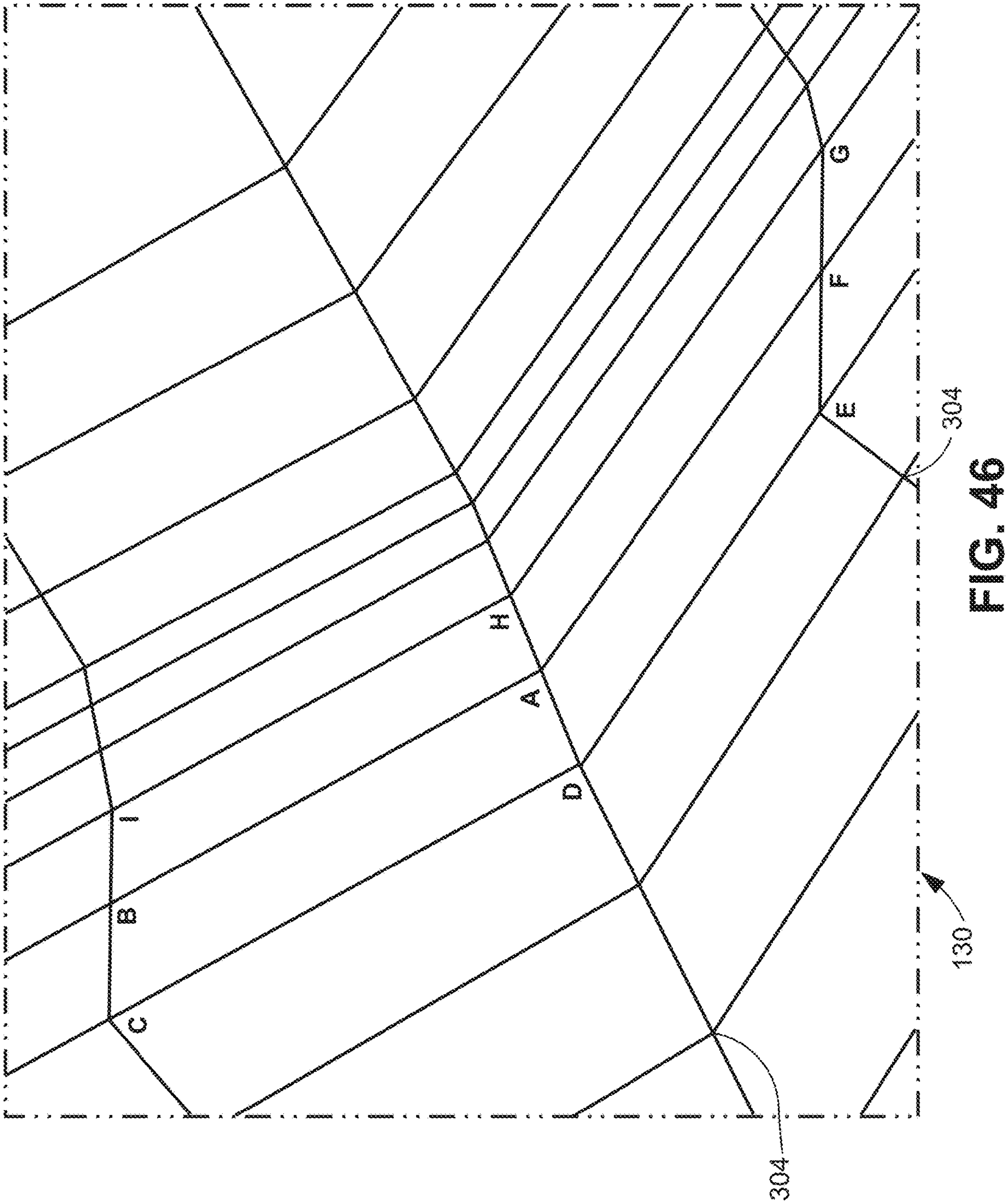
FIG. 46 is a magnified view of the portion of the sandwich panel mesh identified by reference numeral 46 in FIG. 45.

Referring to FIGS. 43-47, step 710 of the method 700 comprises optionally performing one or more mesh smoothing operations on one or more cell mesh nodes 304 of the stitched mesh 130 (FIGS. 37-39) to result in a smoothed mesh 131 (FIG. 40). The mesh smoothing operations can be Laplace smoothing operations, Laplace-Beltrami smoothing operations, volume-constrained Laplace smoothing, Taubin smoothing, or other types of smoothing operations. In one example, the application of Laplace smoothing on a cell mesh node 304 of interest involves computing a new position of the cell mesh node 304 of interest, by taking a weighted average of the positions of all of its neighbour nodes. FIG. 46 is a magnified view of the portion of the stitched mesh 130 identified by reference numeral 46 of FIG. 45. In the example shown, a new position of node of interest A is computed by taking the weighted average of the positions of all of its neighbour nodes using the following equations:

$$A_x = \frac{\sum_{i=1}^{k} w_i p_{i_x}}{\sum_{i=1}^{k} w_i} \quad \text{(Equation 666)}$$

$$A_y = \frac{\sum_{i=1}^{k} w_i p_{i_y}}{\sum_{i=1}^{k} w_i} \quad \text{(Equation 668)}$$

$$A_z = \frac{\sum_{i=1}^{k} w_i p_{i_z}}{\sum_{i=1}^{k} w_i} \quad \text{(Equation 670)}$$

wherein $A_x$, $A_y$, and $A_z$ are respectively the x, y, and z components of the updated position of cell mesh node A. $p_{i_x}$, $p_{i_y}$ and $p_{i_z}$ are respectively the x, y, and z components of the position of the $i^{th}$ neighbour node (e.g., one of node B, C, D, E, F, G, H or I in this specific example). $w_i$ denotes the weight associated with the $i^{th}$ neighbour node, and k is the total number of neighbouring nodes (i.e., k=8 in this example). In at least one example, all values for the weights are equal to 1.0, thereby providing an unweighted average sum. In another example, the weights are inversely proportional to the distance between cell mesh node A and the $i^{th}$ neighbour node. In yet another example, the weights are inversely proportional to the square of the distance between cell mesh node A and the $i^{th}$ neighbour node.

To apply Laplace smoothing to the entire stitched mesh 130, the above-described operation is performed for every cell mesh node 304, considering its unique set of neighbour nodes. This process is then repeated a number of times, each time using the new mesh generated by the Laplace mesh smoothing operation.

Figure 47:
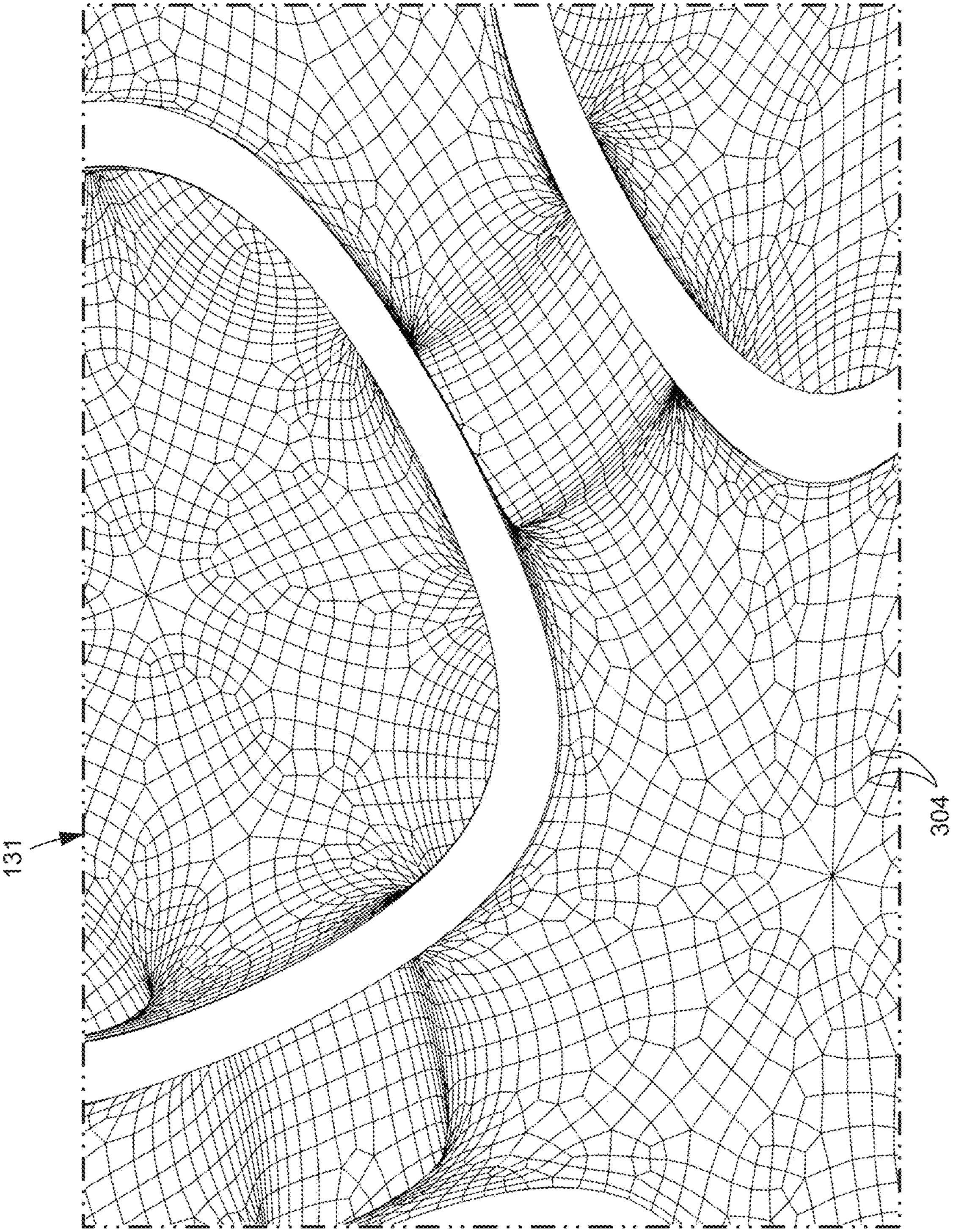
FIG. 47 shows the sandwich panel mesh of FIG. 45 after iteratively performing multiple Laplace mesh smoothing operations.

FIGS. 43, 44 and 47 show an example of a smoothed mesh 131 of the sandwich panel 120. The smoothed mesh 131 is generated by iteratively performing a plurality of mesh smoothing operations on the stitched mesh 130 (FIGS. 45 and 46). As a result of the mesh smoothing operations, the junctures between the reference unit cell meshes 300 are gently curved transitions, with no notches, steps, or sharp corners, as shown in FIG. 47. As such, the smoothing operation helps to minimize stress concentrations resulting from an abrupt transition in geometry which may result from the mapping operation.

Referring FIG. 48, shown is an example of a panel digital representation 174 of a sandwich panel 120 constructed using the above-described method 700. The sandwich panel 120 has a panel geometry comprised of a panel infill geometry 166, and the panel face sheet geometries 170 of the first and second face sheets 102, 104. As described above, the panel geometry is a result of mapping the reference unit cell meshes 300 representing the connectable cuboid constant thickness solid 224 (e.g., FIG. 16) onto the hexahedral elements 154 associated with the quadrilateral elements 148 of the driver mesh 142 of FIG. 10, and the panel geometry is comprised of a plurality of mapped unit cell meshes 302, stitched together into a single mesh 130, with a mesh smoothing operation optionally applied. Each infill/face sheet interface 110 between a reference unit cell mesh 300 and a unit cell mesh has a generally curved shape. Advantageously, the mesh smoothing operations can reduce the occurrence of stress concentrations in the additively manufactured sandwich panel 120.

The method 700 optionally includes additively manufacturing the sandwich panel 120 using the panel digital representation 174. As shown in FIG. 48, the additively manufactured sandwich panel 120 will have a panel infill structure 164 comprising an array of unit cell structures 206 arranged in one or more layers 234 (e.g., FIG. 48 shows a single layer 234) connecting the first face sheet 102 to the second face sheet 104. Each unit cell structure 206 has a main axis 212 that is locally normal to an imaginary panel mid-surface 126 (not shown) located midway between the first face sheet 102 and the second face sheet 104. Each of the unit cell structures 206 includes a hollow three-dimensional center portion 218 (FIGS. 12-15) that is closed except for 8 openings 220 (FIGS. 12-15). In addition, each of the unit cell structures 206 includes 8 corner portions 222 (FIGS. 12-15) respectively located at the 8 openings 220. In the panel infill structure 164, the corner portions 222 of the unit cell structures 206 are connected (i.e., stitched) to the corner portions 222 of adjacent unit cell structures 206. Optionally, as a result of the mesh smoothing operations, the panel infill structure 164 has smoothly rounded transitions (e.g., FIG. 47) at the junctures of the corner portions 222 of adjacent unit cell structures 206, and smoothly rounded transitions at the infill/face sheet interfaces 110 between the unit cell structures 206 and the first and second face sheets 102, 104.

In preparation for additively manufacturing the sandwich panel 120, the method 700 can include using the panel digital representation 174 to develop an additive manufacturing program 536. The additive manufacturing program 536 can be used by an additive manufacturing apparatus 400 to fabricate the sandwich panel 120.

Figure 49:
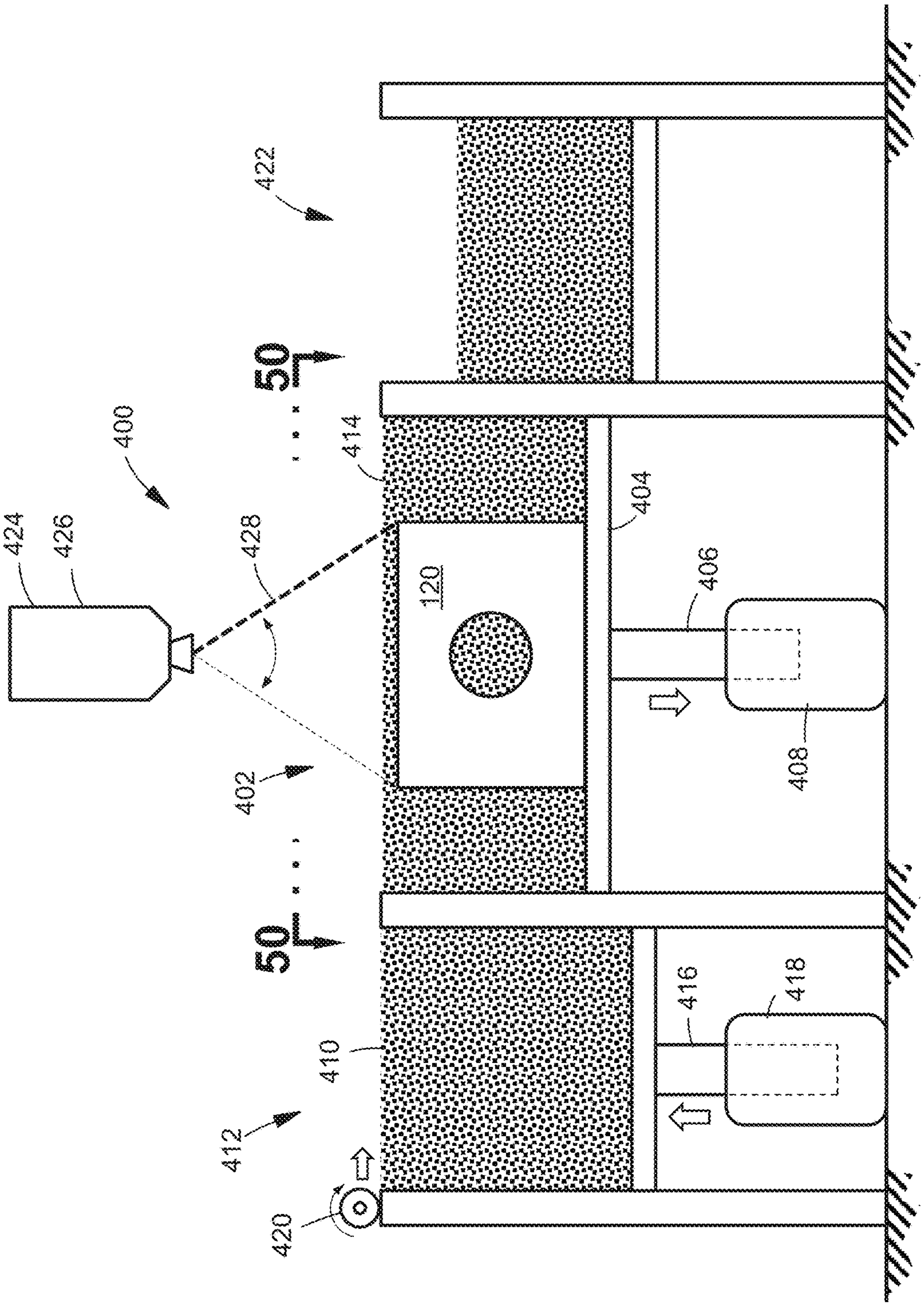
FIG. 49 is a sectional side view of an example of an additive manufacturing apparatus for fabricating a sandwich panel having a panel infill geometry generated using the presently-disclosed system and method.
Figure 50:
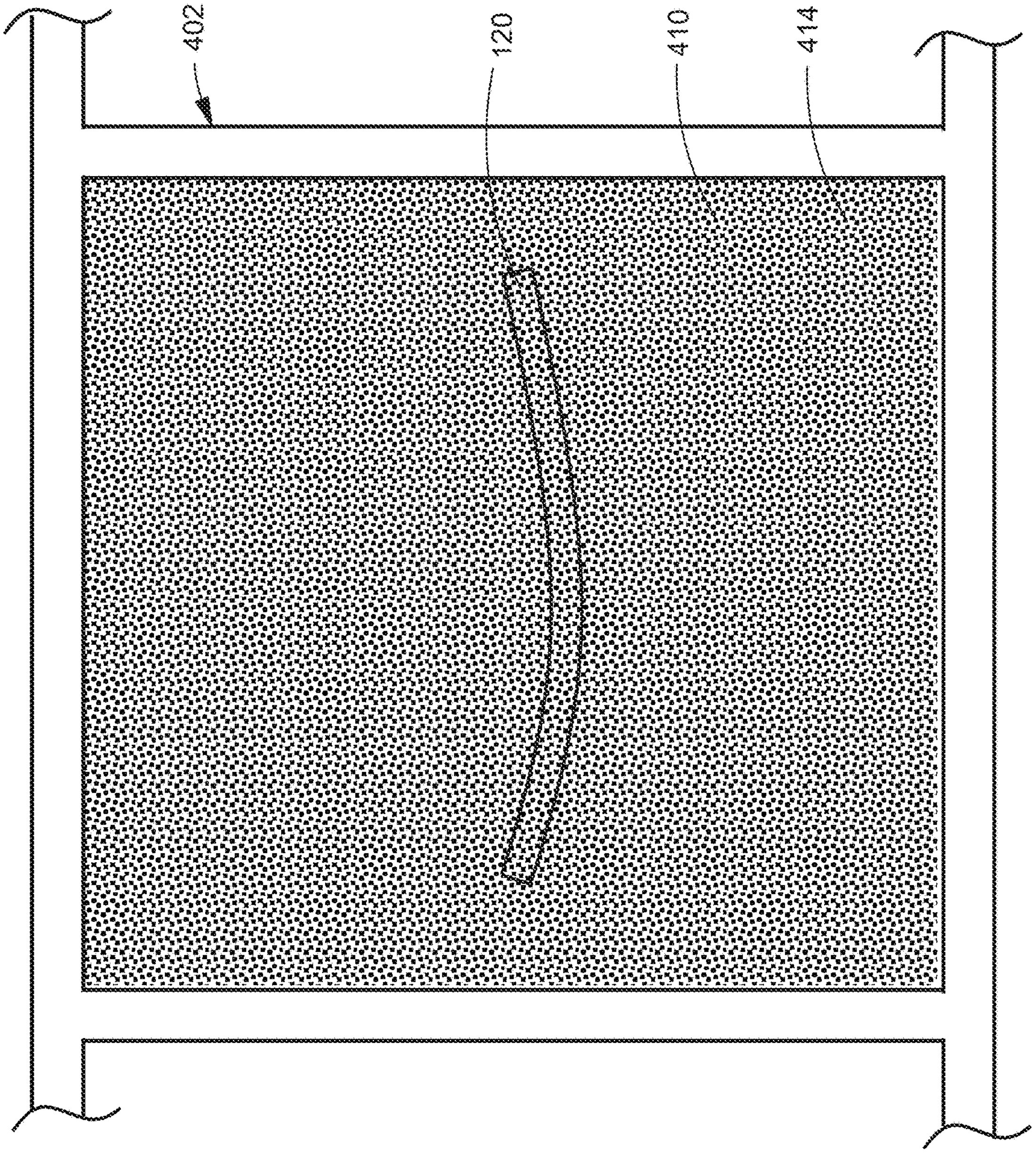
FIG. 50 is a top-down view of the additive manufacturing apparatus of FIG. 49.

FIGS. 49-50 shows an example of an additive manufacturing apparatus 400 for fabricating the sandwich panel 120 of FIG. 48. As mentioned above, additive manufacturing involves the successive application and solidification of layers of material on top of each other. In the example of FIGS. 49-50, the additive manufacturing apparatus 400 is configured as a powder bed fusion machine that uses selective laser melting for additive manufacturing of parts. The additive manufacturing apparatus 400 includes a powder supply chamber 412 containing powder 410. The powder 410 may be polymeric powder, ceramic powder, metal powder, or any combination thereof. The powder supply chamber 412 is vertically movable via a powder supply piston 416, which is actuated by a powder supply actuator 418.

The additive manufacturing apparatus 400 further includes a powder leveling apparatus 420, such as a roller. In addition, the additive manufacturing apparatus 400 includes a build chamber 402 having a build platform 404 that supports a powder bed 414. The build platform 404 is vertically movable in a stepwise manner via a build platform piston 406, which is actuated by a build platform actuator 408. The additive manufacturing apparatus 400 further includes an energy source 424 or heat source. In the example shown, the energy source 424 is a laser device 426 configured to emit a laser beam 428. During additive manufacturing of the sandwich panel 120, the powder leveling apparatus 420 periodically moves across the powder 410 within the powder supply chamber 412, to thereby distribute a thin layer of powder 410 onto the powder bed 414. Excess powder 410 is deposited into the powder overflow chamber 422.

The laser beam 428 is moved in a manner to form the cross-sectional shape of a slice of the panel digital representation 174 of the sandwich panel 120, shown in FIG. 50. In this regard, the moving laser beam 428 melts and fuses the powder 410 particles into a solid layer in the shape of the slice of the sandwich panel 120. After the formation of each layer, the build platform 404 is moved incrementally downwardly via the build platform piston 406, after which the powder leveling apparatus 420 distributes a new layer of powder 410 onto the powder bed 414 for melting and fusing via the laser beam 428. The process is repeated layer by layer until the sandwich panel 120 is complete. Although the additive manufacturing apparatus 400 is shown and described as a laser-based powder bed fusion system, any one of a variety of alternative types of additive manufacturing technologies (e.g., electron beam melting, direct energy deposition, supersonic particle deposition, binder jetting, etc.) may be implemented for manufacturing sandwich panels 120.

Figure 51:
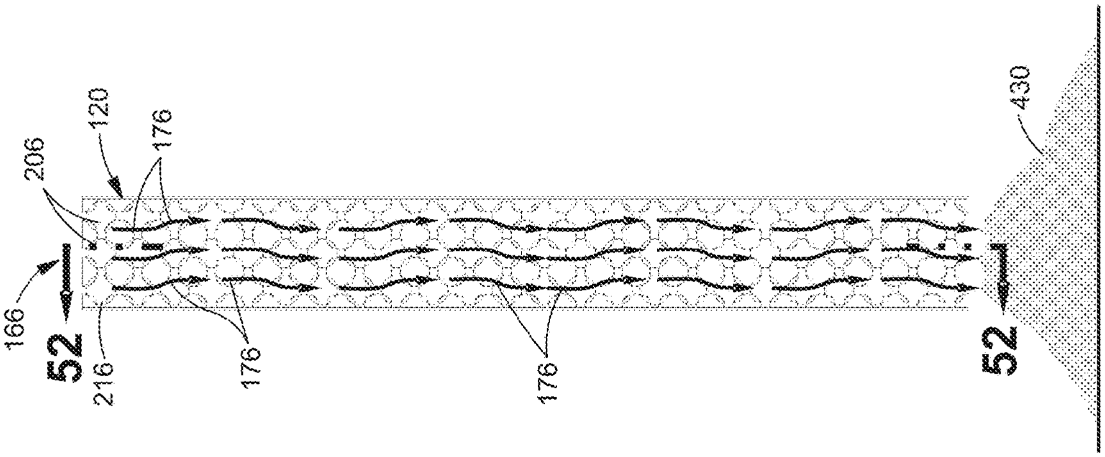
FIG. 51 is a sectional side view of the sandwich panel of FIG. 48, and illustrating the removal of loose powder at the completion of the additive manufacturing build process.
Figure 52:
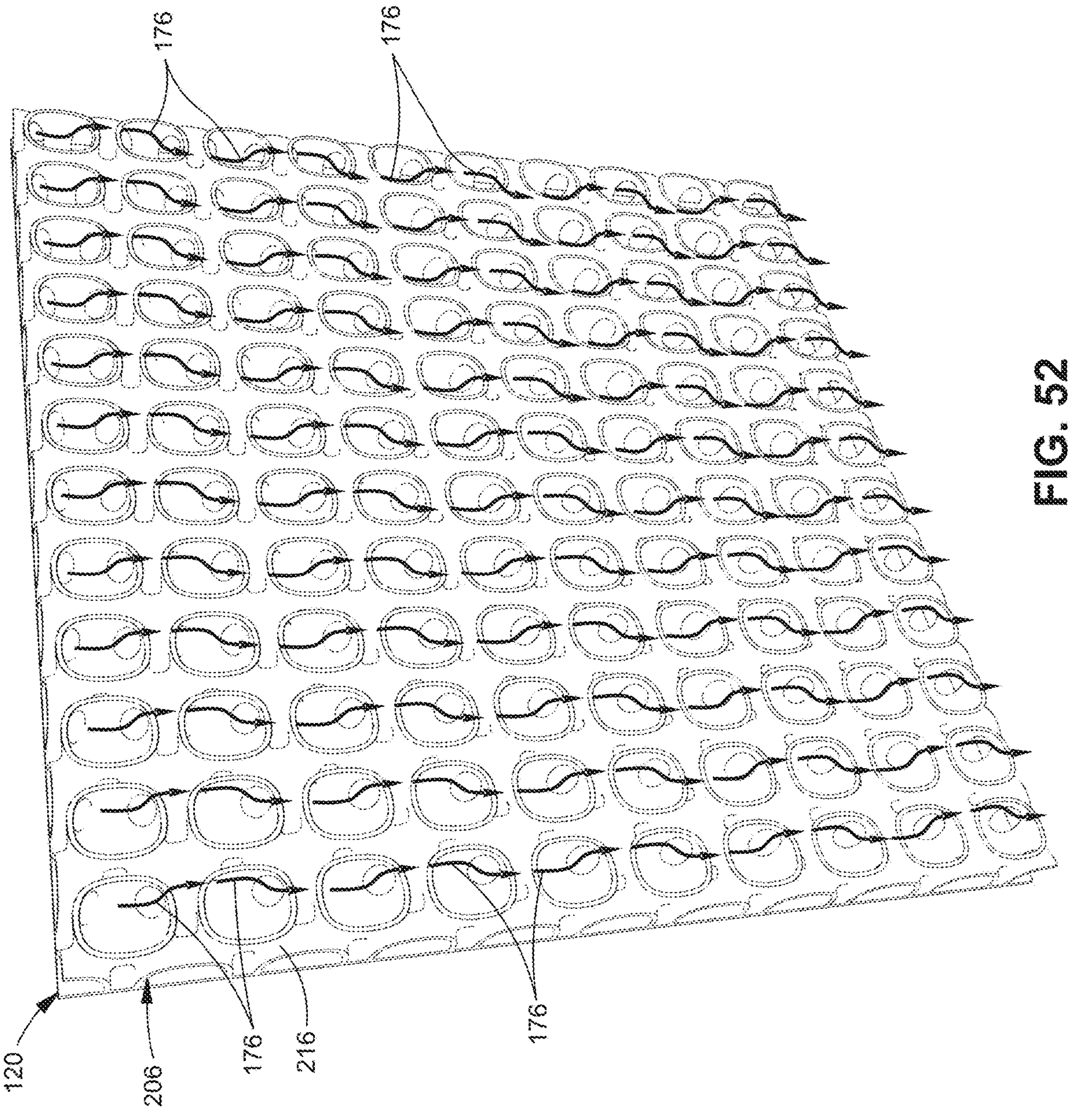
FIG. 52 is a perspective view of the sandwich panel of FIG. 48, and illustrating powder flow paths during the removal of loose powder.

Referring to FIGS. 51-52, respectively shown are sectional side and perspective views of an example of a sandwich panel 120 manufactured using an additive manufacturing apparatus 400 (e.g., FIGS. 49-50). In FIG. 52, half of the sandwich panel 120 has been omitted for clarity. The panel infill geometry 166 of the sandwich panel 120 was generated as a result of mapping the connectable cuboid 216 reference unit cell mesh 300 corresponding to the connectable cuboid constant thickness solid 224 version (e.g., FIG. 16) of the unit cell geometry 210. At the completion of the additive manufacturing build process, the unit cell structures 206 that make up the panel infill geometry 166 may contain loose powder 430, which is typically removed for economic and/or environmental reasons.

Advantageously, the connectable cuboid 216 configuration does not have any enclosed volumes that would otherwise entrap loose powder 430 within the unit cell structures 206 that make up the panel infill geometry 166 of the sandwich panel 120. Furthermore, the geometry of the connectable cuboid 216 configuration results in interconnected pathways 176 defined by the unit cell structures 206 within the panel infill geometry 166. The pathways 176 extend continuously in three orthogonal directions. In this regard, the method includes removing loose powder 430 from the panel infill geometry 166 via the pathways 176. In at least one example, the sandwich panel 120 is aligned to any one of these orthogonal directions. In another example, the sandwich panel 120 may be continuously rotated about its two principal axes. In all examples, the method may optionally include agitating or vibrating the sandwich panel 120 to promote the release of the loose powder 430 from the interior of the panel infill geometry 166, and to facilitate the flow of the loose powder 430 through the sandwich panel 120, exiting at any location where a pathway 176 meets an exterior face of the sandwich panel 120.

Referring again briefly to FIGS. 54 and 56, shown are multi-layer unit infill meshes 232, as described above. In the examples shown, the multi-layer unit infill meshes 232 each contain 3 layers 234 of unit infill meshes 314, with each layer 234 containing 3 rows of the unit infill meshes 314 in the $\eta$ direction (FIG. 11), and each row containing 3 unit infill meshes 314 in the $\xi$ direction of the unit cube 202 (FIG. 11). However, a multi-layer unit infill mesh 232 can include any number of layers 234 of unit infill meshes 314 stacked on top of each other. Each layer 234 can include any number of rows of unit infill meshes 314 in the $\eta$ direction, and each row can include a corresponding number of unit infill meshes 314 in the $\xi$ direction.

Referring to FIGS. 57-61, shown in FIG. 57 is an example of a driver mesh 142 that is doubly curved. The driver mesh 142 is an example of a structured driver mesh 144, having a pattern of quadrilateral elements 148 that can be mapped into a square domain with uniform rows and columns. The right-half of FIG. 57 illustrates quadrilateral elements of the driver mesh, and the left-half of FIG. 57 illustrates some of the hexahedral elements associated with the quadrilateral elements of the driver mesh.

Figure 58:
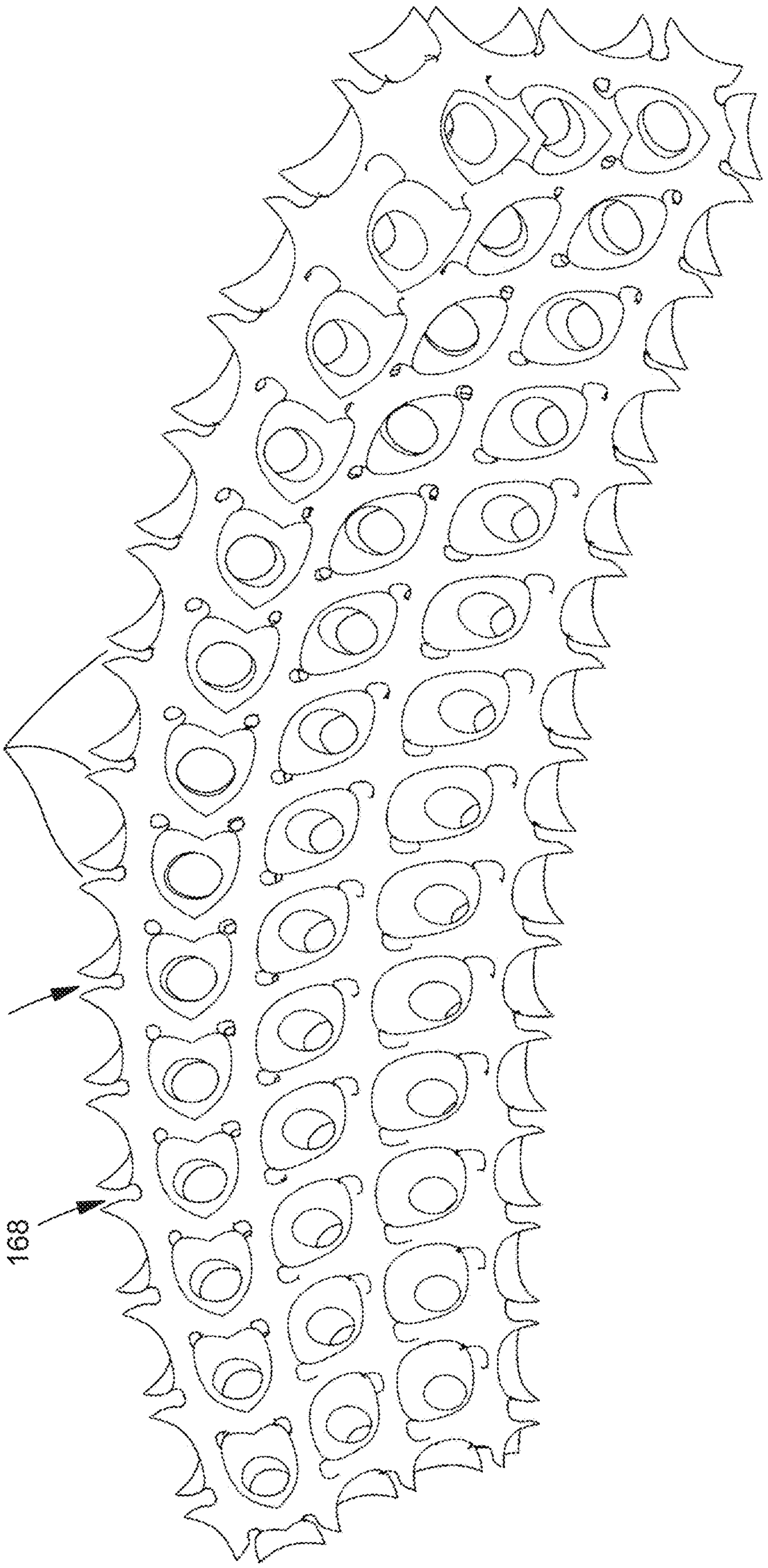
FIG. 58 is a perspective view of a sandwich panel mesh (shown without the face sheet meshes and without mesh element internal edges) comprised of shell elements, and generated using the connectable cuboid surface reference unit cell mesh of FIG. 13, mapped onto the hexahedral elements respectively associated with the quadrilateral elements of the doubly curved driver mesh of FIG. 57.

FIG. 58 shows an example of a surface-based sandwich panel 120 (first and second face sheets 102, 104 and mesh element internal edges omitted for clarity) produced by mapping the reference unit cell mesh 300 (FIG. 13) corresponding to the connectable cuboid surface 223 version (FIG. 12) of the unit cell geometry 210, onto the hexahedral elements 154 (FIG. 57) respectively associated with the quadrilateral elements 148 (FIG. 57) contained in the driver mesh 142 of FIG. 57, and resulting in a plurality of mapped unit cell meshes 302 collectively forming the panel infill mesh 168.

Figure 59:
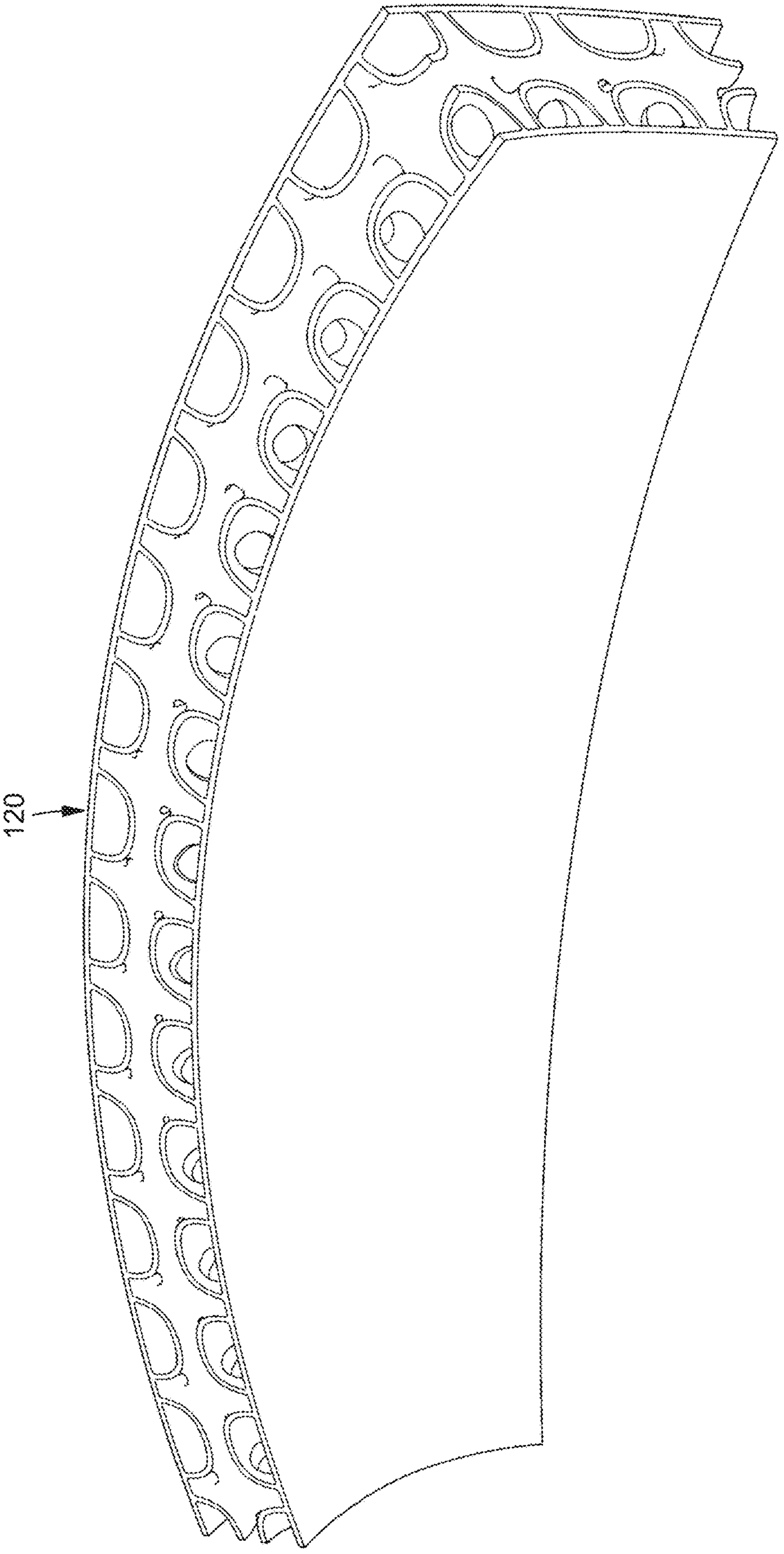
FIG. 59 is a perspective view of a sandwich panel mesh comprised of solid elements (shown without mesh element internal edges), and generated using the connectable cuboid constant thickness solid reference unit cell mesh of FIG. 17, mapped onto the hexahedral elements respectively associated with the quadrilateral elements of the doubly curved driver mesh of FIG. 57.

Referring to FIG. 59, shown is an example of a solid-based sandwich panel 120 (mesh element internal edges omitted for clarity) produced by mapping the reference unit cell mesh 300 (FIG. 17) corresponding to the connectable cuboid constant thickness solid 223 version (FIG. 16) of the unit cell geometry 210, onto the hexahedral elements 154 (FIG. 57) respectively associated with the quadrilateral elements 148 (FIG. 57) contained in the driver mesh 142 of FIG. 57, and resulting in a plurality of mapped unit cell meshes 302 collectively forming the panel infill mesh 168. As mentioned above, the reference unit cell mesh 300 of FIG. 17 is comprised of solid elements 308, such as tetrahedrons, hexahedrons, pentahedrons, or a mixture thereof. In addition, the connectable cuboid constant thickness solid 224 has a constant wall thickness $t_{wall}$. In another example not shown, a solid-based sandwich panel 120 can be produced by mapping the reference unit cell mesh 300 (FIGS. 26 and 28) corresponding to the connectable cuboid bounded solid 225 version (FIGS. 25 and 27) of the unit cell geometry 210 onto the hexahedral elements 154 (FIG. 57) respectively associated with the quadrilateral elements 148 (FIG. 57) of the driver mesh 142 of FIG. 57. As described above, the connectable cuboid bounded solid 225 of FIGS. 25 and 27 each have, in general, a variable wall thickness $t_{wall}$.

Figure 60:
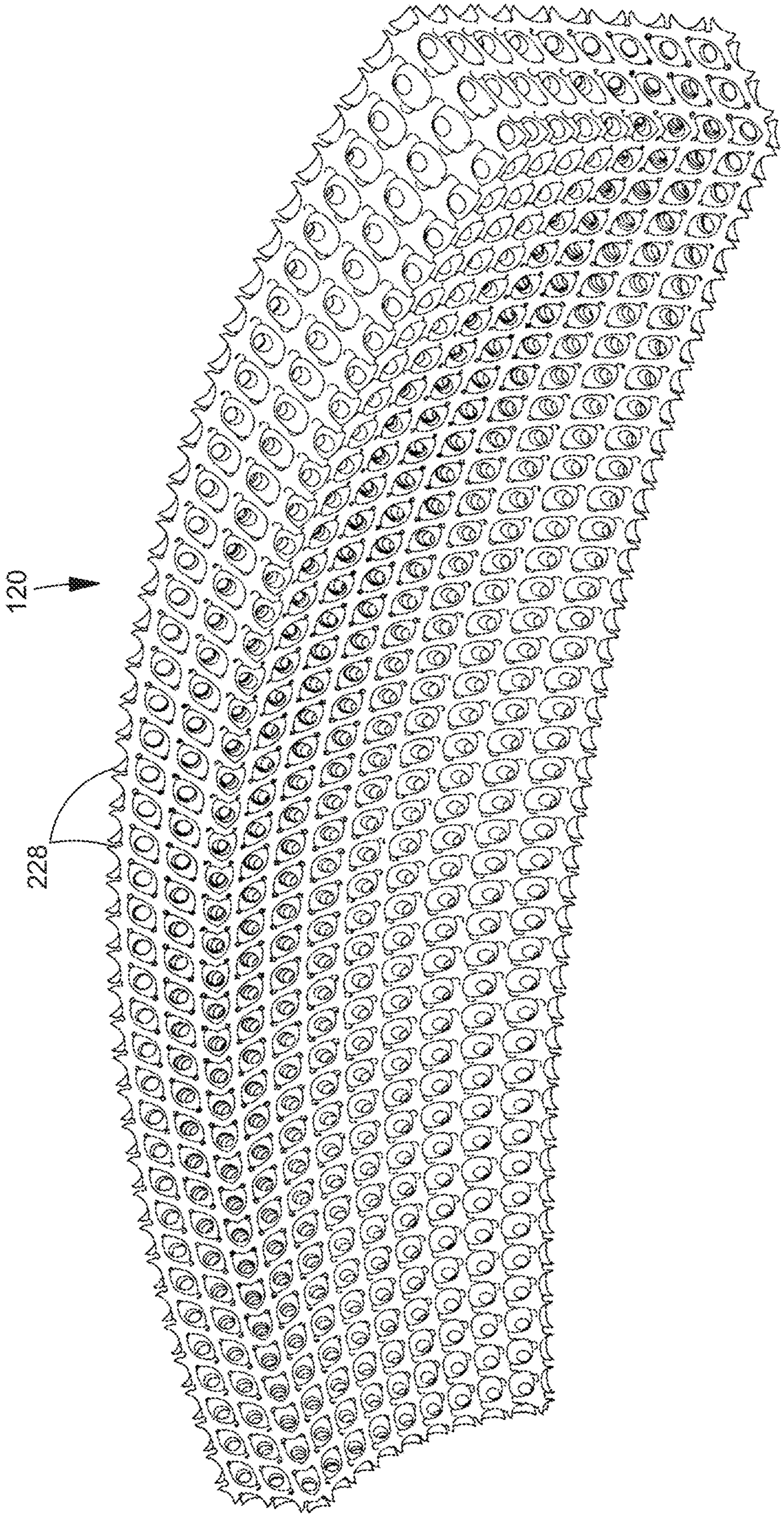
FIG. 60 shows a sandwich panel mesh (shown without the face sheet meshes and without mesh element internal edges) generated using the multi-layer connectable cuboid surface of FIG. 53, mapped onto the hexahedral elements respectively associated with the quadrilateral elements of the doubly curved driver mesh of FIG. 57.

Referring to FIG. 60, shown is an example of the multi-layer unit infill geometry 230 of a surface-based sandwich panel 120 produced by mapping the reference unit cell mesh 300 composed of shell elements (FIG. 54) corresponding to the multi-layer unit connectable cuboid surface 223 version (FIG. 53) of the multi-layer unit cell geometry 226, onto the hexahedral elements 154 (FIG. 57) respectively associated with the quadrilateral elements 148 (FIG. 57) contained in the driver mesh 142 of FIG. 57, and resulting in a plurality of mapped multilayer unit cell meshes 323 collectively forming the panel infill mesh 168. In FIG. 60, the first and second face sheets 102, 104 and the mesh element internal edges have been omitted for clarity.

Figure 61:
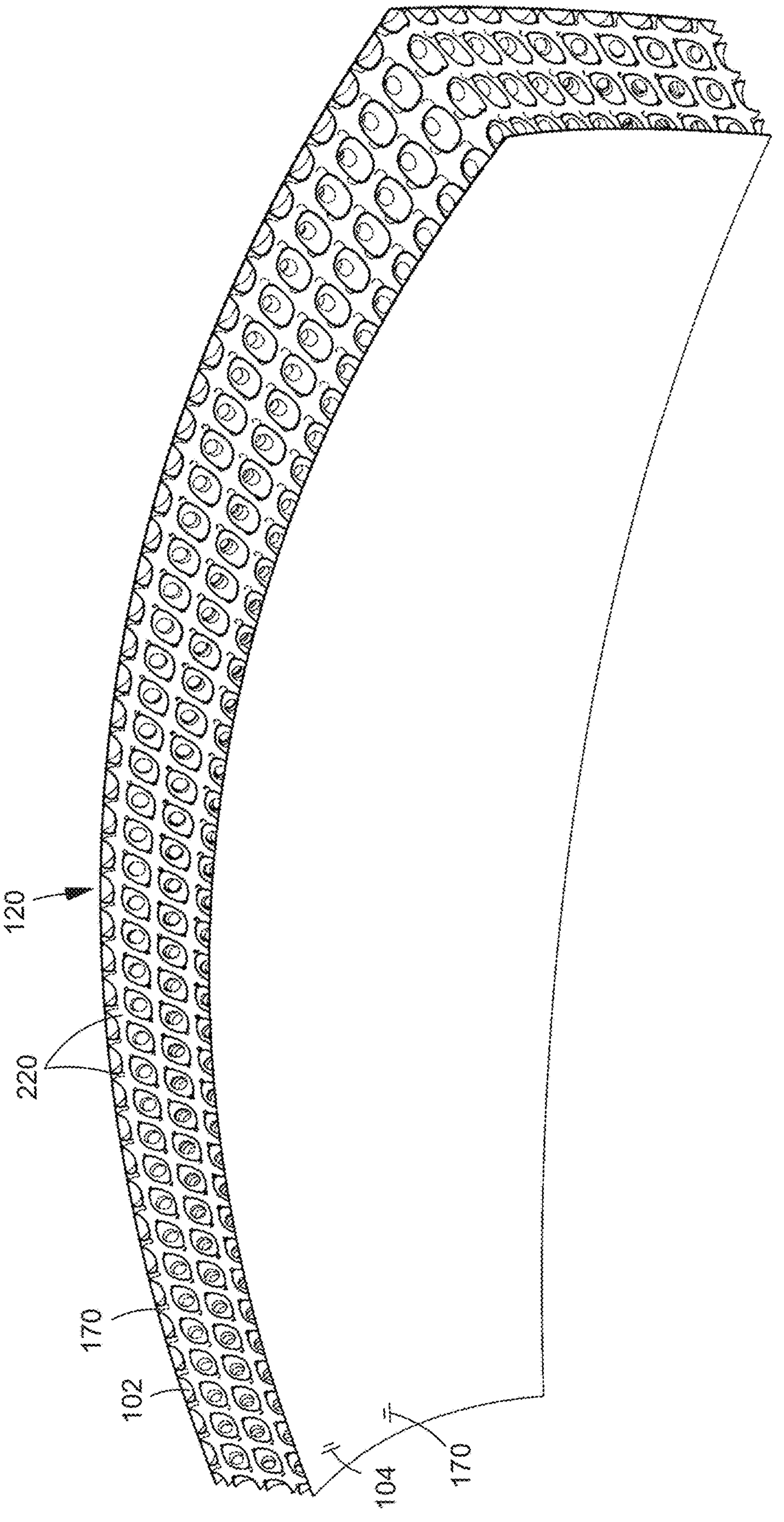
FIG. 61 shows a sandwich panel mesh (shown without mesh element internal edges) generated using the multi-layer connectable cuboid constant thickness solid of FIG. 55, mapped onto the hexahedral elements respectively associated with the quadrilateral elements of the doubly curved driver mesh of FIG. 57.

FIG. 61 shows an example of a solid-based sandwich panel 120 produced by mapping the reference unit cell mesh 300 comprised of solid elements 308 (FIG. 56) corresponding to the multi-layer unit connectable cuboid constant thickness solid 224 of the multi-layer unit cell geometry 226 (FIG. 55) onto the hexahedral elements 154 (FIG. 57) respectively associated with quadrilateral elements 148 (FIG. 57) contained in the driver mesh 142 of FIG. 57. The sandwich panel 120 of FIG. 61 includes the multi-layer unit infill geometry 230, and the panel face sheet geometries 170 of the first and second face sheets 102, 104, but for clarity, the mesh element internal edges are not shown. After completion of the mesh stitching process to remove duplicate cell mesh nodes 304, the multi-layer unit cell meshes 228 in FIG. 61 are interconnected.

Figure 62:
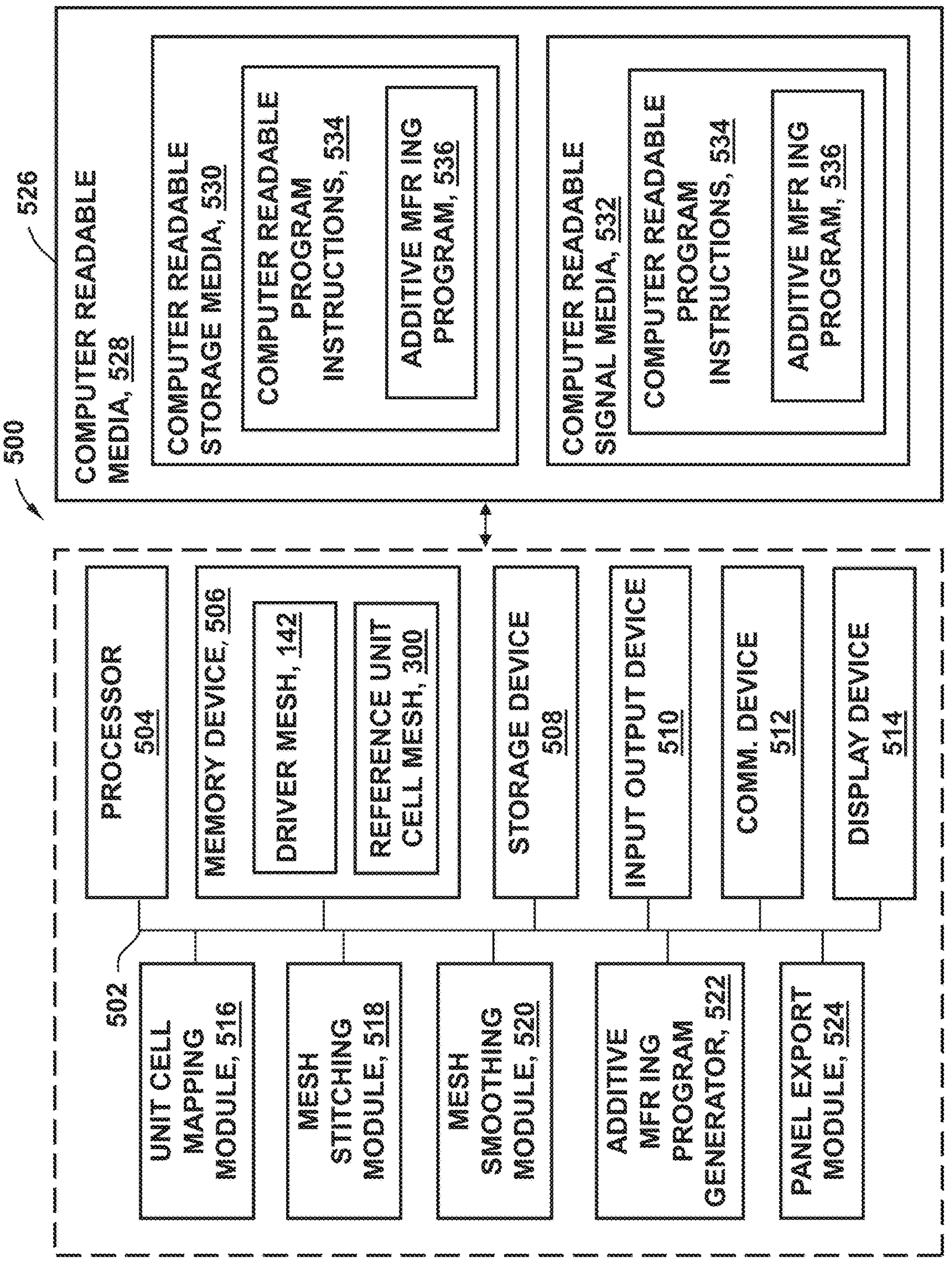
FIG. 62 is a block diagram of an example of a processor-based system for implementing the method for generating a panel infill geometry of a sandwich panel.

Referring now to FIG. 62, the above-described methods 700, 800, and 900, in whole or in part, may be performed in a computer-implemented process, such as on a processor-based system 500 or other suitable computer system. The processor-based system 500 is configured to perform computer readable program instructions 534. The computer readable program instructions 534 are provided to, or are loaded onto, the processor-based system 500 in order to implement the above-described operations or steps of methods 700, 800, and 900. In a non-limiting example, the processor-based system 500 and/or the computer readable program instructions 534 generate a panel infill geometry 166 for a sandwich panel 120.

The block diagram of FIG. 62 illustrates the processor-based system 500 in an advantageous example for generating the panel infill geometry 166 of the sandwich panel 120. The processor-based system 500 includes a data communication path 502 (e.g., a data link) to communicatively couple one or more components, to facilitate transfer of data between such components. The communication path 502 comprises one or more data buses, or any other suitable communication path 502 that facilitates the transfer of data between the components and devices of the processor-based system 500. In a non-limiting example, the components include one or more of a processor 504, a memory device 506, a storage device 508, an input/output device 510, a communications device 512, a display device 514, a unit cell mapping module 516, a mesh stitching module 518, a mesh smoothing module 520, an additive manufacturing program generator 522, and a panel export module 524.

The memory device 506 is configured to store one or more driver meshes 142, each representing a panel mid-surface 126 of a sandwich panel 120. As described above, each driver mesh 142 is comprised of a plurality of quadrilateral elements 148. The quadrilateral elements 148 are linear quadrilateral elements 150, or quadratic quadrilateral elements 152, as described above. Each driver mesh 142 is stored either as a structured driver mesh 144, or as an unstructured driver mesh 146, as is also described above. In some examples, the driver mesh 142 is spatially graded over at least one region of the panel mid-surface 126, to either refine or coarsen the driver mesh 142 in such regions.

In addition to storing one or more driver meshes 142, the memory device 506 is configured to store the connectable cuboid 216 configuration of the reference unit cell mesh 300 in any one or more of the versions described above and/or illustrated in FIG. 13, 17, 26, 28, 54 or 56. In addition to storing the connectable cuboid 216 configuration, the memory device 506 can store other reference unit cell mesh 300 configurations (not shown) including, but not limited to, a Schwarz-P configuration, a gyroid configuration, a body-centered-cubic lattice configuration, a honeycomb configuration, and/or a waffle configuration.

Referring still to FIG. 62, the processor-based system 500 includes a unit cell mapping module 516 configured to map a plurality of the reference unit cell meshes 300 respectively onto a plurality of hexahedral elements 154 respectively associated with the plurality of quadrilateral elements 148. The unit cell mapping module 516 performs the above-described mapping operation by applying basis functions to the driver mesh nodes 156 of the plurality of quadrilateral elements 148 in a manner causing adjustment of the size and shape of the plurality of connectable cuboid reference unit cell meshes 300 to fit respectively within the plurality of hexahedral elements 154, and resulting in a plurality of mapped unit cell meshes 302 collectively forming a panel infill geometry 166 interconnecting a first face sheet 102 to a second face sheet 104. The unit cell mapping module 516 maps the reference unit cell meshes 300 using either linear basis functions or quadratic basis functions, depending on whether the driver mesh 142 is made up of linear quadrilateral elements 150 or quadratic quadrilateral elements 152, as described above.

Figure 63:
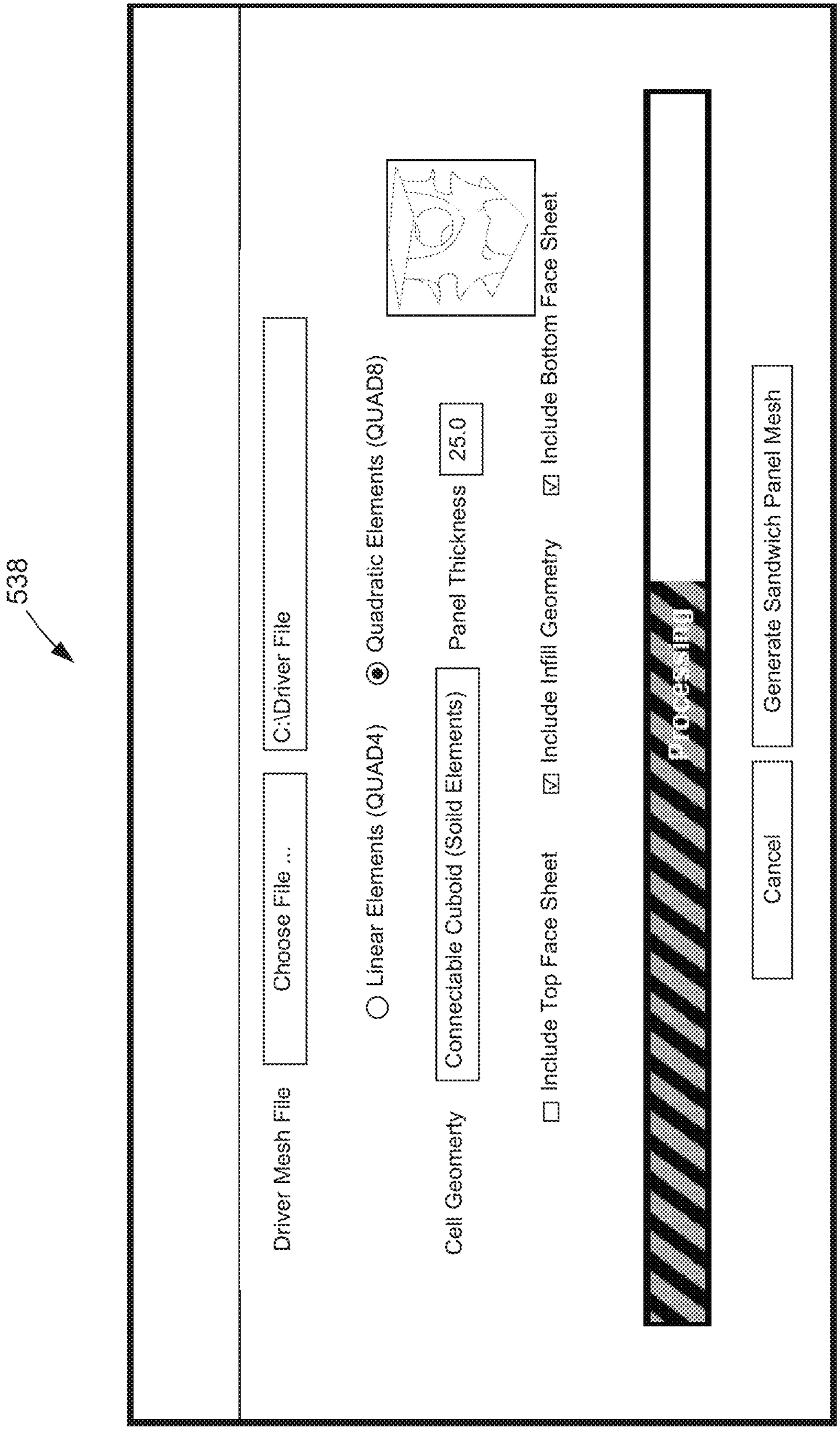
FIG. 63 shows an example of a user interface for the processor-based system of FIG. 62.

FIG. 63 shows a non-limiting example of a user interface 538 of the processor-based system 500. In the example shown, the user interface 538 provides the ability to load a "Driver mesh File," which defines a driver mesh 142 of quadrilateral elements 148. In addition, the user interface 538 provides the ability to select whether a driver mesh 142 is provided with linear quadrilateral elements 150 or quadratic quadrilateral elements 152. In addition to loading a driver mesh 142, the user interface 538 provides the ability to select a "Cell Geometry" from among a plurality of different configurations of unit cell geometries including, but not limited to, the above-described connectable cuboid 216 configurations of the reference unit cell mesh 300. The user interface 538 also provides the ability to specify the panel thickness $t_p$, and optionally to generate some combination of the panel infill geometry 166, the first face sheet 102 geometry, and/or the second face sheet 104 geometry, in lieu of generating the full sandwich panel 120 geometry.

After making the above-described selections, a user commands (via a button push on the user interface 538) the processor-based system 500 to generate a sandwich panel mesh 132 having a panel infill geometry 166 interconnecting first and second face sheets 102, 104. The processor-based system 500 includes the mesh stitching module 518 configured to stitch together the mapped unit cell meshes 302 to form a stitched mesh 130, by checking pairs of cell mesh nodes 304 for duplicates, deleting one of the duplicates, and updating cell information to refer to the cell mesh node 304 that is retained, as described above with regard to step 708. The processor-based system 500 also includes a mesh smoothing module 520 configured to perform one or more mesh smoothing operations on the stitched mesh 130, to result in a smoothed mesh 131. As described above with regard to optional step 710, the mesh smoothing operations can be Laplace smoothing operations, Laplace-Beltrami smoothing operations, volume-constrained Laplace smoothing, Taubin smoothing, or other types of smoothing operations. The processor-based system 500 is configured to convert the sandwich panel mesh 132 into a panel digital representation 174 of the sandwich panel 120.

In some examples, the processor-based system 500 includes an additive manufacturing program generator 522 (FIG. 62). The additive manufacturing program generator 522 is configured to use the panel digital representation 174 of the sandwich panel 120 to generate an additive manufacturing program 536 (i.e., a software program). The additive manufacturing program 536 is outputted to an additive manufacturing apparatus 400 (e.g., FIGS. 49-50) configured to additively manufacture a physical version of the sandwich panel 120, as described above.

Referring still to FIG. 62, in some examples, the processor-based system 500 includes a panel export module 524 configured to generate a digital representation of the sandwich panel mesh 132 (i.e., a stitched mesh 130) as an export file that is suitable as an input file that can be read by a numerical analysis program. Such a numerical analysis program can be configured to perform a simulation on the sandwich panel mesh 132 represented by a pair of face sheets 102, 104 and the panel infill geometry 166, each defined by a plurality of shell elements 306 or solid elements 308. For example, a simulation can determine the distribution of a physical quantity (e.g., displacement, strain, pressure, temperature, etc.) across the digital representation of the sandwich panel mesh 132 in response to the application of a given combination of loads (e.g., mechanical load, thermal load, etc.), constraints (e.g., regions of the sandwich panel 120 that are restrained in some manner, and/or subjected to contact with other bodies), and material properties (e.g., mechanical properties, thermal properties, etc.). In at least one example, the numerical analysis performed on the sandwich panel mesh 132 is a structural simulation employing the finite element method, such as simulating the stress and deflection of the sandwich panel 120 when loaded during a 3-point bending test.

The display device 514 is optionally employed to graphically display any one of the driver meshes 142 and/or reference unit cell meshes 300 stored in the memory device 506. In addition, the display device 514 is configured to graphically display the sandwich panel mesh 132 resulting from mapping a connectable cuboid 216 reference unit cell mesh 300 onto a plurality of hexahedral elements 154 respectively associated with the plurality of quadrilateral elements 148 contained in the driver mesh 142. The display device 514 receives the above-noted data from one or more of the corresponding components of the processor-based system 500 via the communication path 502.

The processor-based system 500 includes the processor 504 for executing instructions of computer readable program instructions 534 installed in the memory device 506. Alternatively, the processor-based system 500 comprises a multi-processor core having two or more integrated processor cores. Even further, the processor 504 may comprise a main processor and one or more secondary processors integrated on a chip. The processor 504 may also comprise a multi-processor system having a plurality of similarly configured processors.

Referring still to FIG. 62, the processor-based system 500 includes the memory device 506, which may comprise one or more volatile or non-volatile storage devices 508. However, the memory device 506 can comprise any hardware device for storing data. For example, the memory device 506 can comprise a random access memory or a cache of a device interface and/or integrated memory controller hub included in the communication path 502. The memory device 506 can permanently and/or temporarily store any one of a variety of different types of data, computer readable code or program instructions, or any other type of information. The storage device 508 can be provided in a variety of configurations including, but not limited to, a flash memory device, a hard drive, an optical disk, a hard disk, a magnetic tape or any other suitable example for long-term storage. In addition, the storage device 508 can comprise a removable device such as a removable hard drive.

The processor-based system 500 can additionally include one or more of the input/output devices 510 to facilitate the transfer of data between components connected to the processor-based system 500. An input/output device 510 can be directly and/or indirectly coupled to the processor-based system 500. The input/output device 510 facilitates user-input by means of a peripheral device such as a keyboard, a mouse, a joystick, a touch screen, and any other suitable device for inputting data to the processor-based system 500. The input/output device 510 can further include an output device for transferring data representative of the output of the processor-based system 500. For example the input/output device 510 can comprise a display device 514 such as a computer monitor or computer screen for displaying results of data processed by the processor-based system 500. The input/output device 510 can optionally include a printer or fax machine for printing a hardcopy of information processed by the processor-based system 500.

Referring still to FIG. 62, the processor-based system 500 can include one or more communications devices 512 to facilitate communication of the processor-based system 500 within a computer network and/or with other processor-based systems. Communication of the processor-based system 500 with a computer network or with other processor-based systems can be by wireless means and/or by hardwire connection. For example, the communications device 512 can comprise a network interface controller to enable wireless or cable communication between the processor-based system 500 and a computer network. The communications device 512 can also comprise a modem and/or a network adapter, or any one of a variety of alternative devices for transmitting and receiving data.

One or more of the operations of the above-described methods 700, 800, 900 are performed by the processor 504 and/or by one or more of the unit cell mapping module 516, the mesh stitching module 518, the additive manufacturing program generator 522, and/or the panel export module 524, using the computer readable program instructions 534. The computer readable program instructions 534 can comprise program code, which can include computer usable program code and computer readable program code. The computer readable program instructions 534 are read and executed by the processor 504. The computer readable program instructions 534 enable the processor 504 to perform one or more operations of the above-described examples associated with generating the panel infill geometry 166 of a sandwich panel 120.

Referring still to FIG. 62, the computer readable program instructions 534 include operating instructions for the processor-based system 500, and further include applications and programs. The computer readable program instructions 534 can be contained within and/or loaded onto one or more of a memory device 506 and/or a storage device 508 for execution by the processor 504 and/or by one or more of the unit cell mapping module 516, the mesh stitching module 518, the additive manufacturing program generator 522 and the panel export module 524. As indicated above, the memory device 506 and/or storage device 508 can be communicatively coupled to one or more of the remaining components illustrated in FIG. 62 through the communication path 502.

The computer readable program instructions 534 can be contained on tangible or non-tangible, transitory or non-transitory computer readable media 528 and which can be loaded onto or transferred to the processor-based system 500 for execution by the processor 504. The computer readable program instructions 534 and the computer readable media 528 comprise a computer program product 526. In an example, the computer readable media 528 can comprise computer readable storage media 530 and/or computer readable signal media 532.

The computer readable storage media 530 can comprise a variety of different examples including, but not limited to, optical disks and magnetic disks that may be loaded into a drive, a flash memory device, or other storage device or hardware for transfer of data onto a storage device such as a hard drive. The computer readable storage media 530 can be non-removably installed on the processor-based system 500. The computer readable storage media 530 can comprise any suitable storage media including, without limitation, a semiconductor system or a propagation medium. In this regard, the computer readable storage media 530 can comprise electronic media, magnetic media, optical media, electromagnetic media, and infrared media. For example, the computer readable storage media 530 can comprise magnetic tape, a computer diskette, random access memory, and read-only memory. Non-limiting examples of optical disks include compact disks-read only memory, compact disks-read/write, and digital video disks (i.e., digital versatile disks).

The computer readable signal media 532 can contain the computer readable program instructions 534, and can be provided in a variety of data signal configurations including, but not limited to, an electromagnetic signal and an optical signal. Such data signals can be transmitted by any suitable communications link including by wireless or hardwire means. For example, the hardwire means may comprise an optical fiber cable, a coaxial cable, a signal wire, and any other suitable means for transmitting the data by wireless or by physical means.

Referring still to FIG. 62, the computer readable signal media 532 can facilitate the downloading of the computer readable program instructions 534 to the non-volatile storage or other suitable storage or memory device for use within processor-based system 500. For example, the computer readable program instructions 534 contained within the computer readable storage media 530 can be downloaded to the processor-based system 500 over a computer network from a server or a client computer of another system.

Any one of a variety of different examples of the processor-based system 500 can be implemented using any hardware device or system capable of executing the computer readable program instructions 534. For example, the processor 504 can comprise a hardware unit configured for performing one or more particular functions wherein the computer readable program instructions 534 for performing the functions are pre-loaded into the memory device 506.

In an example, the processor 504 can comprise an application specific integrated circuit, a programmable logic device, or any other hardware device configured to perform one or more specific functions or operations. For example, a programmable logic device may be temporarily or permanently programmed to perform one or more of the operations related to generating the panel infill geometry 166 of a sandwich panel 120. The programmable logic device can comprise a programmable logic array, programmable array logic, a field programmable logic array, and a field programmable gate array and any other suitable logic device, without limitation. In an example, the computer readable program instructions 534 can be operated by the processor 504 and/or by other devices, including one or more hardware units in communication with the processor 504. Certain portions of the computer readable program instructions 534 can be run by the one or more hardware units.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A method of generating a panel infill geometry of a sandwich panel, comprising:

receiving a user input requesting a sandwich panel mesh;

providing a driver mesh representing a panel mid-surface of a sandwich panel, the driver mesh is comprised of a plurality of quadrilateral elements;

providing a reference unit cell mesh having a unit cell geometry configured to fit exactly within a unit cube having a cube center and 8 cube corners, the reference unit cell mesh is comprised of a unit infill mesh and a pair of unit face sheet meshes at opposite ends of the unit infill mesh, wherein the unit cell geometry comprises:

a hollow three-dimensional center portion, centered on the cube center, and closed except for 8 openings respectively located at the 8 cube corners; and mapping a plurality of the reference unit cell meshes respectively onto a plurality of hexahedral elements respectively associated with the plurality of quadrilateral elements, through the use of basis functions defined on each of the plurality of quadrilateral elements in a manner causing adjustment of the size and shape of the plurality of reference unit cell meshes to conform respectively to the plurality of hexahedral elements, and resulting in a plurality of mapped unit cell meshes collectively forming a panel infill mesh of the sandwich panel mesh having a panel infill geometry interconnecting a pair of face sheet meshes; and displaying the sandwich panel mesh to a user based on the user input.

2. The method of claim 1, wherein the step of providing the reference unit cell mesh comprises:

providing a reference unit cell mesh having a unit cell geometry that has symmetries enabling mapping onto the hexahedral elements associated with the quadrilateral elements of a driver mesh that is unstructured.

3. The method of claim 1, wherein the plurality of quadrilateral elements are linear quadrilateral elements each having four corner nodes, and the step of mapping the reference unit cell meshes comprises:

using linear basis functions to map the reference unit cell meshes onto a plurality of hexahedral elements respectively associated with the plurality of linear quadrilateral elements of the driver mesh.

4. The method of claim 1, wherein the plurality of quadrilateral elements are quadratic quadrilateral elements each having four corner nodes and four mid-side nodes, and the step of mapping the reference unit cell meshes comprises:

using quadratic basis functions to map the reference unit cell meshes onto a plurality of hexahedral elements respectively associated with the plurality of quadratic quadrilateral elements of the driver mesh.

5. The method of claim 1, wherein step of providing the reference unit cell mesh comprises:

providing a unit infill portion of the reference unit cell mesh as polygons connecting cell mesh nodes, the cell mesh nodes being in the set of cell mesh nodes which satisfy the following relation:

$$\cos(\pi x)\cos(\pi y)+\cos(\pi y)\cos(\pi z)+\cos(\pi z)\cos(\pi x)=-0.5$$

wherein:

x, y, and z are isoparametric coordinates of the unit infill portion; and the unit infill portion has been trimmed to fit inside the unit cube.

6. The method of claim 1, wherein step of providing the reference unit cell mesh comprises:

providing a unit infill portion of the reference unit cell mesh as polyhedrons connecting cell mesh nodes, the cell mesh nodes having coordinates given by points in a Minkowski sum of the set of all points within a sphere of a given radius and the set of all points which satisfy the following relation:

$$\cos(\pi x)\cos(\pi y)+\cos(\pi y)\cos(\pi z)+\cos(\pi z)\cos(\pi x)=-0.5$$

wherein:

x, y, and z are isoparametric coordinates of the unit infill portion; and the unit infill portion has been trimmed to fit inside the unit cube.

7. The method of claim 1, wherein step of providing the reference unit cell mesh comprises:

providing a unit infill portion of the reference unit cell mesh as polyhedrons connecting cell mesh nodes, the cell mesh nodes having coordinates which satisfy the following relation:

$$-a < \cos(\pi x)\cos(\pi y) + \cos(\pi y)\cos(\pi z) + \cos(\pi z)\cos(\pi x) + 0.5 < b$$

wherein:

a and b are positive real-valued constants defining upper and lower bounding surfaces of a volume defined by the unit infill portion;

x, y, and z are isoparametric coordinates of the unit infill portion; and the unit infill portion has been trimmed to fit inside the unit cube.

8. The method of claim 1, further comprising:

stitching together the mapped unit cell meshes to form a stitched mesh, by checking pairs of cell mesh nodes for duplicates, deleting one of the duplicates, and updating cell information to refer to the cell mesh node that is retained.

9. The method of claim 8, further comprising:

performing one or more mesh smoothing operations on one or more cell mesh nodes of the stitched mesh, to result in a smoothed mesh.

10. The method of claim 1, wherein the step of providing the reference unit cell mesh further includes:

providing the reference unit cell mesh as a multi-layer unit cell mesh comprised of:

two or more layers of unit infill meshes stacked on top of each other; and a pair of unit face sheet meshes respectively located on opposite ends of the multi-layer unit cell mesh.

11. A processor-based system for generating an infill geometry, for interconnecting a pair of face sheets of a sandwich panel, comprising:

a user interface configured to receive a user input requesting a sandwich panel mesh;

a memory device configured to store:

a driver mesh representing a panel mid-surface of a sandwich panel, the driver mesh is comprised of a plurality of quadrilateral elements;

a reference unit cell mesh having a unit cell geometry configured to fit exactly within a unit cube having a cube center and 8 cube corners, the reference unit cell mesh is comprised of a unit infill mesh and a pair of unit face sheet meshes at opposite ends of the unit infill mesh, wherein the unit cell geometry comprises:

a hollow three-dimensional center portion, centered on the cube center, and closed except for 8 openings respectively located at the 8 cube corners; and a unit cell mapping module configured to map, in response to the user input, a plurality of the reference unit cell meshes respectively onto a plurality of hexahedral elements respectively associated with the plurality of quadrilateral elements, through the use of basis functions defined on each of the plurality of quadrilateral elements in a manner causing adjustment of the size and shape of the plurality of reference unit cell meshes to conform respectively to the plurality of hexahedral elements, and resulting in a plurality of mapped unit cell meshes collectively forming a panel infill mesh of the sandwich panel mesh having a panel infill geometry interconnecting a pair of face sheet meshes; and a display device configured to display the sandwich panel mesh based on the user input.

12. The processor-based system of claim 11, wherein providing the reference unit cell mesh comprises:

providing a reference unit cell mesh having a unit cell geometry that has symmetries enabling mapping onto the hexahedral elements associated with the quadrilateral elements of a driver mesh that is unstructured.

13. The processor-based system of claim 11, wherein a unit infill portion of the reference unit cell mesh is comprised of polygons connecting cell mesh nodes, the cell mesh nodes being in the set of cell mesh nodes which satisfy the following relation:

$$\cos(\pi x)\cos(\pi y) + \cos(\pi y)\cos(\pi z) + \cos(\pi z)\cos(\pi x) = -0.5$$

wherein:

x, y, and z are isoparametric coordinates of the unit infill portion; and the unit infill portion has been trimmed to fit inside the unit cube.

14. The processor-based system of claim 11, wherein a unit infill portion of the reference unit cell mesh is comprised of polyhedrons connecting cell mesh nodes, the cell mesh nodes having coordinates given by points in a Minkowski sum of the set of all points within a sphere of a given radius and the set of all points which satisfy the following relation:

$$\cos(\pi x)\cos(\pi y) + \cos(\pi y)\cos(\pi z) + \cos(\pi z)\cos(\pi x) = -0.5$$

wherein:

x, y, and z are isoparametric coordinates of the unit infill portion; and the unit infill portion has been trimmed to fit inside the unit cube.

15. The processor-based system of claim 11, wherein a unit infill portion of the reference unit cell mesh is comprised of polyhedrons connecting cell mesh nodes, the cell mesh nodes having coordinates which satisfy the following relation:

$$-a < \cos(\pi x)\cos(\pi y) + \cos(\pi y)\cos(\pi z) + \cos(\pi z)\cos(\pi x) + 0.5 < b$$

wherein:

a and b are positive real-valued constants defining upper and lower bounding surfaces of a volume defined by the unit infill portion;

x, y, and z are isoparametric coordinates of the unit infill portion; and the unit infill portion has been trimmed to fit inside the unit cube.

16. A sandwich panel, comprising:

a first face sheet;

a second face sheet; and a panel infill structure, comprising an array of unit cell structures arranged in one or more layers connecting the first face sheet to the second face sheet, and each unit cell structure has a main axis that is locally normal to an imaginary panel mid-surface located midway between the first face sheet and the second face sheet, each of the unit cell structures comprising:

a hollow three-dimensional center portion that is closed, except for 8 openings; and 8 corner portions respectively located at the 8 openings, and interconnected to the corner portions of adjacent unit cell structures.

17. The sandwich panel of claim 16, wherein the panel infill structure has smoothly rounded transitions at the junctures between the unit cell structures.

18. The sandwich panel of claim 16, wherein the sandwich panel is doubly curved.

19. The sandwich panel of claim 16, wherein each of the unit cell structures has a variable wall thickness.

20. The sandwich panel of claim 16, wherein each unit cell structure is a multi-layer unit cell structure comprised of two or more unit cell structures stacked on top of each other.

* * * * *